(12) United States Patent
Inuiya et al.

(10) Patent No.: US 6,882,364 B1
(45) Date of Patent: Apr. 19, 2005

(54) SOLID-STATE IMAGING APPARATUS AND SIGNAL PROCESSING METHOD FOR TRANSFORMING IMAGE SIGNALS OUTPUT FROM A HONEYCOMB ARRANGEMENT TO HIGH QUALITY VIDEO SIGNALS

(75) Inventors: Masafumi Inuiya, Asaka (JP); Masaru Osada, Asaka (JP); Takeshi Misawa, Asaka (JP); Kenkichi Hayashi, Asaka (JP); Satoru Okamoto, Asaka (JP); Osamu Saito, Asaka (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/203,363

(22) Filed: Dec. 2, 1998

(30) Foreign Application Priority Data

Dec. 2, 1997 (JP) .............................................. 9/331555
Jan. 8, 1998 (JP) ........................................... 10/001954
Oct. 7, 1998 (JP) ........................................... 10/285126

(51) Int. Cl.$^7$ .......................... H04N 5/208; H04N 9/68; H04N 9/083; G06K 9/40; G06K 9/32

(52) U.S. Cl. ....................... 348/252; 348/237; 348/275; 382/263; 382/266; 382/300

(58) Field of Search ................................ 348/234, 235, 348/252, 254, 275, 208.13, 231.6, 236, 237, 238, 255, 266, 272, 273, 276, 277, 280, 305, 222.1; 382/167, 263, 266, 300

(56) References Cited

U.S. PATENT DOCUMENTS 4,242,700 A * 12/1980 Weimer ....................... 348/275
4,441,123 A    4/1984 Ochi (Continued)

FOREIGN PATENT DOCUMENTS

JP    6077450    3/1994
JP    7298275    11/1995
JP    8340455    12/1996

OTHER PUBLICATIONS

Shimada et al., The Journal of the Institute of Image Information and Television Engineers of Japan, Television and Circuit Group, Reference TBS 36–No. 2, pp. 1–19, (1977).

(Continued)

*Primary Examiner*—Wendy R. Garber
*Assistant Examiner*—John Villecco
(74) *Attorney, Agent, or Firm*—Birch, Stewart, Kolasch & Birch, LLP

(57) ABSTRACT

A solid-state imaging apparatus includes an image pick-up section in which photosensitive devices are arranged in, e.g., a honeycomb G square lattice, RB full-checker pattern due to shifted pixels. Regions void of the photosensitive devices are assumed to be virtual photosensitive devices. A signal processing section generates data for the virtual photosensitive devices by using the data of surrounding photosensitive devices while attaching importance to accurate color reproduction and horizontal and/or vertical resolution. As a result, the number of pixel data are increased in a square lattice arrangement. Therefore, high quality image signals are readily achievable with a smaller number of photosensitive devices than conventional with a conventional apparatus. Interpolation can be executed with the high quality signals to the limit of resolution with an adequate circuit scale. The honeycomb arrangement guarantees the required size of the individual pixel and thereby the sensitivity of the entire apparatus while increasing yield on a production line. False colors particular to a single photosensitive portion can be reduced by, e.g., uniform interpolation. Particularly, when a digital camera is constructed by using an imaging apparatus including optics operable with a silver halide sensitive type of film, false colors can be reduced without resorting to an optical low pass filter.

47 Claims, 63 Drawing Sheets

U.S. PATENT DOCUMENTS

| | | | | |
|---|---|---|---|---|
| 5,034,804 A | | 7/1991 | Sasaki et al. | |
| 5,119,180 A | * | 6/1992 | Okamoto | 348/296 |
| 5,253,046 A | * | 10/1993 | Shiraishi | 348/237 |
| 5,319,451 A | * | 6/1994 | Sasaki et al. | 348/282 |
| 5,337,152 A | * | 8/1994 | Kotaki | 348/234 |
| 5,457,494 A | * | 10/1995 | Suga et al. | 348/229.1 |
| 5,581,298 A | * | 12/1996 | Sasaki et al. | 348/222.1 |
| 5,581,357 A | * | 12/1996 | Sasaki et al. | 348/235 |
| 5,596,367 A | * | 1/1997 | Hamilton et al. | 348/272 |
| 5,737,017 A | * | 4/1998 | Udagawa et al. | 348/280 |
| 5,805,217 A | * | 9/1998 | Lu et al. | 348/273 |
| 5,956,087 A | * | 9/1999 | Takayama et al. | 348/275 |
| 6,046,772 A | * | 4/2000 | Howell | 348/273 |
| 6,088,175 A | * | 7/2000 | Iguchi | 359/892 |
| 6,100,929 A | * | 8/2000 | Ikeda et al. | 348/262 |
| 6,147,707 A | * | 11/2000 | Terasawa et al. | 348/229.1 |
| 6,236,434 B1 | * | 5/2001 | Yamada | 348/315 |
| 6,366,319 B1 | * | 4/2002 | Bills | 348/273 |
| 6,366,694 B1 | * | 4/2002 | Acharya | 382/167 |
| 6,380,973 B1 | * | 4/2002 | Kawahara | 348/234 |
| 6,522,356 B1 | * | 2/2003 | Watanabe | 348/272 |

OTHER PUBLICATIONS

Murata et al., The Journal of the Institute of Image Information and Television Engineers of Japan, TEBS 60–No. 2, pp. 27–32, (1980).

Morimoto et al., The $70^{th}$ Fine Imaging Symposium of the Society of Photographic Science and Technology of Japan, Minolta RD175 pp. 73–76, (Oct. 1995).

* cited by examiner

SQUARE LATTICE PATTERN

HONEYCOMB PATTERN

Fig. 13A
| $R_{00}$ | 01 | $B_{02}$ | 03 |
|---|---|---|---|
| 10 | $G_{11}$ | 12 | $G_{13}$ |
| $B_{20}$ | 21 | $R_{22}$ | 23 |
| 30 | $G_{31}$ | 32 | $G_{33}$ |
| $R_{40}$ | 41 | $B_{42}$ | 43 |
Fig. 13D
Fig. 13B
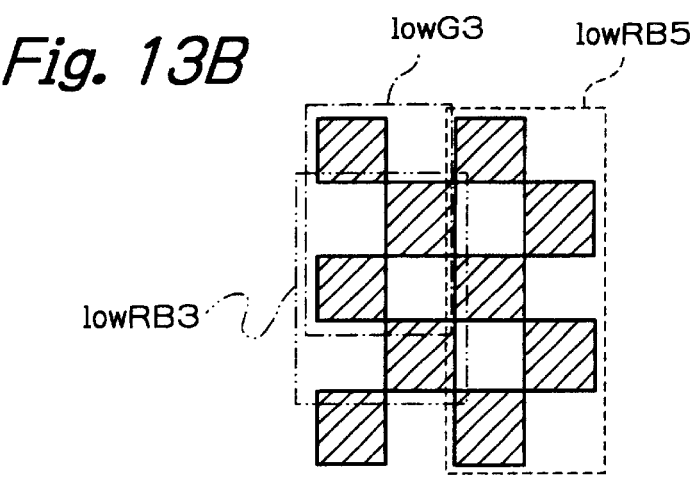
Fig. 13E
Fig. 13C
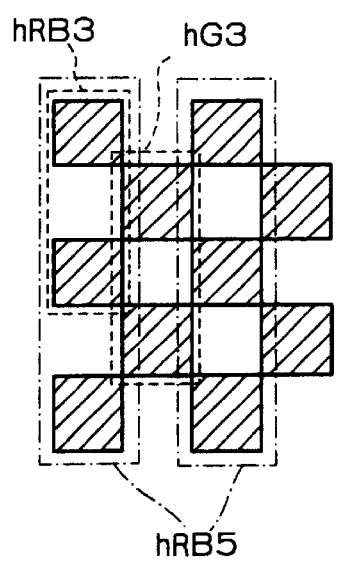

Fig. 21

| $R_{00}$ | 01 | $B_{02}$ | 03 | $R_{04}$ |
|---|---|---|---|---|
| 10 | $G_{11}$ | 12 | $G_{13}$ | 14 |
| $B_{20}$ | 21 | $R_{22}$ | 23 | $B_{24}$ |
| 30 | $G_{31}$ | 32 | $G_{33}$ | 34 |
| $R_{40}$ | 41 | $B_{42}$ | 43 | $R_{44}$ |

HONEYCOMB PATTERN

BAYER PATTERN SEEN AT 45°

ARRANGEMENT OF PHOTOSENSITIVE DEVICES

GENERATION OF LUMINANCE DATA Y

GENERATION OF $Y_h$ DATA

Fig. 52

|  |  |  |  |  |  |  |
|---|---|---|---|---|---|---|
| $R_{00}$ |  |  |  | $R_{04}$ |  |  |
|  | $R_{11}$ |  | $R_{13}$ |  | $R_{15}$ |  |
|  |  | $R_{22}$ |  |  |  | $R_{26}$ |
|  | $R_{31}$ |  | $R_{33}$ |  | $R_{35}$ |  |
| $R_{40}$ |  |  |  | $R_{44}$ |  |  |

Fig. 53

|  |  |  |  |  |  |  |
|---|---|---|---|---|---|---|
| $R_{00}$ |  | $R_{02}$ |  | $R_{04}$ |  | $R_{06}$ |
|  | $R_{11}$ |  | $R_{13}$ |  | $R_{15}$ |  |
| $R_{20}$ |  | $R_{22}$ |  | $R_{24}$ |  | $R_{26}$ |
|  | $R_{31}$ |  | $R_{33}$ |  | $R_{35}$ |  |
| $R_{40}$ |  | $R_{42}$ |  | $R_{44}$ |  | $R_{46}$ |

| Fig. 59A | Fig. 59B |

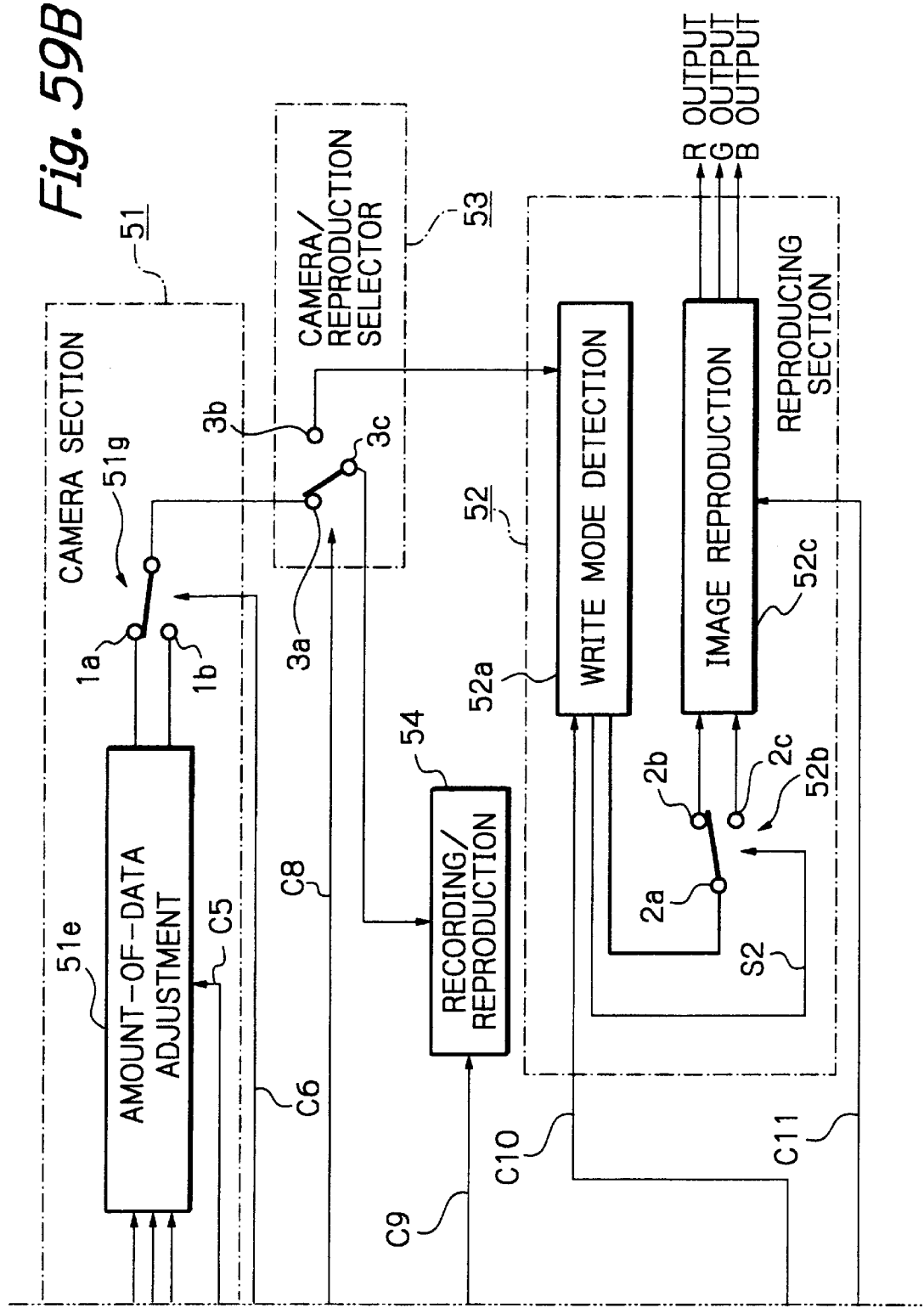

SQUARE LATTICE PATTERN

HONEYCOMB PATTERN

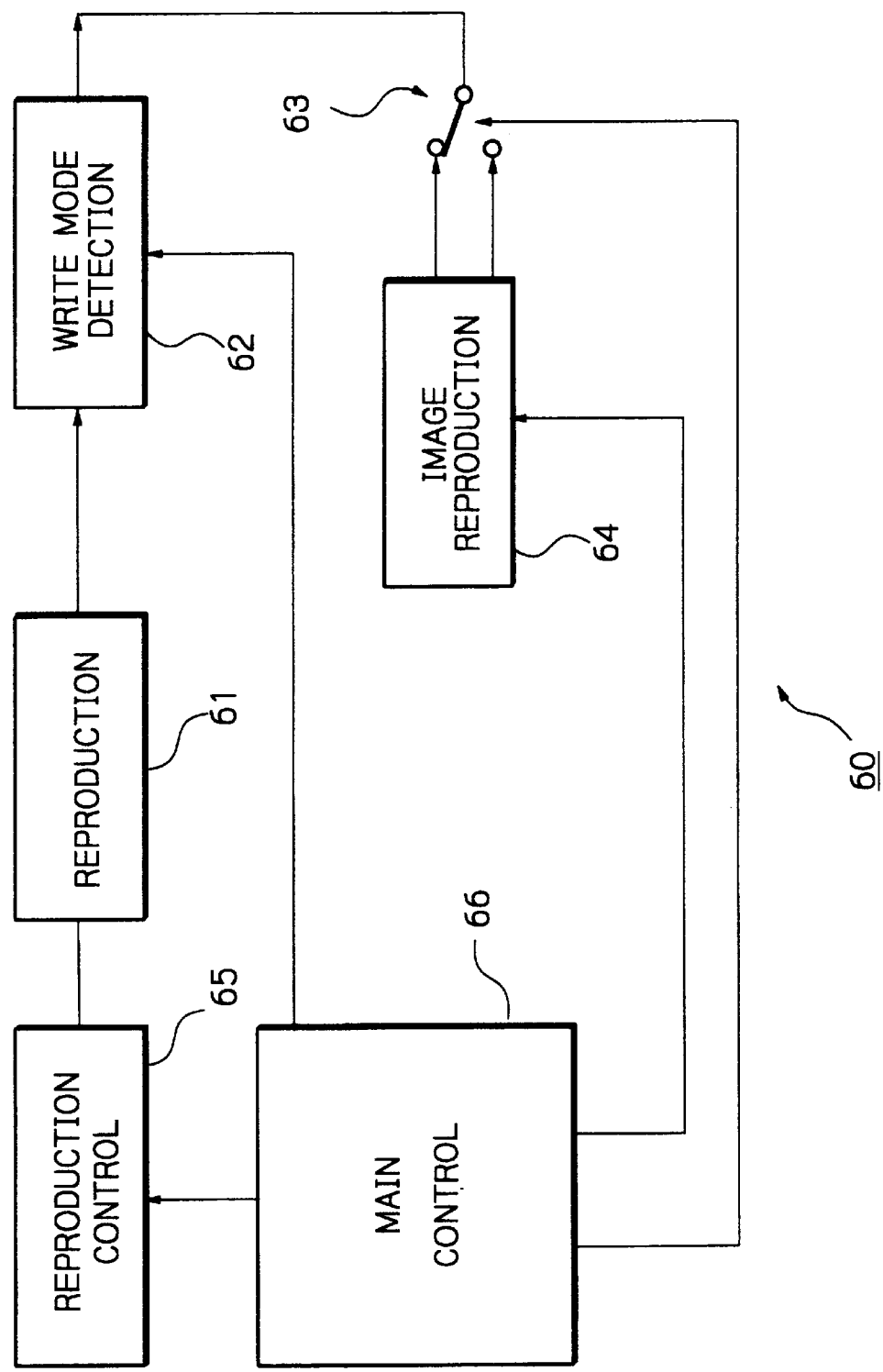

SOLID-STATE IMAGING APPARATUS AND SIGNAL PROCESSING METHOD FOR TRANSFORMING IMAGE SIGNALS OUTPUT FROM A HONEYCOMB ARRANGEMENT TO HIGH QUALITY VIDEO SIGNALS

BACKGROUND OF THE INVENTION

1. Field of the Invention

The present invention relates to a solid-state imaging apparatus and a signal processing method for transforming image signals output from a honeycomb arrangement to high quality video signals. The apparatus and method of the present invention are advantageously applicable to, e.g., a digital still camera or an image processing apparatus executing signal processing with the image of a subject picked up. More particularly, the present invention is concerned with a digital still camera for converting signals resulting from a shot to image data and recording and/or reproducing the image data, and a recording and/or reproducing method therefor. The digital camera may advantageously be implemented as a digital still camera or a digital video camera.

2. Description of the Background Art

In the imaging art, a solid-state imaging apparatus is extensively used to pick up a desired subject in the form of an image. To meet an increasing demand for a miniature configuration and high resolution, a solid-state imaging device using a single filter type solid photosensitive devices may have the number of photosensitive devices or pixels arranged in, e.g., a square lattice pattern simply increased, as proposed in the early stage of development. However, resolution achievable with this scheme is limited because the light-sensitive area and therefore sensitivity of the individual photosensitive device decreases with an increase in the number of photosensitive devices.

Some different systems for implementing higher resolution from a different point of view are now in study. A first system shifts pixels by using three-filter type photosensitive devices. For example, Shimada et al., "A color camera with CCDs (Charge Coupled Devices) windowed for spatially shifting pixels" is taught in the Journal of the Institute of Image Information and Television Engineers of Japan (former Institute of Television Engineers of Japan), Television and Circuit Group, Reference TBS No. 32-2, pp. 1–19, Feb. 24, 1977. Basically, this color camera uses three color filters for shifting pixels and enhances resolution.

A second system uses line-sequential two-filter photosensitive devices while shifting pixels. Specifically, "A line-sequential 2CCD color camera" is disclosed in Murata et al., the Journal of the Institute of Image Information and Television Engineers of Japan, Technical Report TEBS No. 60-2, pp. 27–32, Jan. 25, 1980). The Technical Report teaches a two-filter imaging system using a G (green) filter and a line-sequential R (red)/B (blue) filter based on an NTSC (National Television System Committee) scheme, a camera arrangement and imaging characteristics for improving resolution in the horizontal direction.

A third system shifts pixels and executes signal processing taking account of shifted pixels, as proposed in, e.g., Japanese patent laid-open publication No. 298275/1995. This document discloses signal processing circuitry for a video camera capable of enhancing resolution in the horizontal and vertical directions by using a G signal derived from a Bayer single-filter system. With this scheme, a sharp image is achievable without limiting a high frequency range at the time of generation of aperture signals.

A fourth system uses a three-filter configuration and feeds the color G to two CCD plates shifted in pixel position from each other. For example, a three-filter, dual green digital camera is disclosed in a paper, Morimmoto et al., "Digital Still Camera Using 3-CCD Image Sensor", Minolta RD 175 presented at the $70^{th}$ Fine Imaging Symposium of the Society of Photographic Science and Technology of Japan, pp. 73–76, October, 1995. In this digital camera, the color G is distributed to two of three filters that are shifted in pixel position from each other, and the resulting signals are processed to increase resolution.

Japanese patent laid-open publication No. 340455/1996 proposes, apart from the enhancement of high resolution, an image processing apparatus for feeding signals output from shifted imaging devices to another apparatus so as to cause it to display a faithful image. Specifically, the image processing apparatus processes image data output from photosensitive devices arranged in a non-lattice pattern such that the image data are adaptive to a computer.

A solid-state imaging apparatus including solid-state photosensitive devices each having a unique shape has also been proposed in the past. U.S. Pat. No. 4,441,123, for example, discloses a solid-state imaging apparatus including a filter with a matrix configuration and hexagonal pixels of the same size arranged in correspondence to the matrix of the filter, so that images can be freed from moiré. Japanese Patent laid-open publication No. 77450/1994 teaches solid-state photosensitive devices each having a unique pixel shape and shifted in position from each other. Specifically, each imaging device has a rhombic shape whose sides are inclined by an angle of 45 degrees relative to the vertical direction, and such pixels are shifted from each other. This kind of scheme is directed toward the enhancement of resolution in the vertical direction in relation to an all-pixel read out system.

The above conventional schemes, however, have some problems left unsolved, as follows. The first system executes movie type signal processing for attaching importance to the horizontal resolution. Although this system implements high resolution by shifting pixels, it needs utmost pixel shifting accuracy due to the use of three CCD units. To implement such accuracy, the number of steps of assembling the color camera and therefore the cost of the camera increases.

The second system improves resolution like the first system, but at the sacrifice of the vertical resolution. Further, the movie type vertical resolution is limited by the number of scanning lines, obstructing the application of the system to, e.g., a digital camera using the all-pixel read out system. Moreover, color reproducibility available with the second system is low because the colors of the two filters are complementary to each other. In addition, the second system, like the first system, needs utmost pixel shifting accuracy due to the use of a plurality of filters.

The third system achieves high resolution in both of the horizontal and vertical directions. However, the problem with this system is that because it executes interpolation by detecting correlations in both directions, accurate correlations are not achievable without forcing signal processing circuitry to bear a heavy load. In this sense, accuracy available with the third system is limited.

The fourth system using three filters cannot be easily simplified in configuration, compared to systems using a single filter. Moreover, the highly accurate arrangement matching with the shifted pixels sophisticates a production line.

The image signal processing apparatus of Japanese patent laid-open publication No. 340455/1996 shares the same principle as the third system in that it enhances resolution by signal processing. Shifting pixels in a pattern, as in the above document, is successful to extend the limit of bidimensional visible resolution, as well known in the art. However, because the apparatus shifts pixels while avoiding an increase in the number of pixels, a single picture needs a greater capacity when written to a recording medium in accordance with an increase in the number of pixels. As a result, the number of pictures that can be stored in a recording medium decreases.

The solid-state imaging apparatuses taught in U.S. Pat. No. 4,441,123 and Japanese patent laid-open publication No. 77450/1994 each has a problem that an increase in the number of pixels for implementing high resolution reduces the light-sensitive area and therefore sensitivity of the individual photosensitive device, as stated earlier. Further, decease in the pitch of unit pixels is approaching a limit at which the color aberration of a lens and optical diffraction have adverse influence.

The conventional systems and proposals each increases the amount of data for a picture and thereby reduces the number of pictures that can be stored in a single recording medium.

Now, a digital camera may be constructed with importance attached rather to the number of pictures to be taken than to image quality, depending on the application. For example, a digital camera taught in U.S. Pat. No. 5,034,804 and executing multimode data compression compresses a luminance signal and two chrominance signals subjected to signal processing and writes the compressed signals in a semiconductor memory or similar recording medium. Specifically, the compressed signals or data are written to a recording medium in desired one of a plurality of modes.

Assume that photosensitive devices or cells arranged in shifted positions (or in a honeycomb pattern) are applied to the above multimode compression type digital camera. Then, interpolation based on signals output from the photosensitive devices doubles the amount of data before compression, compared to a square lattice arrangement. By compressing such signals, it is possible to reduce the amount of data to be recorded in accordance with the compression ratio. However, a signal processing time necessary for the digital camera cannot be reduced. The signal processing time is not negligible when it comes to, e.g., a digital camera including more than 1,000,000 photosensitive devices. Particularly, the signal processing time increases an interval between shots when the digital camera is operated in a continuous shoot mode. Furthermore, the camera increases in size and therefore diminishes in value as a product.

Assume image data output from photosensitive devices or pixels simply spatially shifted in position (honeycomb arrangement). The amount of such image data is double the amount of image data output, via apertures arranged in a square lattice pattern, from photosensitive devices whose pixels to be sampled are not spatially offset, as in a monitor for a computer or a television receiver. This also increases the signal processing time.

SUMMARY OF THE INVENTION

It is therefore an object of the present invention to provide a solid-state imaging apparatus and a signal processing method capable of readily outputting a high resolution image with a suppressive number of pixels.

It is another object of the present invention to provide a digital camera capable of recording image data output from shifted photosensitive devices without any delay ascribable to signal processing even when importance is attached to image quality and/or the number of pictures to be taken, and a recording and/or reproducing method therefor.

A solid-state imaging apparatus of the present invention includes an image pick-up section in which photosensitive devices are arranged in, e.g., a honeycomb G square lattice, RB full-checker pattern due to shifted pixels. Regions void of the photosensitive devices are assumed to be virtual photosensitive devices. A signal processing section generates data for the virtual photosensitive devices by using the data of surrounding photosensitive devices while attaching importance to accurate color reproduction and horizontal and/or vertical resolution. As a result, the number of pixel data are increased in a square lattice arrangement. Therefore, high quality image signals are readily achievable with a smaller number of photosensitive devices than conventional. Interpolation can be executed with the high quality signals to the limit of resolution with an adequate circuit scale. The honeycomb arrangement guarantees the required size of the individual pixel and therefore the sensitivity of the entire apparatus while increasing yield on a production line. Pseudo colors particular to a single photosensitive portion can be reduced by, e.g., uniform interpolation. Particularly, when a digital camera is constructed by using an imaging apparatus including optics operable with a silver halide sensitive type of film, pseudo colors can be reduced without resorting to an optical low pass filter.

BRIEF DESCRIPTION OF THE DRAWINGS

The objects and features of the present invention will become more apparent from the consideration of the following detailed description taken in conjunction with the accompanying drawings in which:

FIGS. 13A–13E show a basic arrangement and areas to be used for describing calculations included in the subroutine SUB1;

FIG. 21 shows a basic arrangement for describing the subroutine SUB3 of FIG. 19;

FIGS. 32A–33D respectively show a first and a second relation between the patterns of colors implemented by three color filters and a spatial arrangement produced by combining them and applicable to the present invention;

FIGS. 44A–44E show color boundary patterns allowing horizontal and vertical correlations to be detected in the subroutine SUB8 of FIGS. 40 and 41;

FIG. 52 shows a positional relation produced by adding oblique interpolation to the relation of FIG. 51;

FIG. 53 shows a positional relation produced by adding oblique interpolation using four pixel data to the relation of FIG. 52;

FIG. 59 shows how FIGS. 59A and 59B are combined;

FIGS. 59A and 59B are schematic block diagrams showing a digital still camera to which a digital camera in accordance with the present invention is applied;

FIG. 73 is a schematic block diagram showing an image reproducing apparatus in accordance with the present invention.

DESCRIPTION OF THE PREFERRED EMBODIMENTS

Preferred embodiments of the solid-state imaging apparatus and signal processing method in accordance with the present invention will be described hereinafter. The solid-state imaging apparatus of the present invention is advantageously applicable to a digital still camera, video camera or similar image input apparatus of the type reading all pixels at a time. Particularly, the apparatus is capable of broadening the frequency band of signals resulting from a shot.

First Embodiment

Figure 1:
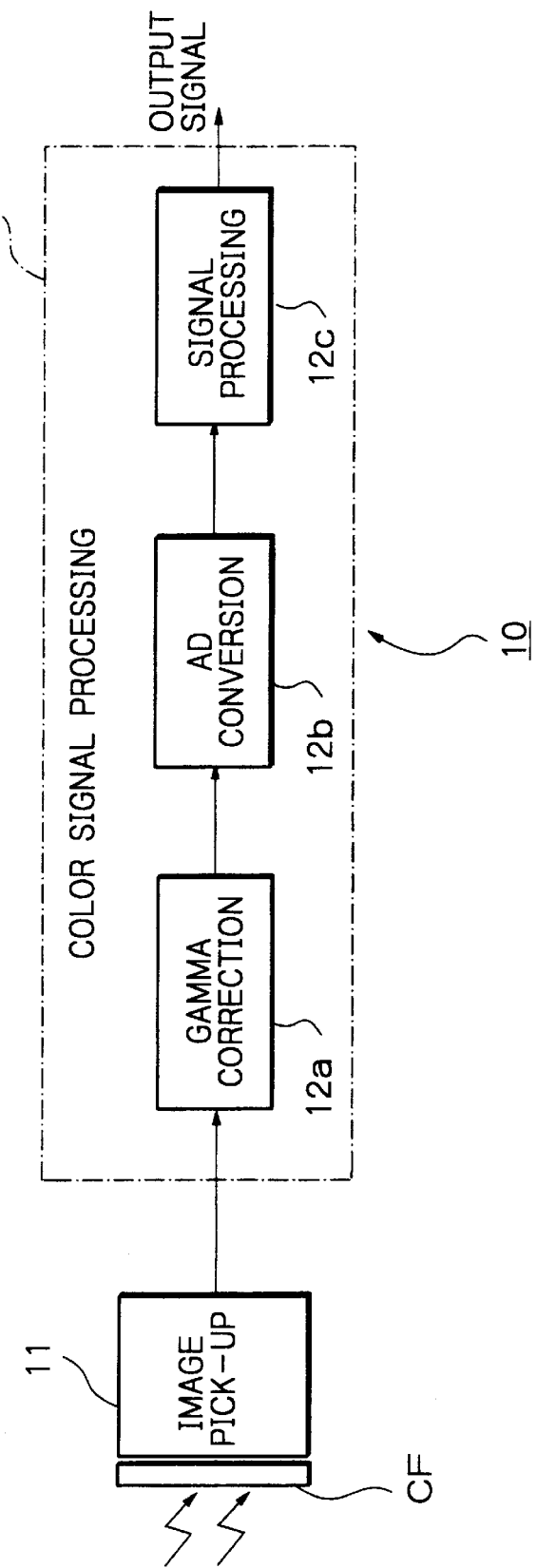
FIG. 1 is a block diagram schematically showing a first embodiment of the solid-state imaging apparatus in accordance with the present invention.

Referring to FIG. 1 of the drawings, a solid-state imaging apparatus embodying the present invention is shown and generally designated by the reference numeral 10. As shown, the apparatus 10 is generally made up of an image pick-up 11 and a color signal processing 12. The image pick-up 11 transforms light incident thereto via optics, not shown, to corresponding electric signals. The color signal processing 12 executes color signal processing with the signals output from the image pick-up 11.

Figure 6:
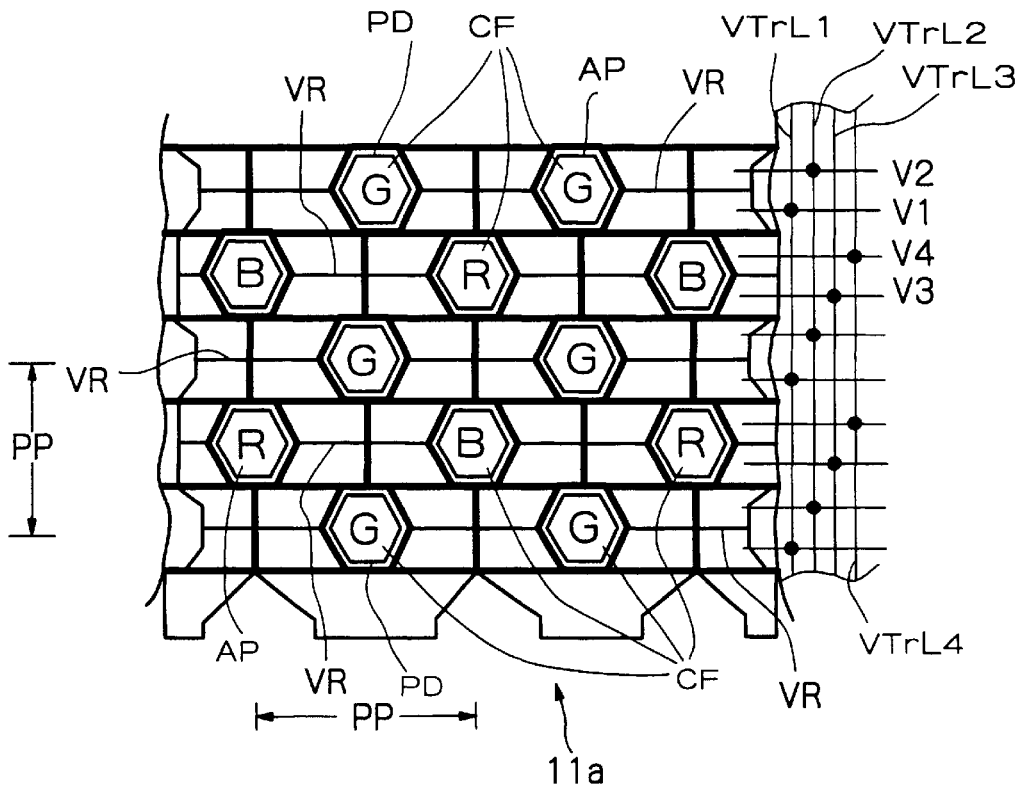
FIG. 6 is a view for describing the arrangement of an imaging surface and that of a color filter included in an image pick-up section included in the first embodiment.

As shown in FIG. 6, the image pick-up 11 includes a light-sensitive portion 11a having photosensitive devices (cells) PD bidimensionally arranged while being shifted from each other in the vertical and/or horizontal direction. The photosensitive devices PD each transforms incident light to a corresponding electric signal. At the outside of apertures AP formed in the front of the photosensitive portion 11a electrodes, not shown, are arranged for delivering signals output from the photosensitive devices PD. Vertical transfer registers VR sequentially transfer the signals fed via the electrodes EL in the vertical direction of the photosensitive portion 11a.

The vertical transfer lines VTrL1–VTrL4 supply the above signals in response to vertical transfer drive signals V1–V4, respectively. A plurality of color filters CF each having particular spectral sensitivity are respectively positioned above the apertures AP of the photosensitive devices PD. Signals are read out of the image pick-up 11, FIG. 1, by two-wire parallel reading. The color filters CF and apertures AP will be described in detail later.

Referring again to FIG. 1, the color signal processing 12 is made up of a gamma conversion 12a, an analog-to-digital (AD) conversion 12b and a signal processing 12c. The gamma correction 12a performs gamma correction with signals output from the vertical transfer registers VR, FIG. 6. The AD conversion 12b converts the outputs of the gamma conversion 12a to corresponding digital data. It is to be noted that all the signals to be dealt with by circuitry following the AD conversion 12b are digital data although terms signals and component signals will be used in the illustrative embodiment for convenience. The converted bidimensional digital data are fed from the AD conversion 12b to the signal processing 12c as plane data.

Figure 2:
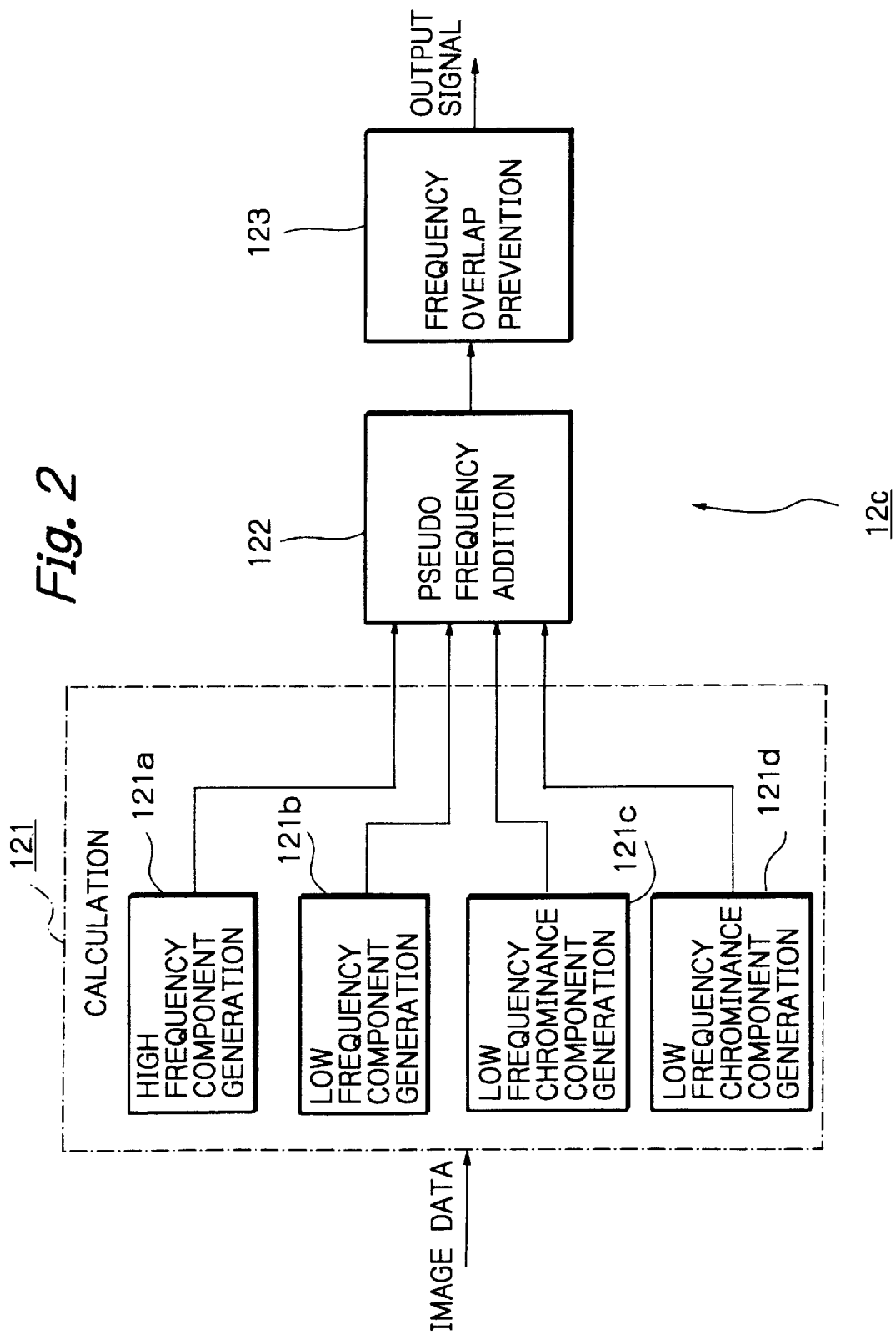
FIG. 2 is a schematic block diagram showing a specific construction of a signal processing section included in the first embodiment.

The signal processing 12c attaches importance to accurate color reproducibility and horizontal and/or vertical resolution and executes item-by-item processing on the basis of, among the plane data received from the AD conversion 12b, the data output from nearby photosensitive devices PD, FIG. 6. As shown in FIG. 2 specifically, the signal processing 12c has a calculation 121, a pseudo frequency addition 122, and a frequency overlap prevention 123 for implementing the above functions.

In the illustrative embodiment, regions where the photosensitive devices PD are absent due to the shifted arrangement are assumed to be virtual photosensitive devices (virtual pixels hereinafter). The calculation 121 of the signal processing 12c attaches importance to accurate color reproducibility and horizontal and/or vertical resolution and executes item-by-item calculation on the basis of, among the plane data received from the AD conversion 12b, the data output from nearby photosensitive devices PD, FIG. 6. For this purpose, the calculation 121 has a high frequency component generation 121a, a low frequency component generation 121b, and two low frequency chrominance component generations 121c and 121d. Component signals $Y_L$ (see FIG. 3) attaching importance to color reproducibility are lower in frequency than component signals $Y_H$ attaching importance to resolution. The calculation 121 produces, by using a $Y_h$·$Y_{low}$ generating method by way of example, pixel-by-pixel data $Y_h$ and $Y_{low}$ from raw pixel data. At the time of generation of the data $Y_h$ or $Y_{low}$, the calculation 121 rearranges the pixels in a square lattice pattern in order to effect interpolation for the virtual pixels void of input data. Further, with the low frequency chrominance signal generations 121c and 121d, the calculation 121 performs calculation with chrominance signals $(R-Y)_L$ and $(B-Y)_L$ (see FIG. 3). Data so generated by the calculation 121 are input to the pseudo frequency addition 122 in the form of two component signals $Y_H$ and $Y_L$ and two low frequency chrominance signals $(R-Y)_L$ and $(B-Y)_L$. The operation of the calculation 121 will be described more specifically later.

Figure 3:
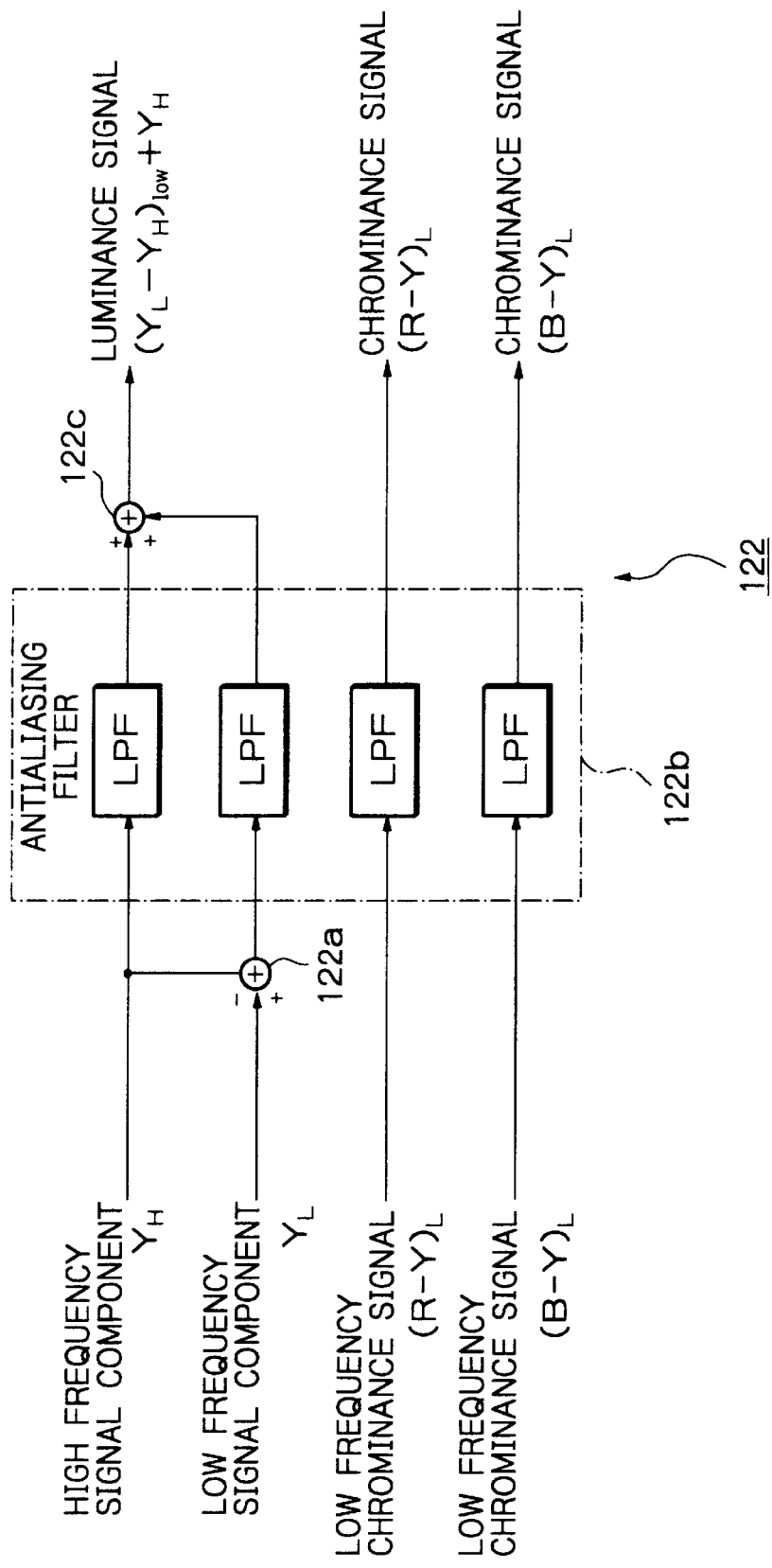
FIG. 3 is a schematic block diagram showing a pseudo frequency addition section included in the signal processing section of FIG. 2.

As shown in FIG. 3, the pseudo frequency addition 122 includes an adder 122a, an antialiasing filter 122b, and an adder 122c. The component signals $Y_H$ and $Y_L$ output from the calculation 121 are respectively input to the minus input (−) and positive input (+) of the adder 122a. The resulting sum is fed from the adder 122a to the antialiasing filter 122b. Also fed to the antialiasing filter 122b are the high frequency component signals $Y_H$ and low range chrominance signals $(R-Y)_L$ and $(B-Y)_L$ output from the calculation 121.

The antialiasing filter 122b is made up of four low pass filters (LPFs) or digital filters. The filter 122b filters the input component signals $Y_H$ and $Y_L$ with the LPFs in order to free them from aliasing distortions. Further, the filter 122b filters the low frequency chrominance signals $(R-Y)_L$ and $(B-Y)_L$ with the other LPFs. The high frequency component signals $Y_H$ and low frequency component signals $Y_L$ filtered by the filter 122b are delivered to the adder 122c.

Figure 4:
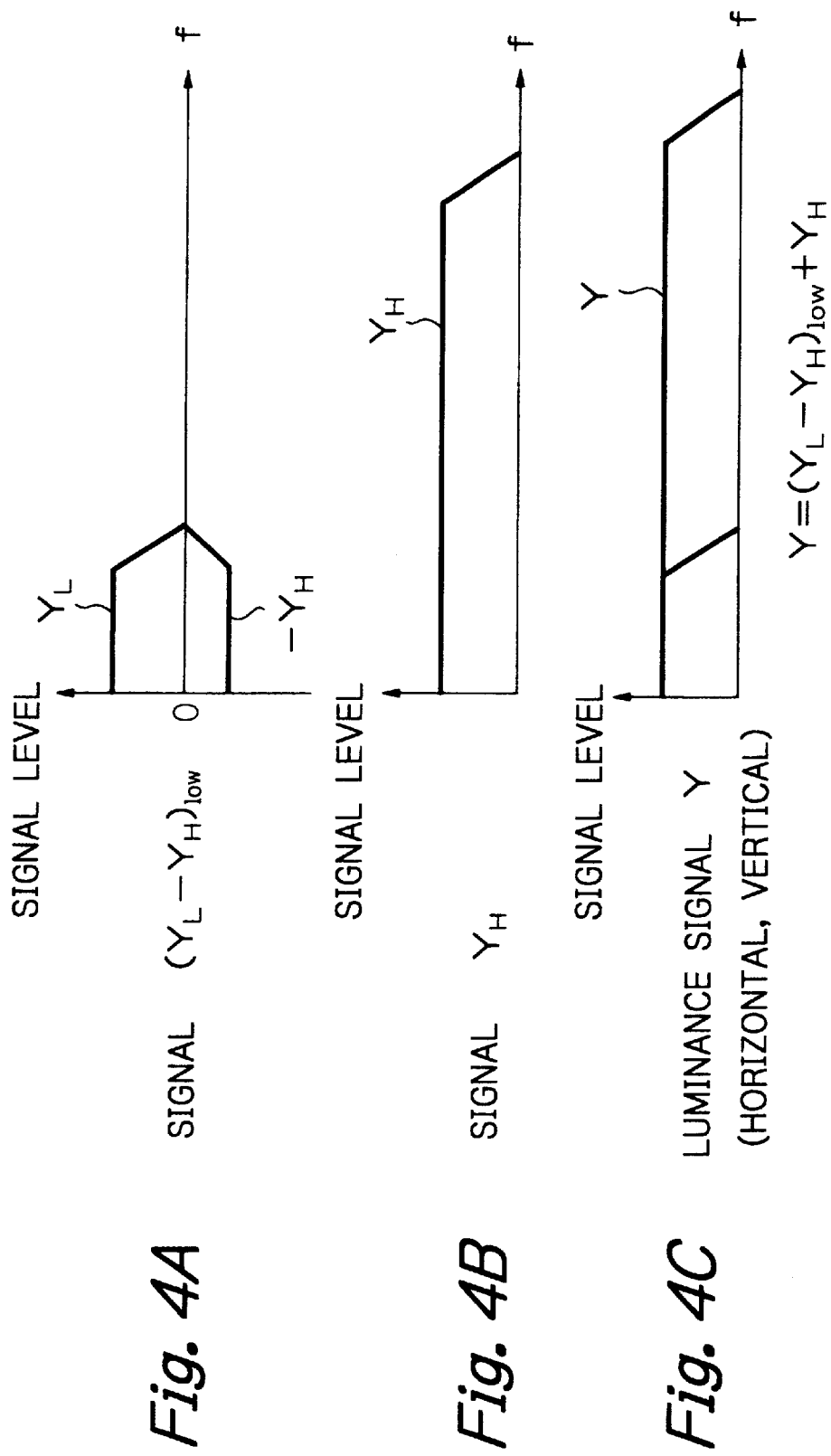
FIGS. 4A, 4B and 4C show the frequency allocation of signals derived from the operation of the pseudo frequency addition section.

FIGS. 4A–4C show a frequency allocation assigned to the pseudo frequency addition 122. As shown, a sum $(Y_L-Y_H)_{low}$ (FIG. 4A) output from the adder 122a and the high range component signal $(Y_H)$ (FIG. 4B) are added by the adder 122c. As a result, a sum $(Y_L-Y_H)_{low}+Y_H$ (FIG. 4C) is output from the adder 122c. It is to be noted that the suffix "low" of $(Y_L-Y_H)_{low}$ shows that the sum has been passed through the LPF. The addition 122 adds the component signals $Y_L$ and $Y_H$ output from the calculation 121 in a pseudo frequency fashion. This addition successfully broadens the frequency band of the luminance signal. Each of the component signals applied to the addition 122 shown in FIGS. 2 and 3 is divided in the horizontal and vertical directions of an image also.

Figure 5:
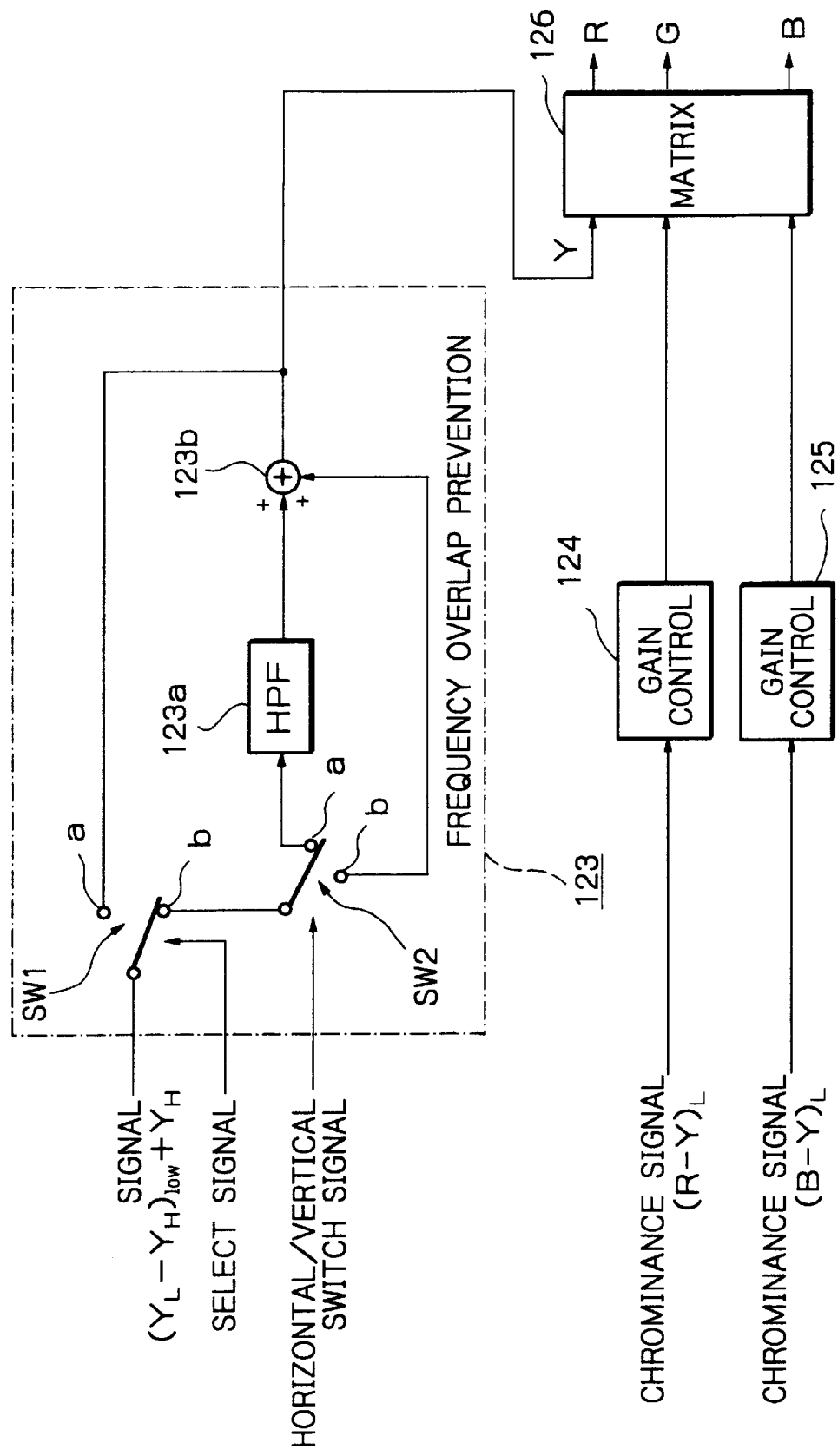
FIG. 5 is a schematic block diagram showing a frequency overlap prevention section also included in the signal processing section of FIG. 2.

As shown in FIG. 5, the frequency overlap prevention 123 includes switches SW1 and SW2, a high pass filter (HPF) 123a, and an adder 123b. Assume that the component signals with importance to the horizontal and vertical resolutions, respectively, by the calculation 121 include the same frequency band as each other. Then, the prevention 123 limits the same frequency band of either one of the horizontal and vertical component signals included in the luminance signal $(Y_L-Y_H)_{low}+Y_H$, and adds the limited component signal and the other component signal. This obviates the overlap of the frequency band of the component signals.

Specifically, the switch SW1 switches the output $(Y_L-Y_H)_{low}+Y_H$ of the pseudo frequency addition 122 in accordance with whether importance is attached to one of the horizontal and vertical resolutions or both of them. When importance is attached to both of the horizontal and vertical resolutions, the switch SW1 selects a terminal b so as to transfer the signals selected to the switch SW2. The switch SW2 selects, among the input signals, the signal attaching importance to the horizontal resolution or the vertical resolution. For example, the switch SW2 transfers the signals attaching importance to the vertical resolution to the HPF 123a via its terminal a. The HPF 123a limits a frequency band included in, e.g., the signal attaching importance to the vertical resolution and also included in the signal attaching importance to the horizontal resolution. The adder 123b adds the output of the HPF 123a and, e.g., the signal attaching importance to the horizontal resolution output from the terminal b of the switch SW2.

Assume that importance is attached to only one of the horizontal and vertical resolutions. Then, the switch SW1 selects its terminal a in response to a select signal fed from a CPU (Central Processing Unit) or similar controller not shown. As a result, the signals are output from the prevention 123, bypassing the HPF 123a and adder 123b. At the same time, the switch SW2 is operated by a horizontal/vertical switch signal also output from the controller.

By the above luminance processing, the frequency overlap prevention 123 transforms the luminance signals $(Y_L-Y_H)_{low}+Y_H$ to luminance signals Y that are free from errors even when combined with the horizontal signals or the vertical signals. The luminance signals Y are fed to a matrix 126. The low frequency chrominance signals $(R-Y)_L$ and $(B-Y)_L$ output from the antialiasing filter 122b are subjected to gain adjustment by gain controllers 124 and 125, respectively, and then input to the matrix 126. The matrix 126 processes the input signals Y, $(R-Y)_L$ and $(B-Y)_L$ so as to output three primary colors R, G and B with improved color reproducibility and improved resolution.

In the above embodiment, the digital data output from the AD conversion 12b are directly applied to the signal processing 12c. Alternatively, the digital data may be fed to the signal processing 12c via a buffer memory having a reading and writing capability. Also, when the illustrative embodiment is applied to a reproducing apparatus, a recording medium may be implemented by a disk storage by way of example. In addition, an index image may be added to the bidimensional data output from the AD conversion 12b, if desired.

Before entering into detailed description of the operation of the apparatus 10, there will be described the image pick-up 11 and color filters CF in detail. FIG. 6 shows the imaging surface of the image pick-up 11. As shown, the apertures AP included in the image pick-up 11 each has a hexagonal honeycomb configuration as distinguished from the conventional square lattice configuration. If desired, each aperture AP may have a square configuration rotated by 45 degrees, e.g., a rhombic configuration or may even be octagonal.

As shown in FIG. 6, the photosensitive devices PD are respectively positioned beneath the color filters CF each covering one of the apertures AP. Assume that the photosensitive devices PD are arranged at a pixel pitch PP in both of the horizontal and vertical directions. Then, the apertures AP are bidimensionally arranged such that the consecutive rows and consecutive columns each are shifted in the horizontal and vertical directions, respectively, by the pixel pitch PP. When the aperture AP each is implemented as a polygon having four or more sides, they may be densely arranged without any space in matching relation to the polygon. For example, to densely arrange the hexagonal apertures AP shown in FIG. 6, they may be shifted by one half of the pixel pitch PP in the horizontal and vertical directions. Such a dense arrangement depends on the shape of the individual aperture AP.

Figure 7A:
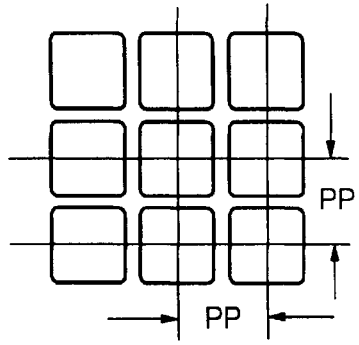
FIGS. 7A and 7B show a relation between a square lattice configuration and a honeycomb configuration in which apertures or photosensitive devices (pixels) included in the image pick-up section of FIG. 6 may be arranged.
Figure 7B:
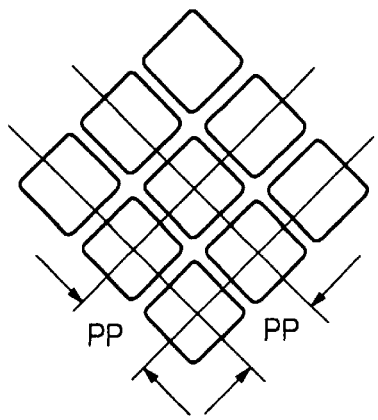
Figure 8:
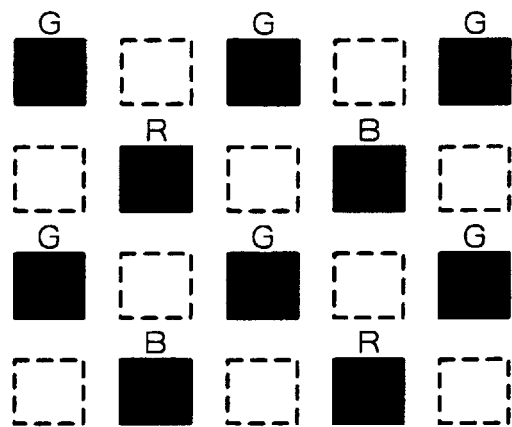
FIG. 8 shows a relation between a color filter of FIG. 6 and the honeycomb configuration.

As for the image pick-up 11, the conventional square lattice arrangement and the honeycomb arrangement compare as follows. In FIG. 7A, shows a square lattice arrangement having a pixel pitch PP of N m in both of the horizontal and vertical directions. As shown in FIG. 7B, the honeycomb arrangement is equivalent to the square arrangement rotated by 45 degrees. Further, as shown in FIG. 8, the color filters CF equivalent in arrangement to the honeycomb arrangement constitute a G stripe, RB full-checker pattern. That is, the filters of three primary colors R, G and B are shifted in accordance with the shifted arrangement of the photosensitive devices PD, FIG. 6. In FIG. 8, phantom squares are representative of virtual pixels where photosensitive devices are absent. In the pattern shown in FIG. 8, R and B may be replaced with each other. The filters of three primary colors R, G and B may be replaced with filters of complementary colors, if desired.

Figure 9A:
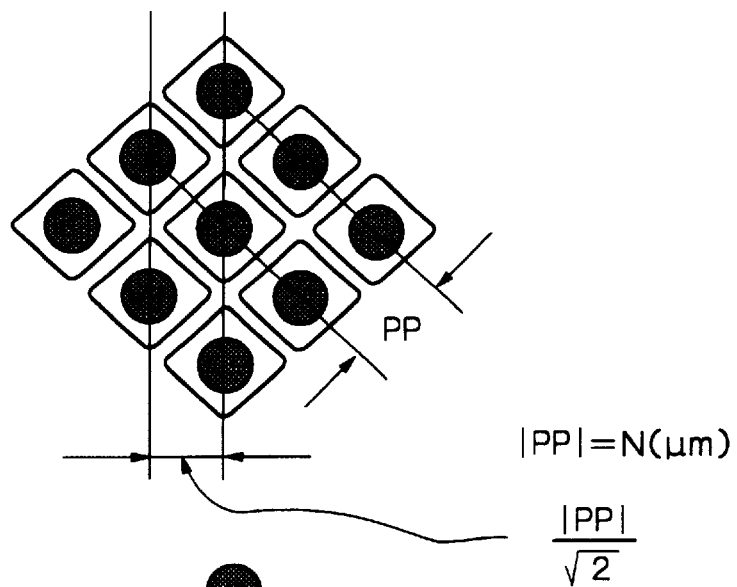
FIGS. 9A and 9B show a positional relation between a distance between nearby pixels in the honeycomb configuration of FIGS. 7A and 7B and interpolated pixels rearranged in a lattice configuration.
Figure 9B:
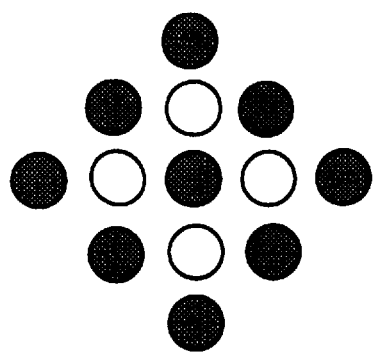

Assume that the square lattice arrangement has nearby pixels spaced by a distance of $|PP|=N$ $\mu$m in both of the horizontal and vertical directions. Then, the nearby pixels of the honeycomb arrangement are spaced by a distance of $N*(2)^{-1/2}$ shorter than the distance $|PP|$ (see FIG. 9A). With the honeycomb arrangement, therefore, it is possible to arrange the pixels more densely than with the square lattice arrangement. This, in principle, realizes a $(2)^{1/2}$ times higher resolution in both of the horizontal and vertical directions. When the honeycomb configuration is rearranged into the square lattice configuration matching with an output format, the calculation 121 performs interpolation with the virtual pixels represented by circles in FIG. 9B, on the basis of the pixels surrounding them and represented by dots in FIG. 9B. It will be seen that by rearranging the honeycomb configuration into the square lattice configuration while effecting interpolation, it is possible to achieve higher resolution than by simply arranging the photosensitive devices PD in the square lattice configuration.

Figure 10:
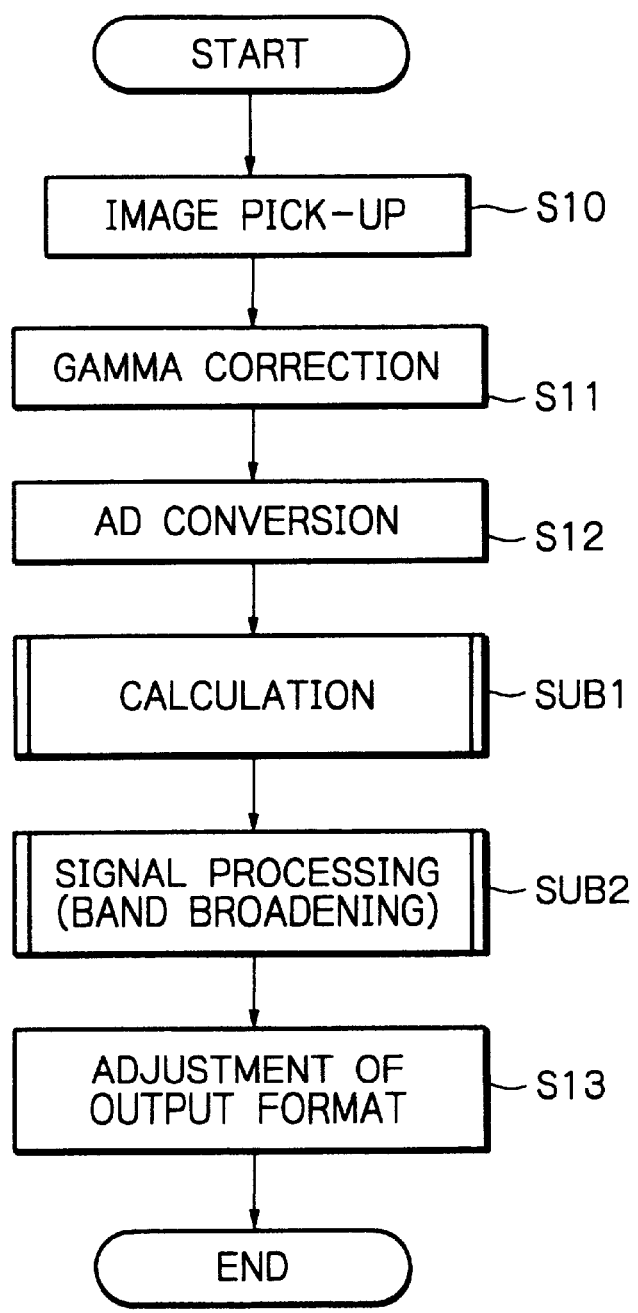
FIG. 10 is a flowchart demonstrating a specific main routine to be executed by the first embodiment.

A specific operation of the apparatus 10 will be described with reference to FIGS. 10–16H. FIG. 10 shows a main routine to be executed by the apparatus 10. As shown, the apparatus 10 picks up a subject in a step S10. Specifically, imagewise light is incident to the photosensitive devices PD via the color filters CF and apertures AP arranged bidimensionally. Each color filter CF has a particular spectral sensitivity characteristic. The photosensitive devices PD photoelectrically transform the incident light to thereby output corresponding electric signals. These signals are read out of the horizontal transfer registers, not shown, at the same time via the electrodes and vertical transfer registers VR and then applied to the color signal processing 12.

In the color signal processing 12, the gamma correction 12a executes gamma correction with the input signals (step S11). While the gamma correction 12a is shown as being located just after the image pick-up 11, it may be arranged within the signal processing 12c just before the output of the signal processing 12.

The AD converter 12b converts the signals output from the gamma correction 12a to digital data (step S12). The digital data, or pixel data, are fed to the calculation 121. The step S12 is followed by a subroutine SUB1 in which values $Y_h$ and $Y_{low}$ are calculated pixel by pixel on the basis of the raw pixel data by the $Y_h \cdot Y_{low}$ scheme. Low frequency and high frequency component signals are produced from the calculated pixel-by-pixel values $Y_h$ and $Y_{low}$. In a subroutine SB2 following the subroutine SB1, signal processing is so effected as to broaden the frequency range of each signal produced by the subroutine SUB1. As a result, data with an improved color resolution and an improved black/white resolution are output. These data are arranged in pixels, including virtual pixels, having a square lattice configuration.

Subsequently, signal processing is executed with the signals produced in the subroutine SUB2 such that the signals have an output format meeting the user's demand, e.g., a primary color signal format, a complementary color signal format or a chrominance signal and luminance signal format. With this signal processing, it is possible to transform the image of a subject picked up to an image having high resolution.

FIGS. 11–13E show the subroutine SUB1 in detail. In the subroutine SUB1, the calculation 121 executes $Y_h \cdot Y_{low}$ generation with, e.g., the raw pixel data fed from the AD conversion 12b. For the $Y_h \cdot Y_{low}$ generation, the pixel data read out by the low frequency component generation 121b are subjected to $Y_{low}$ processing matching with the color of the color filter in order to generate pixel data necessary for the generation of a low frequency component signal attaching importance to color reproducibility. Also, the pixel data read out by the high frequency component generation 121a are subjected to $Y_h$ processing in order to generate pixel data necessary for the generation of a high frequency component signal attaching importance to resolution. Such $Y_h \cdot Y_{low}$ generation is executed in accordance with flowcharts shown in FIGS. 11 and 12, as follows.

Assume a bidimensional honeycomb configuration shown in FIGS. 13A–13E that has five rows and four columns as a basic arrangement. In FIG. 13A, R, G and B are representative of the colors of the color filters CF while numerals added thereto are representative of positions in a matrix. Blocks indicated by solid lines and blocks indicated by phantom lines indicate actual pixels and virtual pixels, respectively. Briefly, the calculation is effected to determine $Y_h$ and $Y_{low}$ at each of the positions 00–33, i.e., at twenty different positions in total. The procedure shown in FIGS. 11 and 12 will be described in relation to some examples of the calculation procedure.

Figure 11:
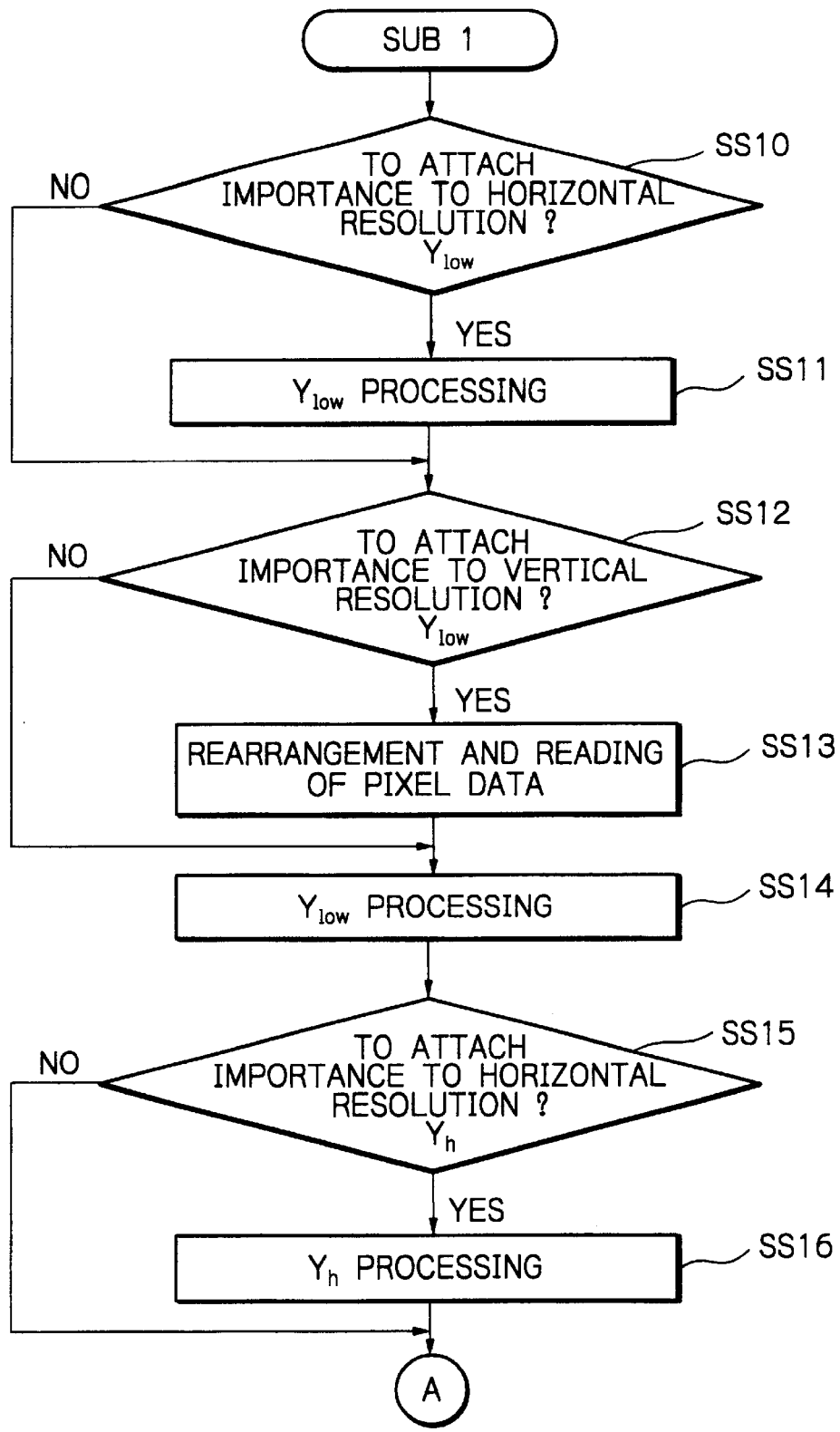
FIGS. 11 and 12 are flowcharts showing, in combination, a subroutine SUB1 included in the main routine in combination.

In FIG. 11, whether or not importance should be attached to horizontal resolution in the $Y_{low}$ processing is determined (substep SS10). If the answer of the substep SS10 is positive (YES), then the program advances to a substep SS11. If the answer of the substep SS10 is negative (NO), then the program advances to a substep SS12.

FIG. 13B shows an area lowG3 (dash-and-dot line) and an area lowRB3 (dash-and-dots line) each covering three rows and two columns and an area lowRB5 (dashed line) covering five rows and two columns. In the substep S11, by the $Y_{low}$ processing, pixel data at the virtual pixel positions between R and B or between G and G are interpolated by use of the pixel data lying in the two areas lowG3 and low RB3. Also, pixel data for R and B are calculated from the pixels lying in the area lowRB5. As for pixels G, the existing pixel data are used. Such data are used to generate low frequency signals. For example, a virtual pixel $Y_{low10}$ on a G row is produced by using pixel data $R_{00}$, $G_{11}$ and $B_{20}$, as follows:

$$Y_{low10}=0.3*R_{00}+0.59*G_{11}+0.11*B_{20} \qquad \text{Eq. (1)}$$

Pixel data $Y_{low22}$ on an R or a B row is produced by:

$$Y_{low22}=0.3*R_{22}+0.295*(G_{13}+G_{33})+0.055*(B_{02}+B_{42}) \qquad \text{Eq. (2)}$$

The pixel data so produced are written to, e.g., a memory.

In the substep SS12, whether or not importance should be attached to the vertical resolution in the $Y_{low}$ processing is determined. If the answer of the substep SS12 is YES, then the program advances to a substep SS13; if otherwise, the program advances to a substep SS15.

In the substep SS13, the previously stated basic arrangement is rearranged, and then the pixel data area read out. For example, the basic arrangement may be rotated by 90 degrees before the pixel data are read out. The substep SS13 is followed by a substep SS14. The substep SS14 is identical with the substep SS11 except that it includes an operation for finding the same relation as the pixel positions in the substep SS11 on the basis of the above pixel data. The resulting pixel data are stored in correspondence to the positions where they are read out. In the case where the reading positions are rotated, as stated above, the resulting pixel data may be rotated by 90 degrees in the opposite direction in order to restore the original arrangement before storage.

In the substep SS15, whether or not importance should be attached to the horizontal resolution in the $Y_h$ processing is determined. If the answer of the substep SS15 is YES, then the program advances to a substep SS16; if otherwise, the program advances to a step SS17, FIG. 12, via a transfer mark A.

FIG. 13C shows areas hRB5 (dash-and-dot lines) each covering five rows and one column, and areas hG3 and hRB3 (dashed lines) each covering three rows and one column. In the substep SS16, pixel data lying in the areas hRB5 are weighted in order to calculate pixel data located at the center of each area. Pixel data lying in the areas hG3 and hRB3 are used to interpolate pixel data at a virtual pixel position at the center of each area. As for pixels G, the existing pixel data are used. As a result, high frequency components in the horizontal direction are generated. The $Y_h$ processing attaches importance to the horizontal resolution. As for a solitary R or B pixel $Y_{h20}$ by way of example, pixel data $Y_{h20}$ is produced, by using five lines of pixel data $R_{00}$, $B_{20}$ and $R_{40}$ in the vertical direction, as follows:

$$Y_{h20} = 0.5 * B_{20} + 0.25 * (R_{00} + R_{40}) \quad \text{Eq. (3)}$$

By using the pixel data $R_{00}$ and $B_{20}$ adjoining a virtual pixel $Y_{h10}$, virtual pixel data $Y_{h10}$ is produced by:

$$Y_{h10} = 0.5 * (R_{00} + B_{20}) \quad \text{Eq. (4)}$$

Likewise, pixel data $Y_{h21}$ of a virtual pixel $Y_{h21}$ is produced by using pixel data $G_{11}$ and $G_{31}$ above and below the pixel $Y_{h21}$, as follows:

$$Y_{h21} = 0.5 * (G_{11} + G_{31}) \quad \text{Eq. (5)}$$

As for solitary pixels G, the existing pixel data are used. For example, pixel data $Y_{11}$ is directly implemented by $G_{11}$. The processing described so far is repeated over the entire imaging surface so as to determine the pixel data and virtual pixel data of the imaging surface with respect to the horizontal resolution.

Figure 12:
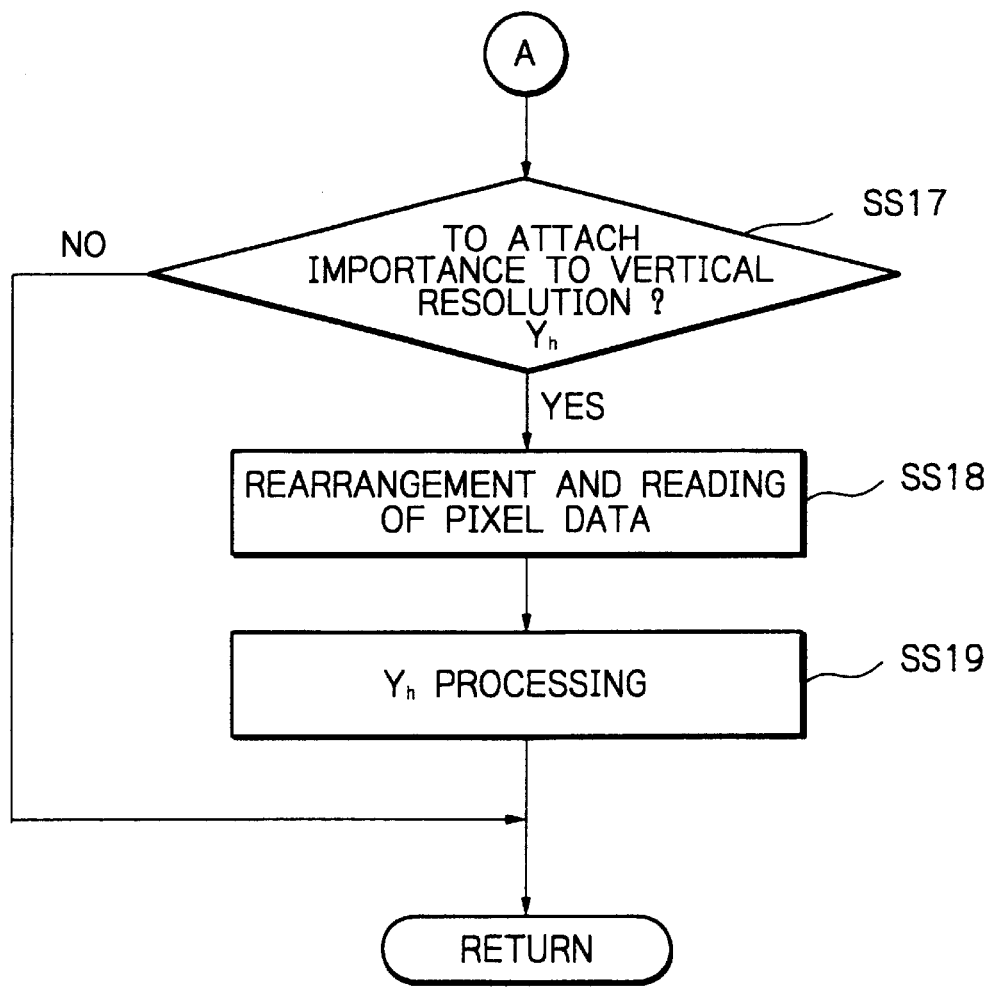

In the substep SS17 shown in FIG. 12, whether or not importance should be attached to the vertical resolution in the $Y_h$ processing is determined. If the answer of the substep SS17 is YES, then the program advances to a substep SS18; if otherwise, the program returns.

In the substep SS18, as in the substep SS13, the previously stated basic arrangement is rearranged, and then the pixel data are read out. For example, the basic arrangement may be rotated by 90 degrees before the pixel data are read out. The substep SS18 is followed by a substep SS19. The substep SS19 is identical with the substep SS14 except that it includes an operation for finding the same relation as the pixel positions in the substep SS16 on the basis of the above pixel data. The resulting pixel data are stored in, e.g., a memory. Again, in the case where the reading positions are rotated, the resulting pixel data may be rotated by 90 degrees in the opposite direction in order to restore the original arrangement before storage. FIGS. 13D and 13E show specific schemes generally used to read pixel data after the above rearrangement. As shown, the reading positions or the reading area is sequentially shifted, as indicated by dashed lines.

The above calculation procedure has concentrated on a single basic arrangement. When the procedure is to be effected over the entire image output from the image pick-up 11, the areas of the basic arrangement will be sequentially shifted little by little in the horizontal and/or vertical direction while confirming the coincidence of the above areas with the previously stated areas. In such a case, as for the peripheral regions of the image, the calculation may advantageously be effected in accordance with a preselected boundary condition.

After the subroutine SUB1, the program returns to the main routine. The subroutine SUB1 executes signal processing attaching importance to color and black/white (luminance) in the horizontal and vertical directions and thereby produces high frequency and low frequency component signals $Y_L$ and $Y_H$ in the horizontal and vertical directions. Because the data processing interpolates virtual pixels at the same time, the rearrangement into the square lattice configuration is also completed.

Reference will be made to FIGS. 14–16H for describing the subroutine SUB2 in detail. Briefly, the subroutine SUB2 broadens the frequency range of the luminance signals by using the high frequency and low frequency component signals output by the subroutine SUB1. The subroutine SUB2 includes pseudo addition processing and processing for preventing frequency bands from overlapping.

Figure 14:
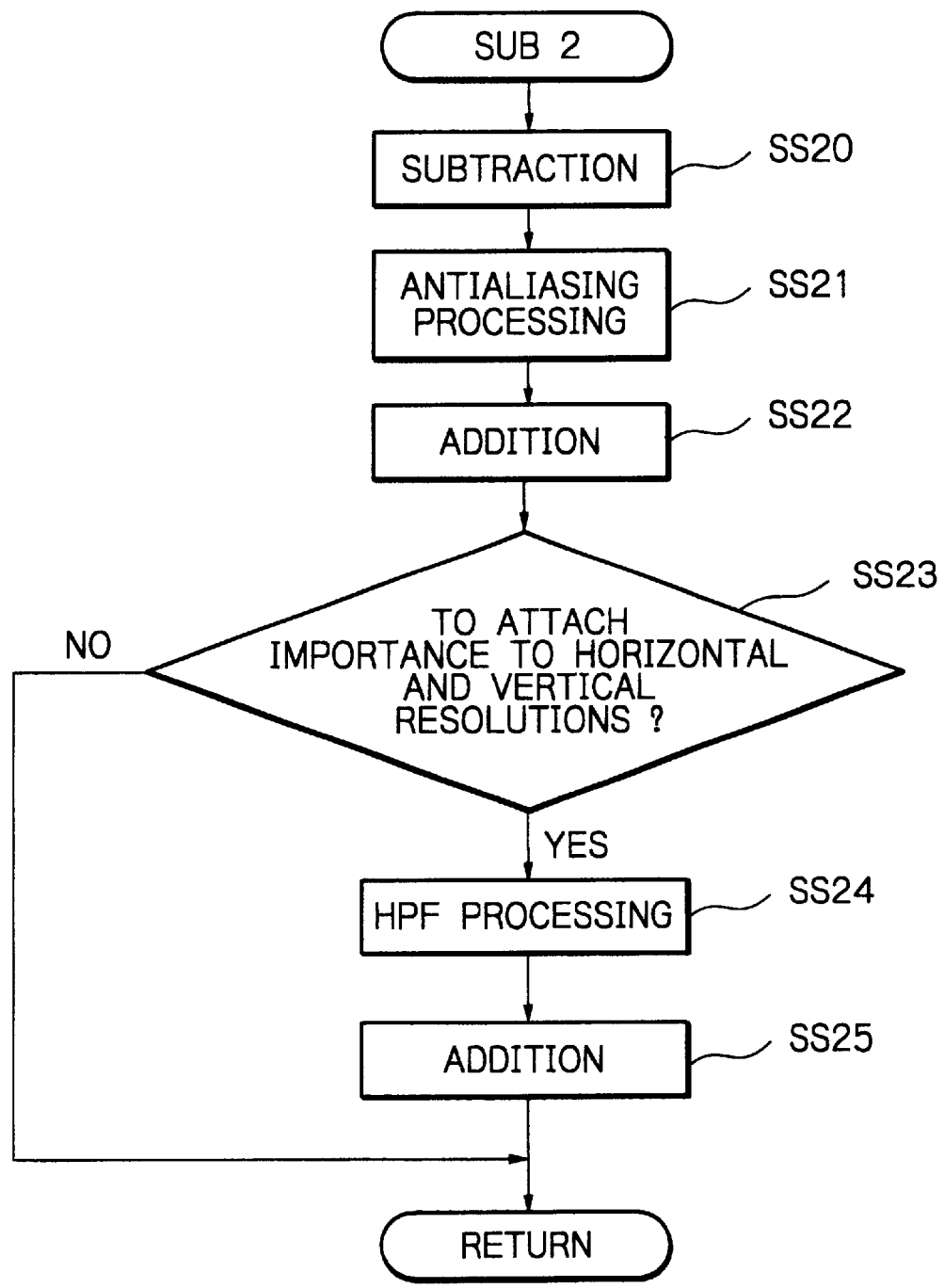
FIG. 14 is a flowchart showing a subroutine SUB2 included in the main routine in detail.

In a substep SS20 shown in FIG. 14, the high frequency component signal $Y_H$ attaching importance to resolution is subtracted from the low frequency component signal $Y_L$ so as to produce $(Y_L - Y_H)_{low}$. This corresponds to the operation of the adder 122a shown in FIG. 3. Subsequently, the antialiasing filter 122b executes processing for eliminating aliasing distortions with each of the output $(Y_L - Y_H)_{low}$ of the adder 122a and high frequency signal $(Y_H)$ (substep SS21). The filter 122b executes the same processing with the low frequency chrominance signals (R–Y) and (B–Y) also.

In a substep S22 following the substep SS21, the output $(Y_L - Y_H)_{low}$ and high frequency component signal $Y_H$ are added together (pseudo frequency addition). As a result, the luminance signal $(Y = (Y_L - Y_H)_{low} + Y_H)$ is broadened in frequency, as will be seen from the frequency allocation of FIGS. 4A–4C. In this sense, the pseudo addition processing may be considered to include the steps SS20–SS22.

Subsequently, whether or not processing attaching importance to resolution in both of the horizontal and vertical directions has been executed in the subroutine SUB1 is determined (substep SS23). If the answer of the substep SS23 is YES, then the program advances to a substep SS24. If the answer of the substep SS23 is NO, meaning that only one of the horizontal and vertical directions is taken into account, then the program returns. This selection is effected by the switch SW1.

Figure 15A:
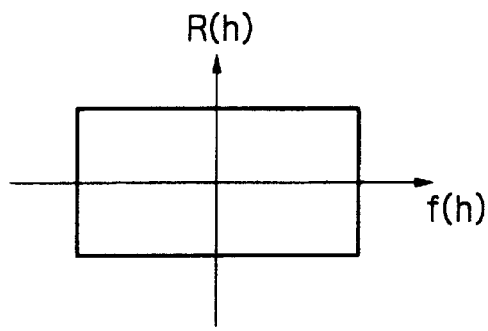
FIGS. 15A–15D show frequency distributions of signals derived from frequency overlap prevention included in the subroutine SUB2.
Figure 15B:
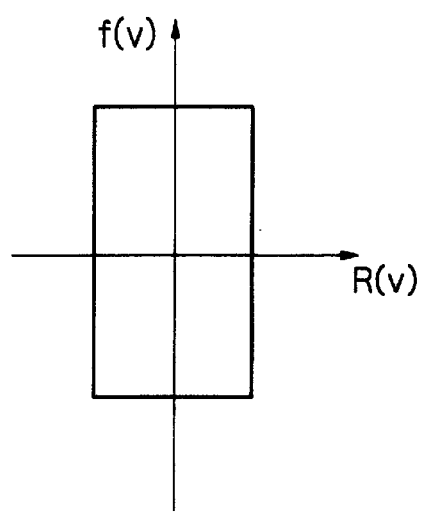
Figure 15C:
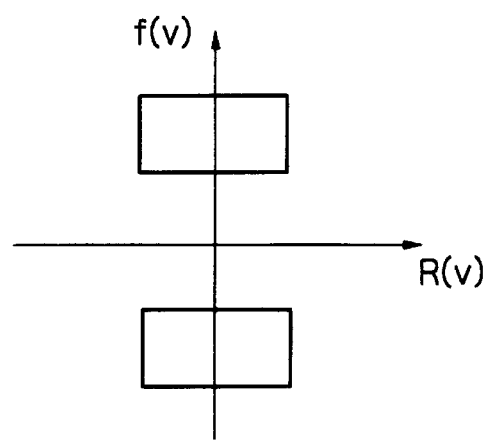
Figure 15D:
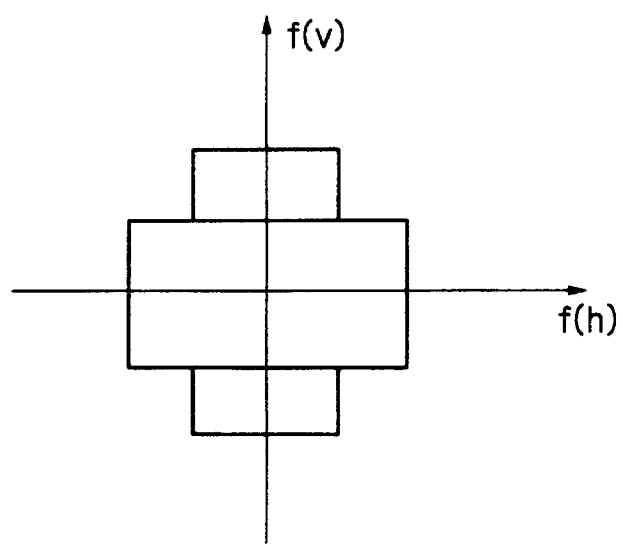

The signals attaching importance to the horizontal and vertical resolutions, respectively, and output by the substeps up to SS22 include the same frequency band. In the substep SS24, the same frequency band of the signal attaching importance to the vertical is limited. For example, when the frequency band of the high frequency component signal in the vertical direction should be limited, the switch SW2 switches the horizontal or vertical signal in such a manner as to transfer the component signal to the HPF 123a of the frequency overlap prevention 123, as shown in FIG. 5. The HPF 123a passes only the frequencies of the signal attaching importance to the vertical resolution that do not lie in the above same frequency band. FIGS. 15A and 15B show respectively, signals attaching importance to the horizontal and vertical resolutions; ordinate and abscissa in FIGS. 15A and 15B respectively indicate response levels R(h) and R(v) while abscissa and ordinate respectively indicate frequencies f(h) and f(v). FIG. 15C shows the frequency distribution of the signal attaching importance to the vertical resolution and passed through the HPF 123a.

In a substep SS25 following the substep SS24, the output of the HPF 123a and the other signal including the same frequency band, i.e., the high frequency component signal in the horizontal direction are added together. Specifically, when the horizontal or vertical component signal is plotted on the frequency axis f(h), f(v), the adder 123b adds the signals shown in FIGS. 15A and 15C to produce a frequency distribution shown in FIG. 15D. Therefore, despite that the component signals of opposite directions are superposed for broadening the frequency band of the image signal, the resulting image is free from disturbance and achieves a high resolution. On completing the subroutine SUB2, the program returns to the step S13, FIG. 10.

Figure 16A:
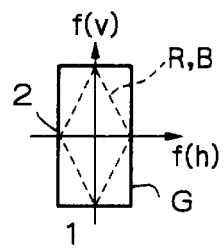
FIGS. 16A–16H show frequency distributions comparing a conventional square lattice pattern and a honeycomb pattern (G stripe, RB full-checker pattern) of the present invention.

The prevention of the overlap of frequency bands is effected by the above substeps SS24 and SS25. The broadening of the frequency band of the component signal on a pixel basis can be checked in terms of the horizontal or vertical frequency distribution. For comparison, assume a G square lattice pattern and an RB full-checker pattern shifted by half a pitch from the G square lattice (shifted pixel G square, RB full-checker pattern or honeycomb G square, RB full-checker pattern hereinafter). FIG. 16A shows the frequency distributions of the above two patterns and corresponding frequency distributions appearing when the high-frequency signals $Y_H$ are generated. When the conventional square lattice G stripe, RB full-checker pattern having 1,500,000 pixels is used as a reference for comparison, the RGB pattern is represented by a frequency pattern shown in FIG. 16A, delimited by on the horizontal frequency axis f(h) and by "1" on the vertical frequency axis f(v).

Figure 16B:
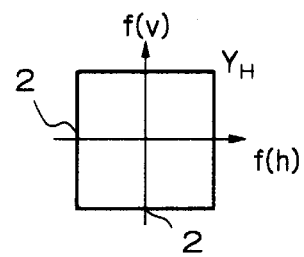
Figure 16C:
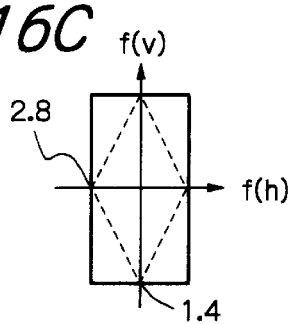
Figure 16D:
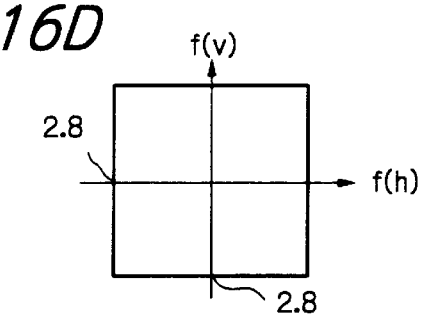

When a high frequency component signal $Y_H$ is produced from the pattern of FIG. 16A, it has a square frequency distribution shown in FIG. 16B, delimited by "2" on both axes f(h) and f(v). As shown in FIG. 16C, when the number of pixels is doubled to 3,000,000, the frequency distribution is $2^{1/2}$ times greater than the reference, i.e., it is delimited by "2.8" on the horizontal frequency axis f(h) and by "1.4" on the vertical frequency axis f(v). The high frequency component signal $Y_H$ has a broadened frequency band, as shown in FIG. 16D.

Figure 16E:
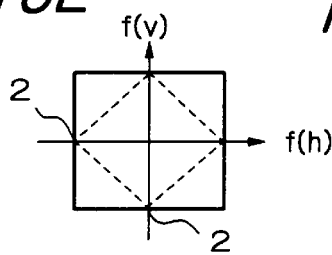
Figure 16F:
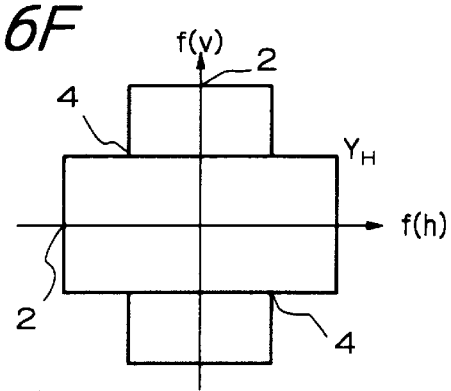
Figure 16G:
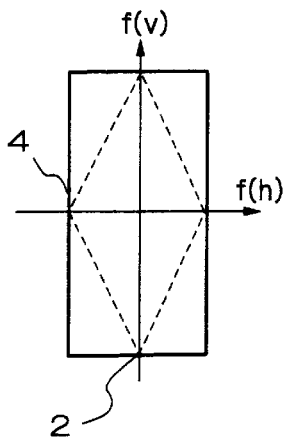
Figure 16H:
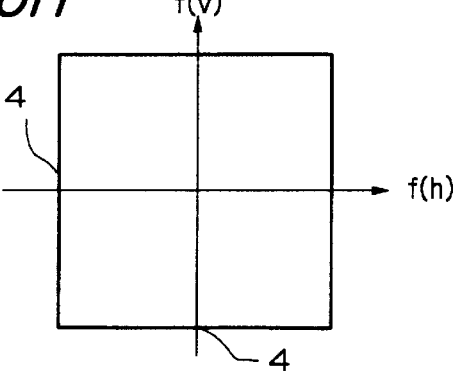

By contrast, assume that the non-square (honeycomb) lattice is arranged in the shifted pixel G square, RB full-checker pattern having 3,000,000 pixels and implemented by a single image sensor. Then, a frequency distribution shown in FIG. 16E, is delimited by "2" on both axes f(h) and f(v). The resulting high frequency component signal $Y_H$ has a frequency distribution shown in FIG. 16F, delimited by "4" on both axes f(h) and f(v) in the portion where the horizontal and vertical components intersect each other. This stems from the pseudo frequency addition discussed earlier. Such a frequency distribution is equivalent to the frequency distribution of the high frequency component signal $Y_H$ available when the number of pixels is increased to 6,000,000 and the values on the horizontal and vertical axes f(h) and f(v) are "4" and "2" respectively (see FIGS. 16G and 16H).

As stated above, the illustrative embodiment enhances image quality with a suppressive number of pixels. For high image quality, the illustrative embodiment uses a unique arrangement of pixels and broadens the frequency band of component signals produced by processing raw pixel data output from the photosensitive devices having the unique arrangement.

The $Y_h \cdot Y_{low}$ generating method used in the substep SUB1 for generating $Y_h$ pixel data attaching importance to the horizontal or vertical resolution is only illustrative. For example, an arrangement may be made such that pixel data corresponding to R and B of the color filters CF are directly used, in which case pixel data on rows or columns adjoining virtual pixels will be weighted for interpolation. Assume that in the honeycomb basic arrangement shown in FIGS. 13A–13E, R and B pixel data are directly used, and pixel data above and below virtual pixels are used for interpolation. Then, values $Y_h$ at the following specific pixel positions and virtual pixel positions are produced by:

$$Y_{h00}=R_{00}$$

$$Y_{h01}=0.5*G_{11}+0.5*G_{11}*Y_{h02}$$

$$Y_{h02}=B_{02}$$

$$Y_{h03}=0.5*G_{13}+0.5*G_{13}$$

$$Y_{h10}=0.5*R_{00}+0.5*B_{20}$$

$$Y_{h11}=G_{11}$$

$$Y_{h12}=0.5*B_{02}+0.5*R_{22}$$

$$Y_{h13}=G_{13} \hspace{2cm} \text{Eq. (6)}$$

When the R and B pixel data are directly used, and pixel data at the right and left of virtual pixels are used for interpolation, $Y_{h10}=0.5*G_{11}+0.5*G_{11}$ and $Y_{h12}=0.5*G_{11}+0.5*G_{13}$ are calculated while $Y_{h00}$, $Y_{h01}$, $Y_{h02}$, $Y_{h03}$, $Y_{h11}$ and $Y_{h13}$ are produced by the above equations.

Another specific procedure for calculating the values $Y_h$ is as follows. At the time of calculation of, e.g., $Y_{h22}$, only four pixel data $G_{11}$, $G_{13}$, $G_{31}$ and $G_{33}$ corresponding to four of the G color filters positioned obliquely above and obliquely below are used to detect correlations for thereby calculating correction values $|G_{11}-G_{33}|$ and $|G_{13}-G_{31}|$. Then, by using pixel data having a greater correlation value than the other pixel data, linear interpolation is effected to calculate $Y_{h22}$. Such a procedure is repeated with pixel data corresponding in positional relation to the above pixel data, thereby producing $Y_h$. Then, this $Y_h$ is used to calculate another pixel. At this instant, correlations are detected in such a manner as to determine the pixel data of a virtual pixel position surrounded by the above three pixel data. This is followed by linear interpolation based on the result of the second correlation detection. In this manner, the values $Y_h$ of all the pixels and virtual pixels in the entire pattern are calculated. If desired, the second linear interpolation may be replaced with executing a weighting and averaging procedure with the pixel data of the virtual pixel position surrounded by the three pixel data by use of four pixel data.

The illustrative embodiment rearranges the pixels in a square lattice configuration at the image data generation stage. Alternatively, there may be used a sequence of steps of broadening the frequency band of pixel data output from the photosensitive devices, interpolating pixel data for virtual pixel positions by use of the broadened image data in order to increase the pixel data, and rearranging the resulting image data in a square lattice configuration.

Second Embodiment

Figure 17:
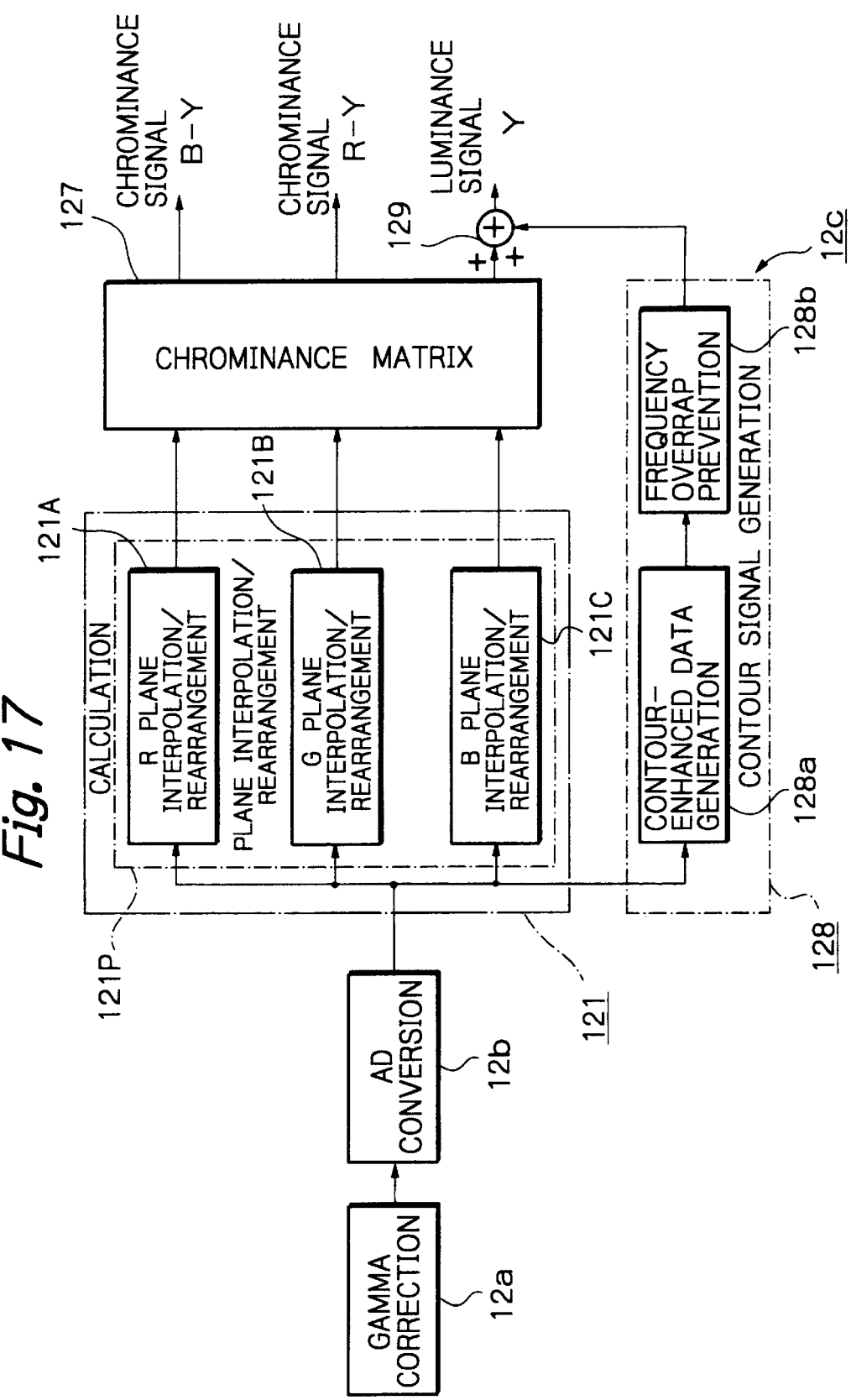
FIG. 17 is a schematic block diagram showing a second embodiment of the solid-state imaging apparatus in accordance with the present invention.

Referring to FIGS. 17–23, a second embodiment of the present invention will be described. In the illustrative embodiment, data are produced from non-square lattice pixels corresponding to the honeycomb apertures AP of the image pick-up 11 not shown. An index picture may be added to the raw data output from the image pick-up 11. The image pick-up 11 feeds its output signals to the gamma correction 12a included in the color signal processing 12, not shown, in the same manner as in the first embodiment. As shown in FIG. 17, the gamma correction 12a delivers its output signals to the AD conversion 12b. The AD conversion 12b digitizes the input analog signals and feeds the resulting digital signals to the signal processing 12c. The signal processing 12c of this embodiment differs in construction from the signal processing 12c of the previous embodiment. Specifically, the signal processing 12c includes a plane interpolation/rearrangement 121P, a chrominance matrix 127, a contour signal generation 128, and an adder 129.

The gamma correction 12a feeds data subjected to gamma correction to the plane interpolation/rearrangement 121P and contour signal generation 129 of the calculation 121. The plane interpolation/rearrangement 121P interpolates and rearranges, paying attention to each of the primary colors R, G and B, the input data into three component signals in the form of plane data including the color data of virtual pixel positions, giving consideration to color reproducibility. The plane interpolation/rearrangement 121P is made up of an R plane, a G plane and a B plane interpolation/rearrangement 121A, 121B and 121C responsive to R, G and B, respectively. The operation of the plane interpolation/rearrangement 121P will be described in detail later.

The chrominance matrix 127 generates chrominance signals and a luminance signal on the basis of the three component signals output from the plane interpolation/rearrangement 121P.

The contour signal generation 128 has a contour-enhanced data generation 128a and a frequency overlap prevention 128b. The contour-enhanced data generation 128a produces from the data output from the AD conversion 12b pixel data from which the high frequency component signal $Y_H$ will be derived. Such pixel data may be produced from the input pixel data by use of the $Y_h$ calculation part of the $Y_h \cdot Y_{low}$ scheme. At the time of generation of the pixel data, the contour-enhanced data generation 128a rearranges the data in a square lattice configuration and feeds the rearranged data to the frequency overlap prevention 128b. Assume that the prevention 128b receives signals respectively attaching importance to the horizontal and vertical resolutions, and that the signals opposite in direction include the same frequency band. Then, the prevention 128b limits the same frequency band of either one of the two signals, combines the band-limited signal and the other signal, and delivers the resulting combined signal to the adder 129. The signal output from the prevention 128b is used to enhance a contour by the high frequency component signal $Y_H$ of the first embodiment.

The adder 129 adds the output of the contour signal generation 128 and the luminance signal output from the chrominance matrix 127. As a result, the contour of the luminance signal is enhanced.

Figure 22:
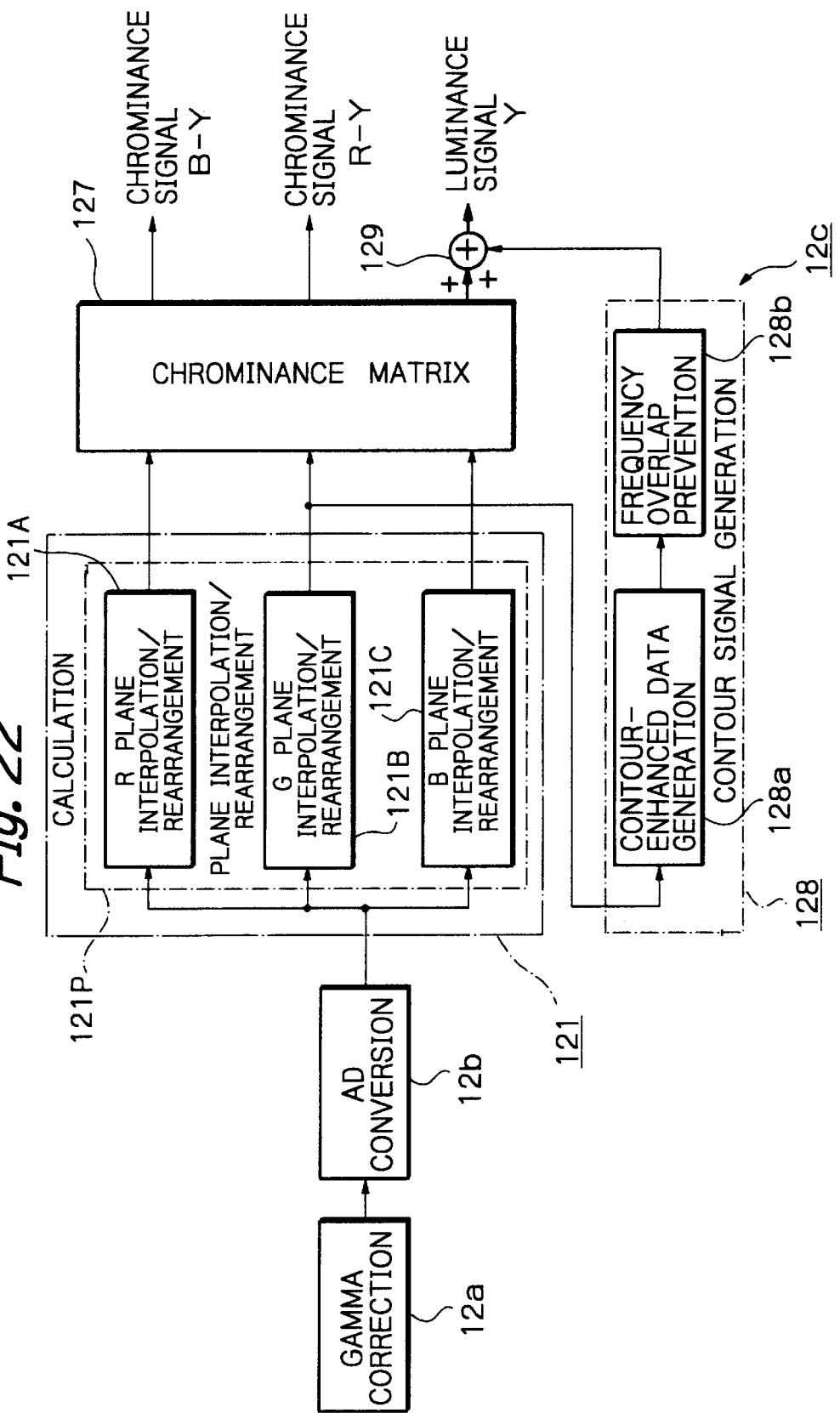
FIG. 22 is a schematic block diagram showing a modification of the second embodiment.
Figure 23:
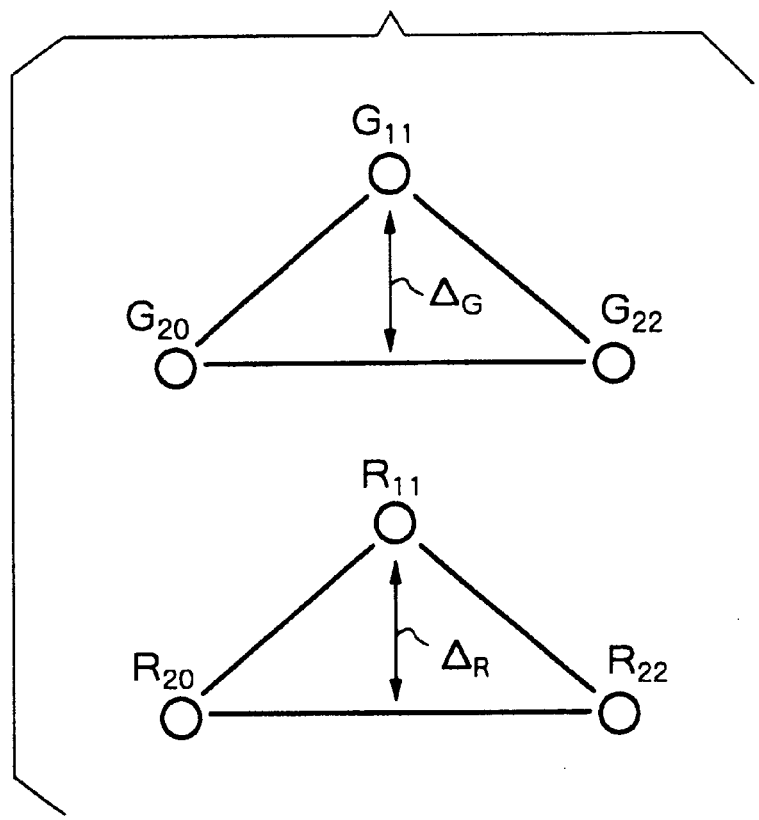
FIG. 23 shows an alternative calculation procedure included in the subroutine SUB3 of FIG. 19.

If desired, the contour signal generation 128 may detect correlations out of only the G pixel data, effect interpolation with the data higher in correlation than the other data, and generate a component signal attaching importance to resolution out of the resulting data (see FIG. 22). When such a component signal is added to the luminance signal, the resulting image will have its contour enhanced.

A specific operation of the signal processing 12c will be described with reference to FIGS. 18–21. Let the previously stated function assigned to the signal processing 12c be referred to as plane interpolation and rearrangement. For plane interpolation, the signal processing 12c interpolates a row (horizontal) or a column (vertical) including any one of the primary colors R, G and B to be processed by weighting and averaging pixel data. Also, the signal processing 12c interpolates a row or a column including the other colors by averaging the pixel data of a row or a column adjoining it.

Figure 18:
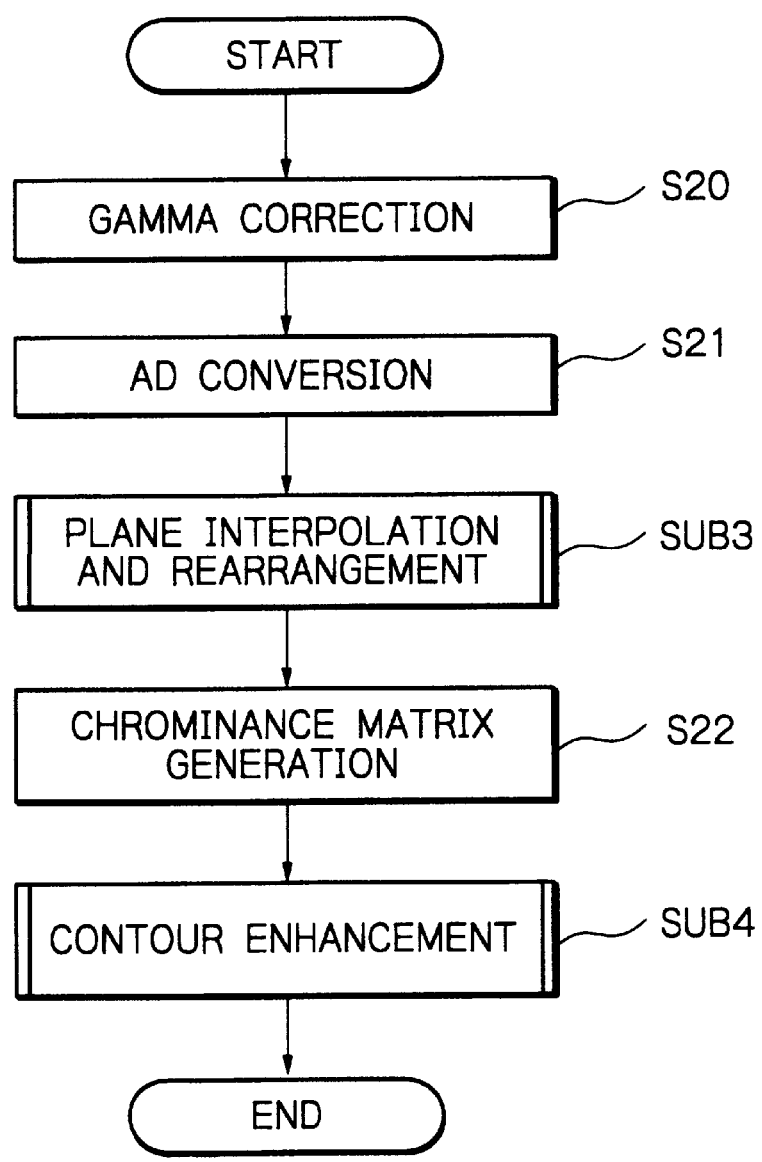
FIG. 18 is a flowchart showing a main routine particular to the second embodiment.

Specifically, as shown in FIG. 18, the gamma correction 12a executes gamma conversion with the signals output from the image pick-up 11 (step S20). The AD conversion 12b digitizes the signals output from the gamma conversion (step S21). In a subroutine SUB3 following the step S21, digital data output from the AD conversion 12b are subjected to plane interpolation and rearrangement color by color. Then, the values $Y_{low}$ of the rearranged positions are calculated color by color so as to produce signals corresponding to the values $Y_{low}$.

Subsequently, the chrominance matrix 127 generates chrominance signals (B−Y) and (R−Y) and a luminance signal Y based on the signals input thereto (step S22). The step S22 is followed by a subroutine SUB4 for enhancing the contour of the luminance signal Y. By the contour enhancement, it is possible to output the image data picked up as high quality signals.

Figure 19:
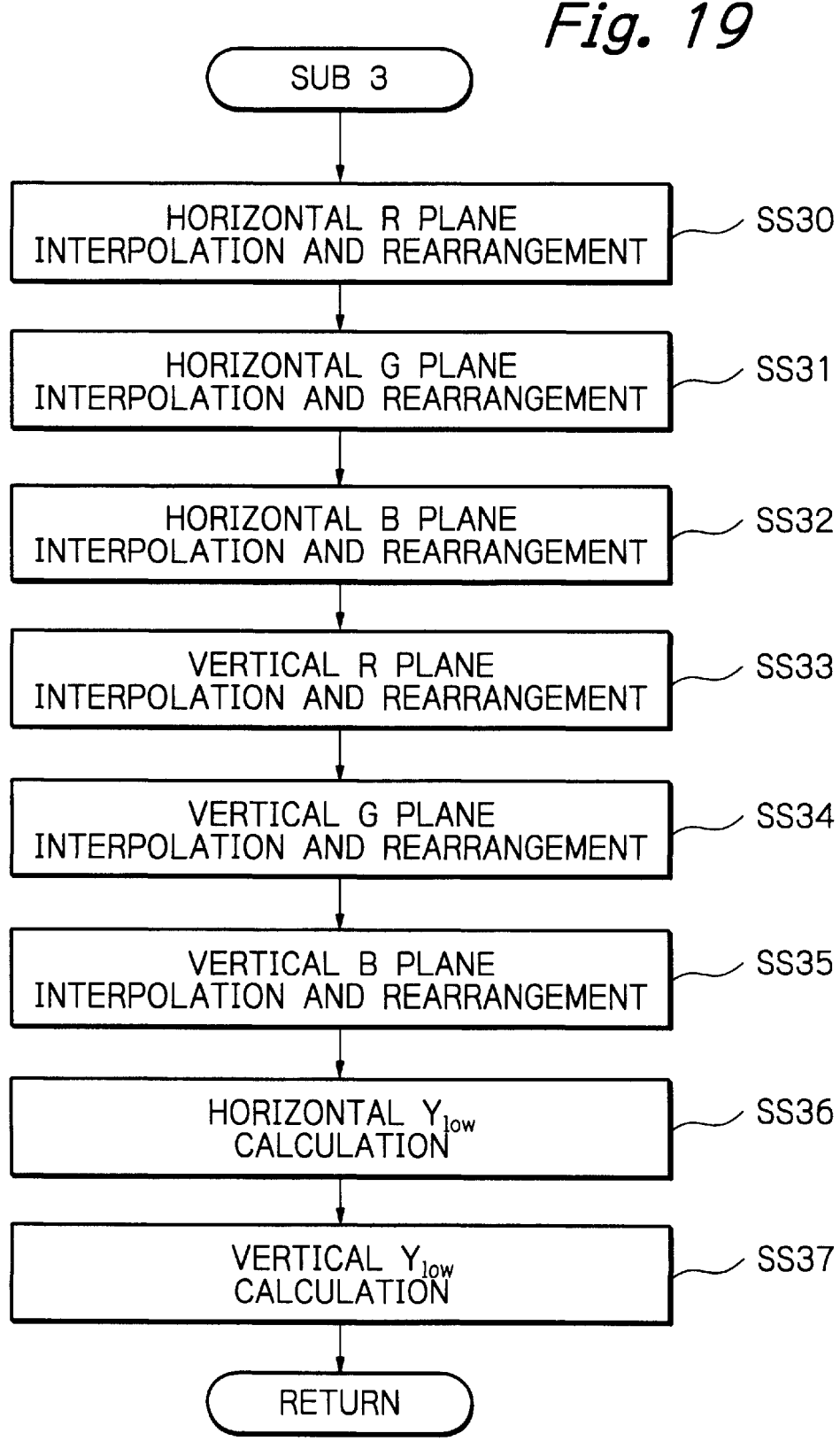
FIGS. 19 and 20 are flowcharts respectively showing subroutines SUB3 and SUB4 included in the main routine of FIG. 18 in detail.

FIG. 19 shows the subroutine SUB3 in detail. As shown, horizontal interpolation and rearrangement is effected with respect to the R plane (substep SS30). The interpolation is such that a row including R to be processed is interpolated by weighted and averaged pixel data while a row including the other colors, i.e., not including R is interpolated by the averaged pixel data of a row adjoining it. Specifically, assuming a specific basic arrangement shown in FIG. 21 (five rows and five columns), the R plane interpolation/rearrangement 121A performs the following exemplary calculations:

$$R_{low00H} = R_{00}$$

$$R_{low01H} = (3*R_{00} + R_{04})/4$$

$$R_{low02H} = (2*R_{00} + 2*R_4)/4$$

$$R_{low03H} = (R_{00} + 3*R_4)/4$$

$$R_{low04H} = R_{04} \qquad \text{Eq. (7)}$$

Subsequently, horizontal interpolation and rearrangement is executed with respect to the G plane (substep SS31). The interpolation is such that a row including G to be processed is interpolated by weighted and averaged pixel data while a row including the other colors, i.e., not including G is interpolated by the averaged pixel data of a row adjoining it. Specifically, assuming the specific basic arrangement shown in FIG. 21, the G plane interpolation/rearrangement 121B performs the following exemplary calculations:

$$G_{low00H} = G_{11}/3$$

$$G_{low01H} = G_{11}/2$$

$$G_{low02H} = (G_{11} + G_{13})/4$$

$$G_{low03H} = G_{13}/2$$

$$G_{low04H} = G_{13}/3$$

$$G_{low10H} = G_{11}/2$$

$$G_{low11H} = G_{11}$$

$$G_{low12H} = (G_{11} + G_{13})/2$$

$$G_{low13H} = G_{13}$$

$$G_{low14H} = G_{13}/3 \qquad \text{Eq. (8)}$$

In a substep SS32 following the substep SS31, horizontal interpolation and rearrangement is executed with respect to the B plane. The interpolation is such that a row including B to be processed is interpolated by weighted and averaged pixel data while a row including the other colors, i.e., not including B is interpolated by the averaged pixel data of a row adjoining it. Specifically, assuming the specific basic arrangement shown in FIG. 21, the B plane interpolation/rearrangement 121C performs the following exemplary calculations:

$$B_{low00H} = B_{02}/3$$

$$B_{low01H} = B_{02}/2$$

$$B_{low02H}=B_{02}$$

$$B_{low03H}=B_{02}/2$$

$$B_{low04H}=B_{02}/3$$

$$B_{low10H}=(3*B_{20}+B_{02})/4$$

$$B_{low11H}=(3*B_{20}+2*B_2)/4$$

$$B_{low12H}=B_{02}/2$$

$$B_{low13H}=(2*B_{02}+3*B_{24})/4$$

$$B_{low14H}=2*B_{02}/3 \quad \text{Eq. (9)}$$

In substeps SS33–SS35 following the substep SS32, vertical interpolation and rearrangement is effected. The interpolation is such that a column including any one of R, G and B to be processed is interpolated by weighted and averaged pixel data while a column not including the above color is interpolated by the averaged pixel data of a column adjoining it. First, in the substep SS33, vertical interpolation and rearrangement is effected with respect to the R plane. That is, a column including R to be processed is interpolated by weighted and averaged pixel data while a column including the other colors, i.e., not including R is interpolated by the averaged pixel data of a column adjoining it. Specifically, assuming the specific basic arrangement shown in FIG. 21, the R plane interpolation/rearrangement 121A performs the following exemplary calculations:

$$R_{low00v}=R_{00}$$

$$R_{low10v}=(3*R_{00}+R_{40})/4$$

$$R_{low20v}=(2*R_{00}+2*R_{40})/4$$

$$R_{low30v}=(R_{00}+3*R_{40})/4$$

$$R_{low40v}=R_{40} \quad \text{Eq. (10)}$$

Subsequently, vertical interpolation and rearrangement is executed with respect to the G plane (substep SS34). The interpolation is such that a column including G to be processed is interpolated by weighted and averaged pixel data while a column including the other colors, i.e., not including G is interpolated by the averaged pixel data of a column adjoining it. Specifically, assuming the specific basic arrangement shown in FIG. 21, the G plane interpolation/rearrangement 121B performs the following exemplary calculations:

$$G_{low00v}=G_{11}/3$$

$$G_{low10v}=G_{11}/2$$

$$G_{low20v}=(G_{11}+G_{31})/4$$

$$G_{low30v}=G_{31}/2$$

$$G_{low40v}=G_{31}/3$$

$$G_{low01v}=G_{11}/2$$

$$G_{low11v}=G_{11}$$

$$G_{low21v}=(G_{11}+G_{31})/2$$

$$G_{low31v}=G_{31}$$

$$G_{low41v}=G_{31}/3 \quad \text{Eq. (11)}$$

In the substep SS35, vertical interpolation and rearrangement is executed with respect to the B plane. The interpolation is such that a column including B to be processed is interpolated by weighted and averaged pixel data while a column including the other colors, i.e., not including B is interpolated by the averaged pixel data of a column adjoining it. Specifically, assuming the specific basic arrangement shown in FIG. 21, the B plane interpolation/rearrangement 121C performs the following exemplary calculations:

$$B_{low00v}=B_{20}/3$$

$$B_{low10v}=B_{20}/2$$

$$B_{low20v}=B_{20}$$

$$B_{low30v}=B_{20}/2$$

$$B_{low40v}=B_{20}/3$$

$$B_{low01v}=(3*B_{02}+B_{20})/4$$

$$B_{low11v}=(3*B_{02}+3*B_{20})/4$$

$$B_{low21v}=B_{20}/2$$

$$B_{low31v}=(3*B_{20}+3*B_{42})/4$$

$$B_{low41v}=B_{42}/2 \quad \text{Eq. (12)}$$

Subsequently, in a substep SS36, the calculation 121 generates data representative of horizontal luminance signals $Y_{LH}$ attaching importance to accurate color reproducibility. The luminance signals ($Y_{LH}$), i.e., values $Y_{low}$ are produced from the position-by-position values $R_{low}$, $G_{low}$ and $B_{low}$ calculated by the above procedure, as follows:

$$Y_{low}=0.3*R_{low}+0.5*R_{low}+0.11*B_{low} \quad \text{Eq. (13)}$$

That is, the above luminance signals $Y_{LH}$ are calculated by use of R, G and B subjected to plane interpolation in the substeps SS30–SS32.

In a substep SS37 following the substep SS36, the calculation 121 generates data representative of vertical luminance signals $Y_{LV}$ attaching importance to accurate color reproducibility. In this case, the luminance signals $Y_{LV}$ are calculated by use of R, G and B subjected to plane interpolation in the substeps SS33–SS35.

The data calculated by the procedure described so far are input to the chrominance matrix 127. After the substep SS37, the program ends the subroutine SUB3 and returns. In this manner, the data at virtual pixel positions between adjoining R, G and B are calculated at the same time as the R, G and B interpolation and rearrangement. While the subroutine SUB3 directly executes horizontal or vertical plane interpolation and rearrangement, whether or not to execute calculations for plane interpolation and rearrangement may be determined before each of the substeps SS30 and SS33.

In the step S22, the chrominance data (B−Y) and (R−Y) and luminance data Y are produced on the basis of the results of horizontal and vertical plane interpolation and rearrangement fed from the plane interpolation/rearrangement 121P, as stated earlier. This processing is assigned to the chrominance matrix 127 and followed by a subroutine SUB4.

Figure 20:
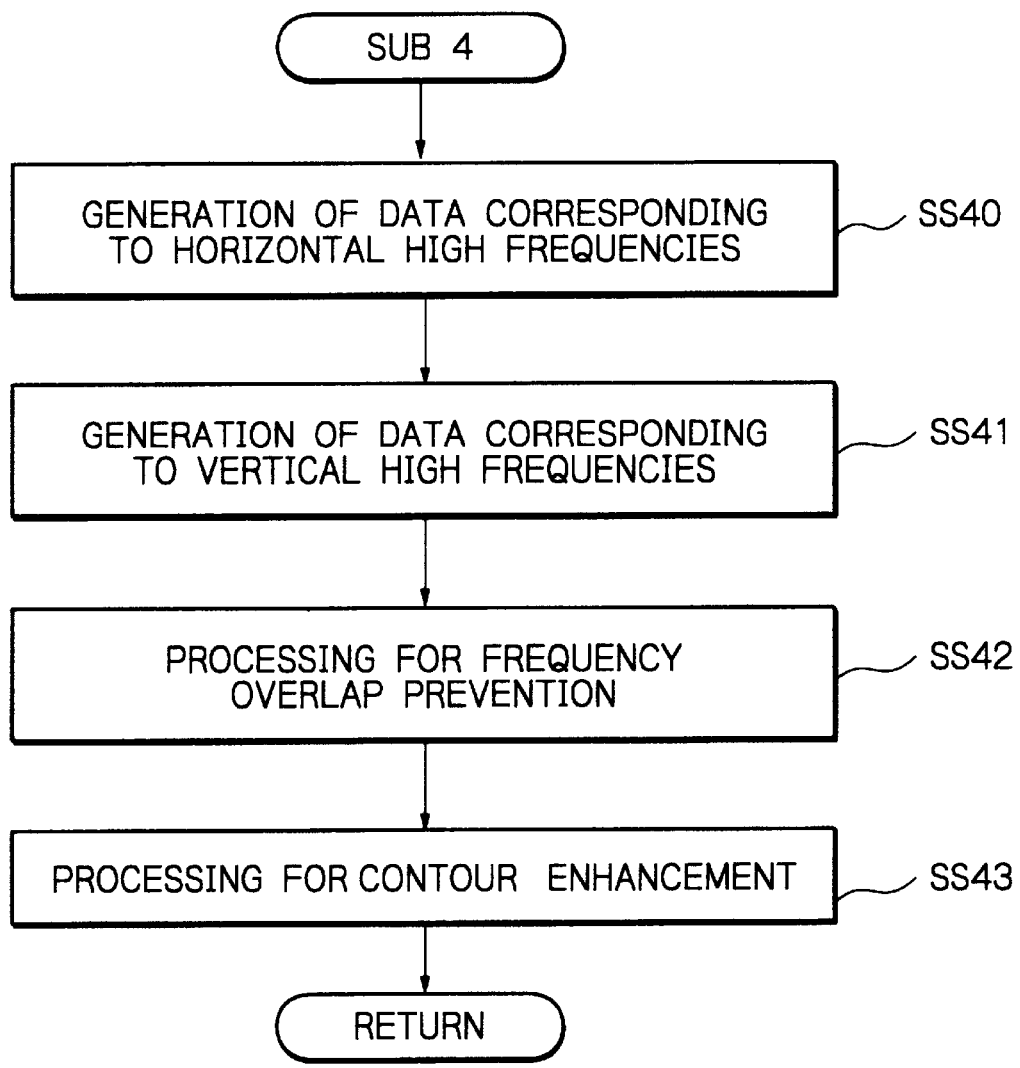

FIG. 20 shows the subroutine SUB4 for generating high frequency component signals $Y_H$ in the horizontal and/or vertical direction. The subroutine SUB4 is executed by the contour signal generation 128. First, in a substep SS40, pixel data corresponding to high frequency components in the horizontal direction are generated. The substep SS40 includes only the $Y_h$ part of the $Y_h \cdot Y_{low}$ procedure used in the subroutine SUB1. The actual procedure is the same as in the first embodiment and will not be described in order to avoid redundancy (see FIG. 13C).

In a substep SS41 following the substep SS40, pixel data corresponding to high frequency components in the vertical direction are generated. Assume that signals in both of the horizontal and vertical directions are produced by the substeps up to the substep SS41. Then, in a substep SS42, the frequency band of either one of the signals is limited in order to avoid the overlap of the frequency bands. The signal with the limited frequency band and the other signal are combined and then applied to the adder 129.

Subsequently, in a substep SS43 for contour enhancement the adder 129 adds the luminance signal Y output from the chrominance matrix 127 and the high frequency component signal attaching importance to the horizontal and/or vertical resolution and output from the contour signal generation 128. As a result, the luminance signal output from the adder 129 has an enhanced contour. In this manner, contour enhancement is executed with each of the luminance signals Y derived from the color-by-color (R, G and B) plane rearrangement. After the substep SS43, the program returns.

For contour enhancement, signals for contour enhancement may be generated on the basis of the outputs of the G plane interpolation/rearrangement 121B input to the contour signal generation 128, as follows. As shown in FIG. 22, the contour signal generation 128 first detects correlations by using only G pixel data, as shown in FIG. 22. In FIG. 22, blocks identical with the blocks shown in FIG. 17 are designated by like reference numerals. The contour signal generation 128 executes interpolation by using data having a higher correlation value and produced next. Such interpolation is also executed with virtual pixels in the square lattice configuration. This interpolation procedure is identical with the interpolation procedure described in relation to the calculation 121. The resulting pixel data are input to the frequency overlap prevention 128b. The prevention 128b outputs a signal containing high frequency signal components attaching importance to both of the horizontal and vertical resolutions. This signal is fed to the adder 129 shown in FIG. 22. Again, the adder 129 enhances the contour of the luminance signal Y by executing the substep SS43, FIG. 20.

Another specific method available for effecting plane interpolation and rearrangement using raw image data output from the image pick-up 11 is as follows. Briefly, the method determines the rearrangement of R and B by using G. Generally, the variation of the level of the G signal has noticeable influence on the variation of the luminance of a video signal, as well known in the art. The alternative method is based on the fact that the rearrangement of R and B reflects the influence of the G signal. The principle of this method will be outlined with reference to FIG. 23. As shown, assume that unknown $R_{11}$ should be determined by R plane interpolation and rearrangement. Then, use is made of known signal levels $G_{20}$, $G_{11}$, $G_{22}$, $R_{20}$ and $R_{22}$. For interpolation, a weighted mean G of $G_{20}$ and $G_{22}$ and a weighted mean $\Delta_R$ of $R_{20}$ and $R_{22}$ are equal to each other ($\Delta_G = \Delta_R$). Because the weighting coefficients are known, the above relation allows unknown pixel data $R_{11}$ to be easily calculated. Such a calculation is repeated to effect R plane interpolation and rearrangement. This is also true with the B signal.

The illustrative embodiment executes matrix processing by R, G and B plane interpolation and rearrangement, as stated above. In the case where contour enhancement is not effected, the procedure of the first embodiment may be executed to produce the data $Y_h$ pixel by pixel by the $Y_h \cdot Y_{low}$ scheme, thereby outputting an exclusive high frequency component signal for implementing contour enhancement. This is also successful to improve the resolution of an image.

Third Embodiment

Figure 24:
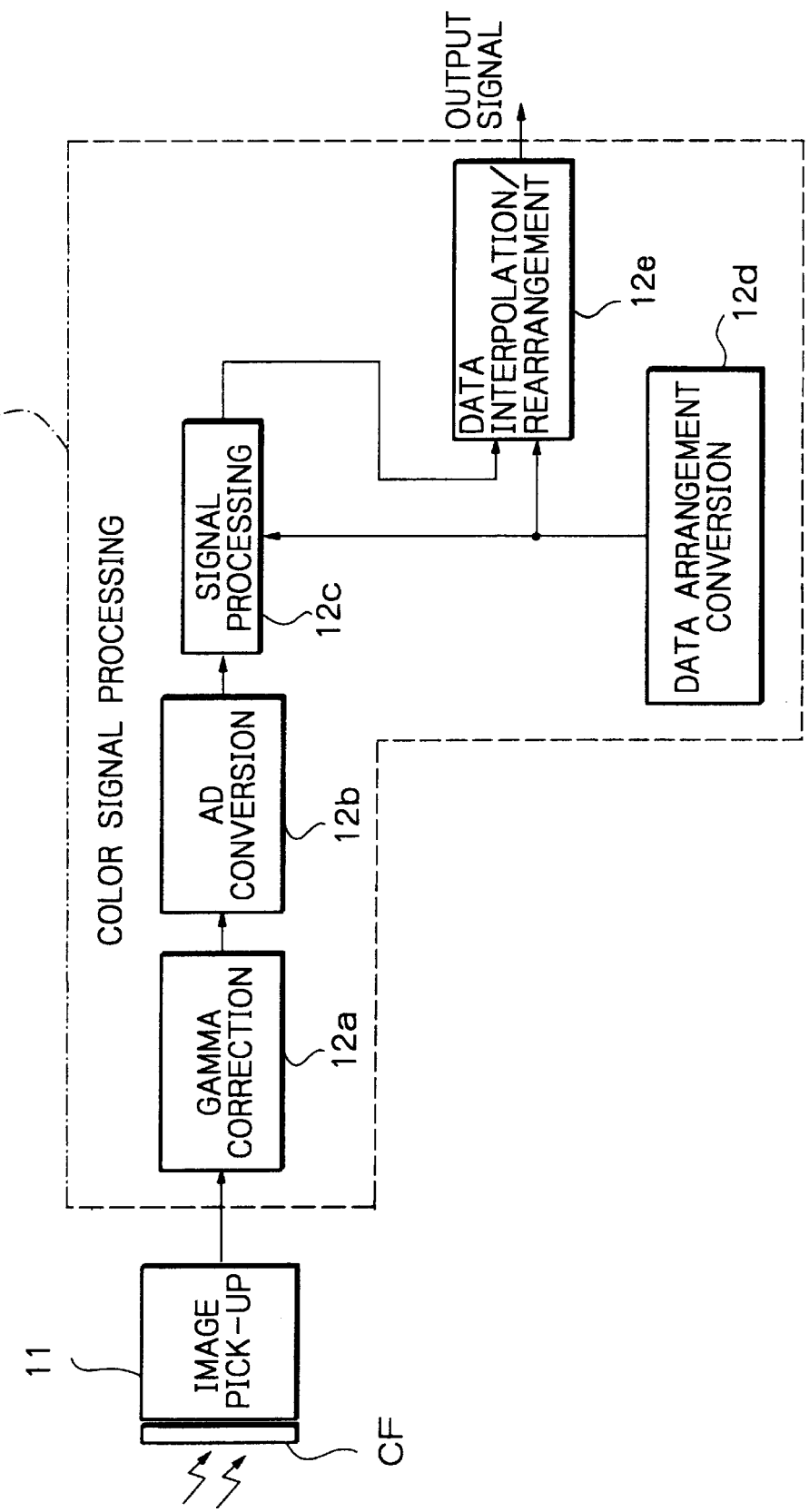
FIG. 24 is a schematic block diagram showing a third embodiment of the solid-state imaging apparatus in accordance with the present invention.

In a third embodiment, the apertures AP of the image pick-up 11 are shifted by preselected intervals in a honeycomb configuration. As shown in FIG. 24, in this embodiment, the color signal processing 12 includes a data arrangement conversion 12d and an interpolation/rearrangement 12e in addition to the gamma correction 12a, AD conversion 12b, and signal processing 12c.

The data arrangement conversion 12d causes the pixel data output from the honeycomb photosensitive devices PD to be written and read out of the signal processing 12c such that they are equivalent to plane data having a square lattice, Bayer arrangement seen at an angle of 45 degrees. For this purpose, a buffer memory, not shown, is included in the calculation 121 of the signal processing 12c. In the illustrative embodiment, the calculation 121 does not perform interpolation described in relation to the first and second embodiments, but simply processes the signals output from the photosensitive devices PD under the control of the data arrangement conversion 12d.

Specifically, the data with the honeycomb pattern are converted to data with a Bayer pattern and then processed in the same manner as in the previous embodiments. Component signals produced from the processed data are added together in a pseudo frequency fashion. Further, if the frequency bands of the component signals partly overlap each other, then the overlap ascribable to the addition is eliminated in order to broaden the frequency band of the resulting signal. In addition, the data arrangement conversion 12d controls the operation of the data interpolation/rearrangement 12e, as will be described later.

Figure 25:
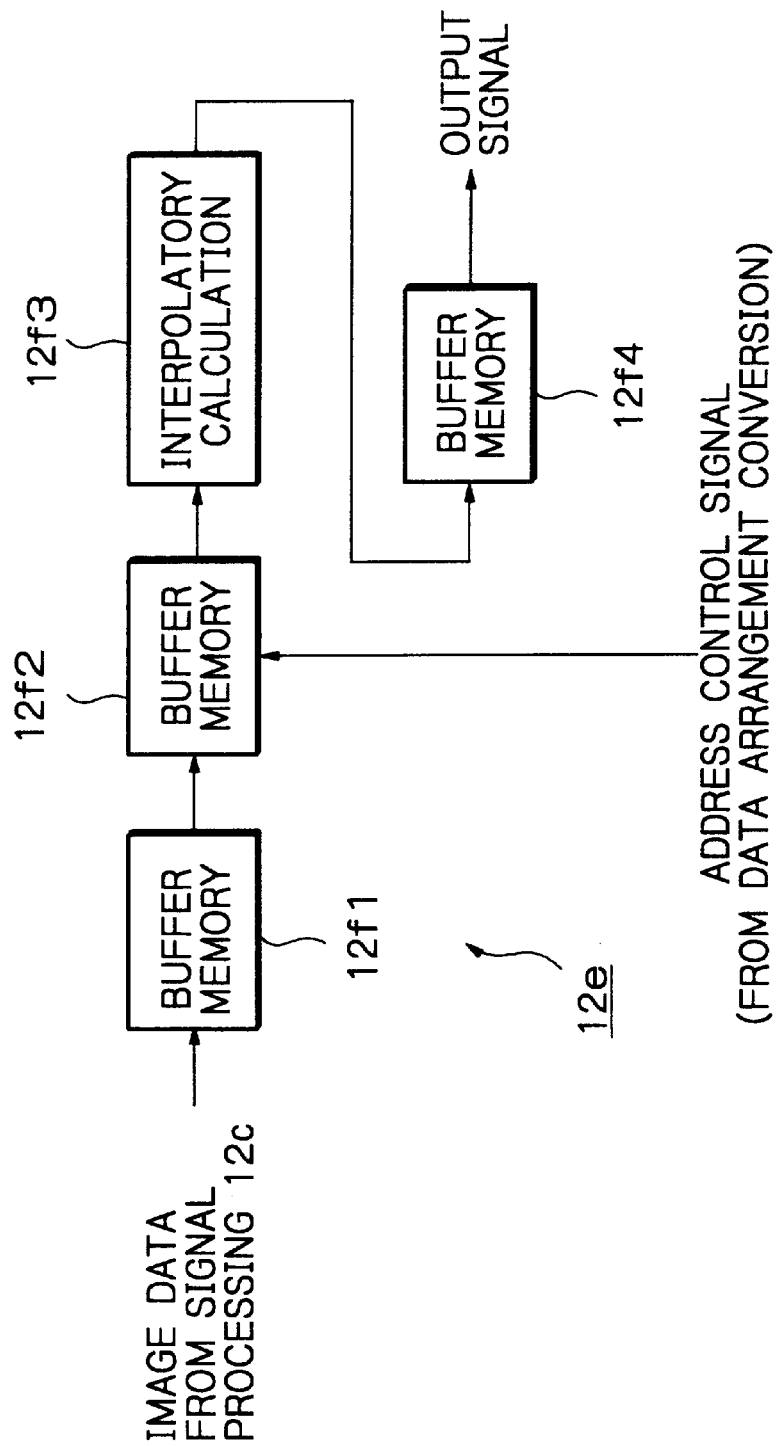
FIG. 25 is a schematic block diagram showing a specific construction of a data interpolation/rearrangement section included in the third embodiment.

As shown in FIG. 25 specifically, the data interpolation/rearrangement 12e executes data interpolation and rearrangement for virtual pixels when rearranging the pixel data output from the signal processing 12c. For this purpose, the interpolation/rearrangement 12e includes buffer memories 12f1, 12f2 and 12f4 and a interpolatory calculation 12f3. The pixel data output from the signal processing 12c are input to the buffer memory 12f1 and temporarily held therein as plane data in a square lattice, Bayer arrangement seen at an angle of 45 degrees. The data output from the buffer memory 12f1 are written to the buffer memory 12f2 in a honeycomb arrangement under the address control of the data arrangement conversion 12d.

The interpolatory calculation 12f3 executes interpolation with the data output from the buffer memory 12f2 and feeds the interpolated data to the buffer memory 12f4. For the interpolation, the calculation 12f3 may use uniform interpolation or adaptive interpolation by way of example. By the interpolation covering even the virtual pixels, the plane data are rearranged in a bidimensional square lattice pattern. The buffer memory 12f4 feeds the stored data to, e.g., the matrix. The matrix produces the three primary colors R, G and B from the input signal, although not shown specifically. The apparatus 10 is therefore capable of outputting an image having a high resolution and including a suppressive of pseudo colors.

Figure 26A:
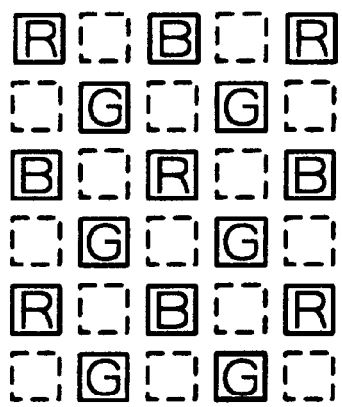
FIGS. 26A and 26B show a relation between a honeycomb arrangement included in an image pick-up section of the third embodiment and a Bayer arrangement equivalent to the honeycomb arrangement seen at an angle of 45 degrees.
Figure 26B:
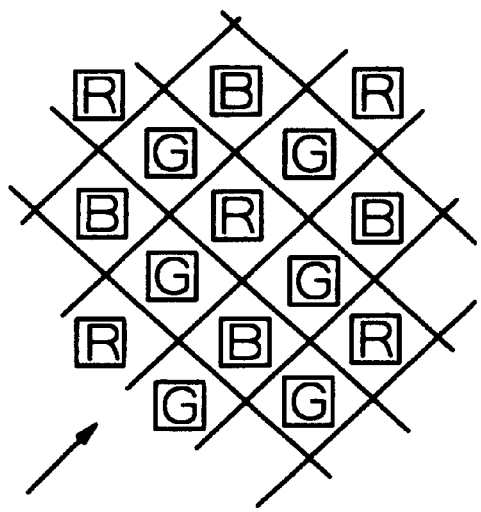

A specific operation of the color signal processing 12 of this embodiment will be described with reference to FIGS. 27 and 28. The honeycomb arrangement is equivalent to the square lattice arrangement rotated by an angle of 45 degrees (see FIGS. 7A and 7B). Stated another way, the pixels in the honeycomb arrangement are identical with the pixels in the square lattice arrangement seen at an angle of 45 degrees. FIG. 26A shows a specific G stripe, RB full-checker pattern having a honeycomb configuration with shifted pixels. As shown in FIG. 26B, paying attention to the pattern of color filters or pixels having a square lattice configuration not rotated, as seen at an angle of 45 degrees, the honeycomb configuration shown in FIG. 26A can be regarded as a square lattice Bayer configuration. The data arrangement conversion 12e converts the data arrangement by a data writing/ reading operation taking account of the above point.

Figure 27:
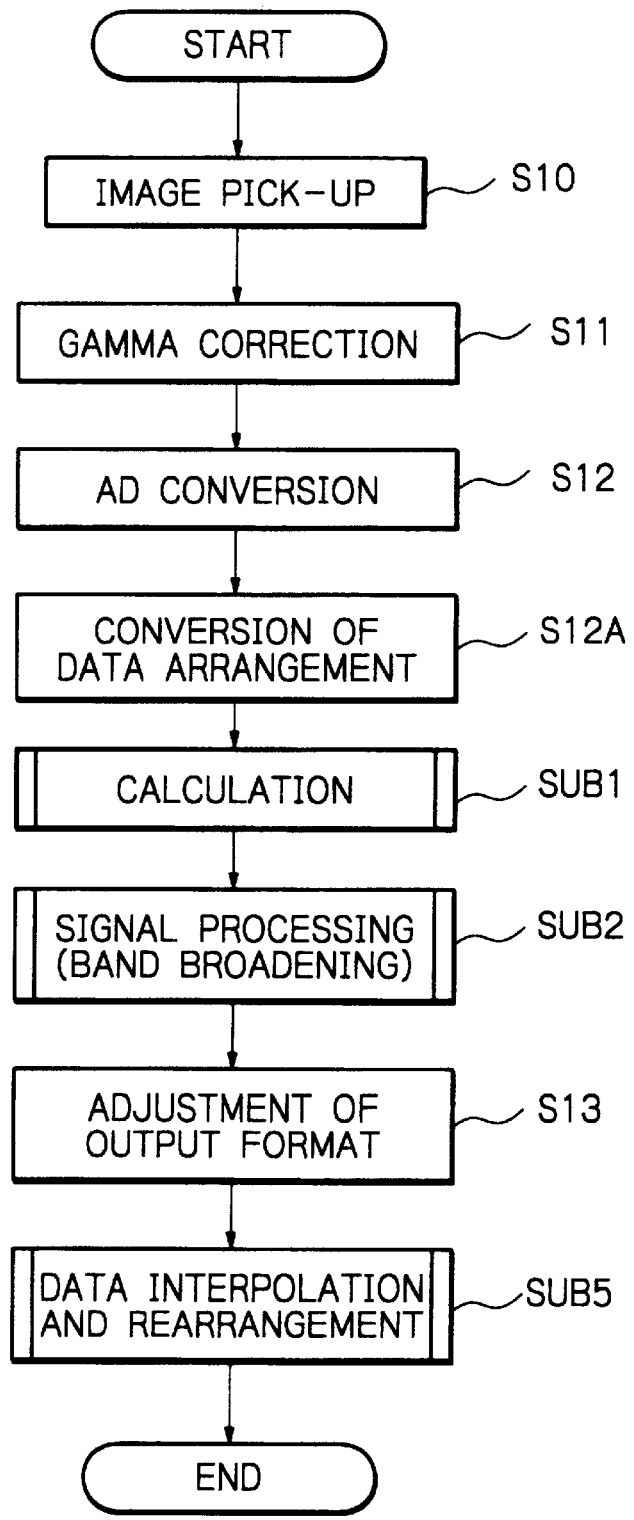
FIG. 27 is a flowchart showing a main routine particular to the third embodiment.

In a main routine shown in FIG. 27, steps S10–S12 are identical with the steps S10–S12 of FIG. 10 and will not be described specifically. In a step S12A following the step S12, the signal processing 12c operates under the control of the data arrangement conversion 12e such that the pixel data with the honeycomb arrangement can be regarded as pixel data with a square lattice, Bayer arrangement.

In a subroutine SUB1, by using the above pixel data, signal processing is applied only to the corresponding pixel positions in order to generate signals. The subroutine SUB1 therefore does not involve interpolation/rearrangement, i.e., does not calculate data for the virtual pixel positions. Again, the $Y_h \cdot Y_{low}$ scheme is used for the calculation. In a subroutine SUB2, the resulting signals are broadened in frequency band. If the same frequency band exists in the signals subjected to horizontal or vertical resolution processing, the frequency band of either one of the signals is limited. Then, the signal with the limited frequency and the other signal are added together.

In a step S13, the signals corresponding to the pixels (except for virtual pixels) having the Bayer arrangement and output in the subroutine SUB2 are processed to be output in a mode desired by the user, e.g., a primary color mode, a complementary color mode or a chrominance signal and luminance signal mode.

Finally, in a subroutine SUB5, the signals in the Bayer arrangement output in the step S13 are rearranged into a square lattice arrangement while being subjected to pixel interpolation. That is, the arrangement shown in FIG. 26B, rotated by 45 degrees is again rotated by 45 degrees to restore the honeycomb arrangement shown in FIG. 26A. Stated another way, rotating the arrangement is equivalent to varying the order in which the pixels are read out. Further, in the subroutine SUB5, pixel interpolation based on the signals derived from the honeycomb arrangement is executed in order to set up a square lattice arrangement. With this procedure, the apparatus 10 is capable of outputting a high quality image.

Figure 28:
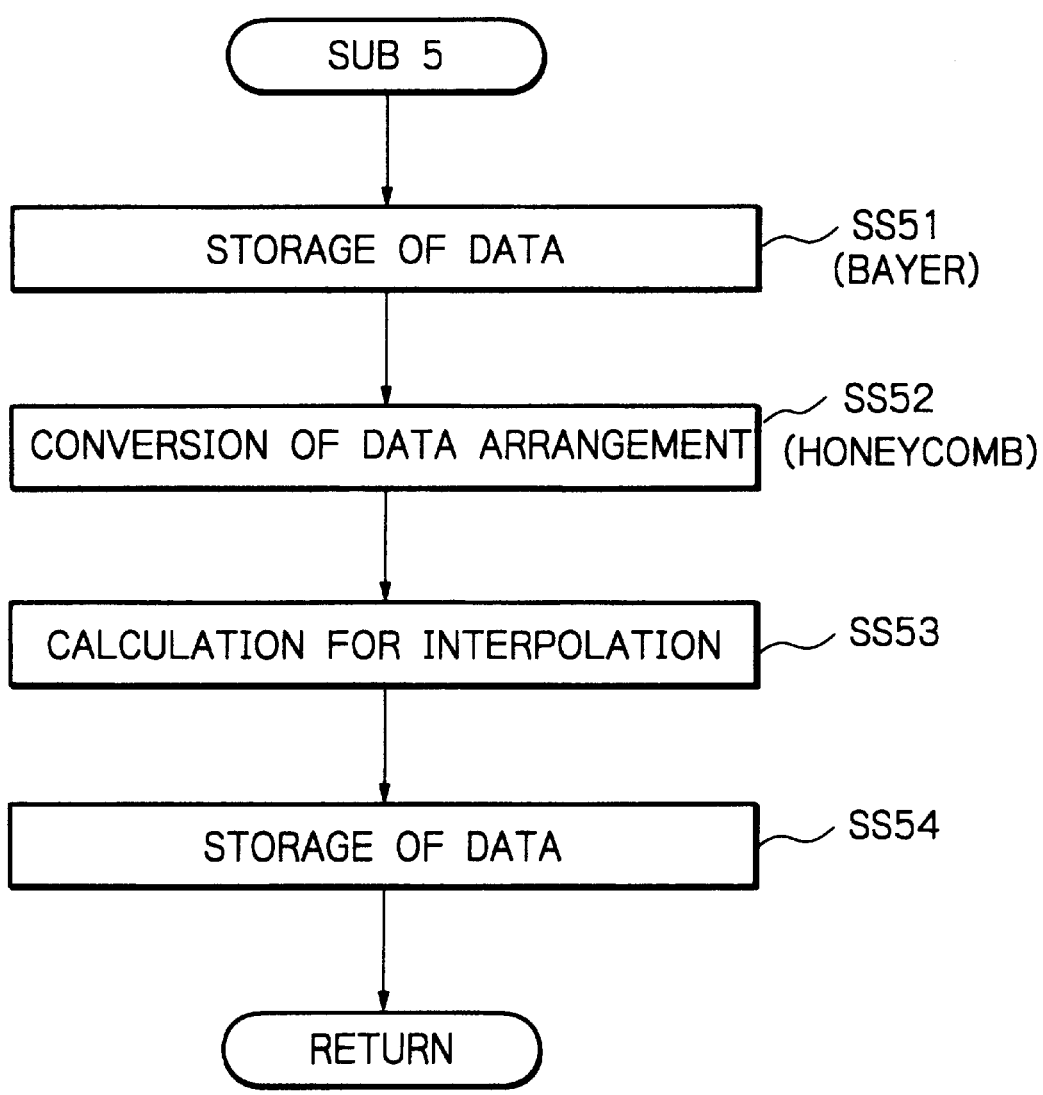
FIG. 28 is a flowchart showing a subroutine SUB5 included in the main routine of FIG. 27 in detail.

FIG. 28 shows the subroutine SUB5 in detail. As shown, the pixel data are written to the buffer memory 12f1 (substep SS51). Then, the pixel data are read out of the buffer memory 12f1 while being restored to the honeycomb arrangement under the control of, e.g., a CPU (substep SS52). The pixel data in the honeycomb arrangement are written to the buffer memory 12f2. Subsequently, the interpolatory calculation 12f3 executes uniform interpolation with the pixel data output form the buffer memory 12f2 by using surrounding pixel data or executes adaptive interpolation with the same pixel data on the basis of the result of correlation detection. It will be seen that when the arrangement, FIG. 26A, is restored, signals appear only every other pixel. In this condition, interpolating signals for virtual pixels is equivalent to arranging pixels two times as great in number as the original pixels (square lattice arrangement hereinafter).

Subsequently, the pixel data subjected to square lattice arrangement in the substep SS53 are written to the buffer memory 12f4 (substep SS53). This is the end of the subroutine SUB5 and therefore the end of the main routine. Consequently, the apparatus 10 is capable of outputting the image of a subject in the form of high resolution signals.

If desired, the signal processing of the second embodiment may be executed in combination with the honeycomb arrangement regarded as a square lattice arrangement as in the illustrative embodiment. Specifically, after the calculation 121 has executed R, G and B plane rearrangement, the contour signal generation 128 may generate correction signals $G_h$ for correcting the high frequency range, i.e., attaching importance to resolution by detecting correlations based only on G data. By adding the correction signals $G_h$ to the luminance signals Y output from the chrominance matrix 127, it is also possible for the apparatus 10 to output signals with high resolution. In addition, the apparatus achieves an effect comparable with one available when a signal is passed through a low pass filter.

As stated above, in any one of the foregoing embodiments, the apparatus 10 with the honeycomb pixel arrangement and unique signal processing is capable of improving the color reproducibility, resolution and so forth of an image despite that the number of pixels is smaller than in the square lattice arrangement. This is contrastive to the conventional solid-state imaging apparatus that increases the number of pixels in order to enhance the above characteristics by the sacrifice of the light-sensitive area for a unit pixel (reduced to the limit of reduction of the pixel pitch) and therefore the sensitivity of photosensitive devices. In the case where pixels are shifted due to the small pixel size or in order to improve the characteristics of signals, pixel shifting accuracy high enough to cope with a greater number of pixels is required of the conventional solid-state imaging apparatus. This requirement has rendered an assembly line for the solid-state imaging apparatus, particularly a color camera, extremely sophisticated and has increased the cost of optics included in a color camera. The solid-state imaging apparatus 10 needs, e.g., only one half of the pixels of the conventional apparatus due to the image pick-up 11 and color filters CF arranged in a honeycomb configuration with shifted pixels. The honeycomb configuration therefore facilitates the assembly and adjustment of the image pick-up 11 and color filters CF.

Specific examples of the assembly of a plurality of color filters with the honeycomb arrangement will be described hereinafter. A plurality of prisms, not shown, serving as beam splitting means are adhered to the optics, so that light transmitted through a lens is incident to the photosensitive portions of the image pick-up 11. Each color filter CF is positioned in front of one of the photosensitive portions.

Figure 29C:
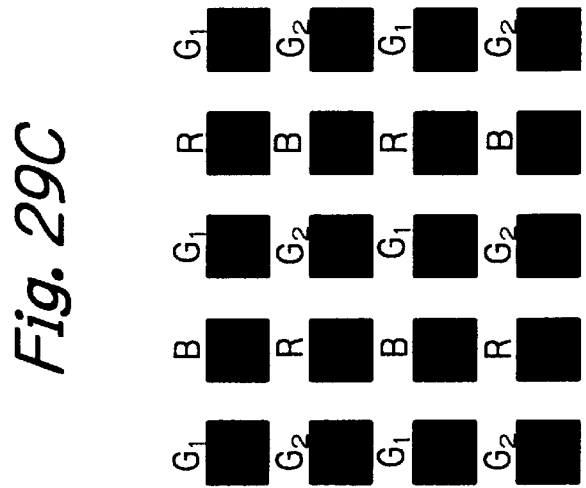
FIGS. 29A–31C respectively show a first, a second and a third relation between the patterns of colors implemented by two color filters and a spatial arrangement produced by combining them and applicable to the present invention.
Figure 29A:
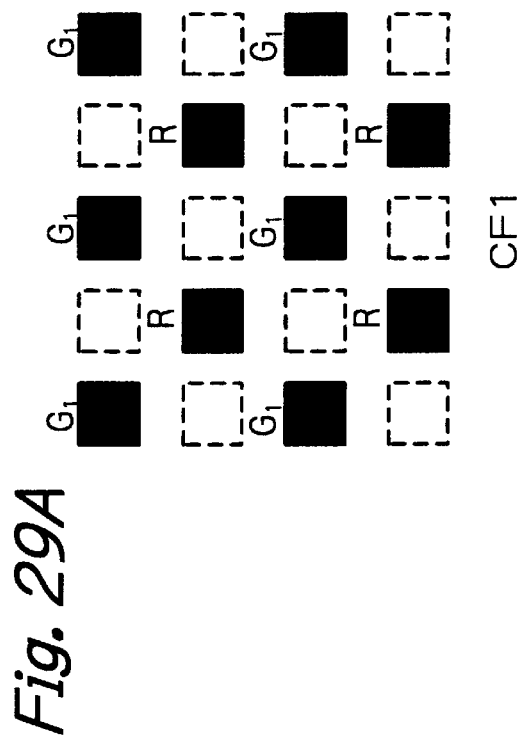
Figure 29B:
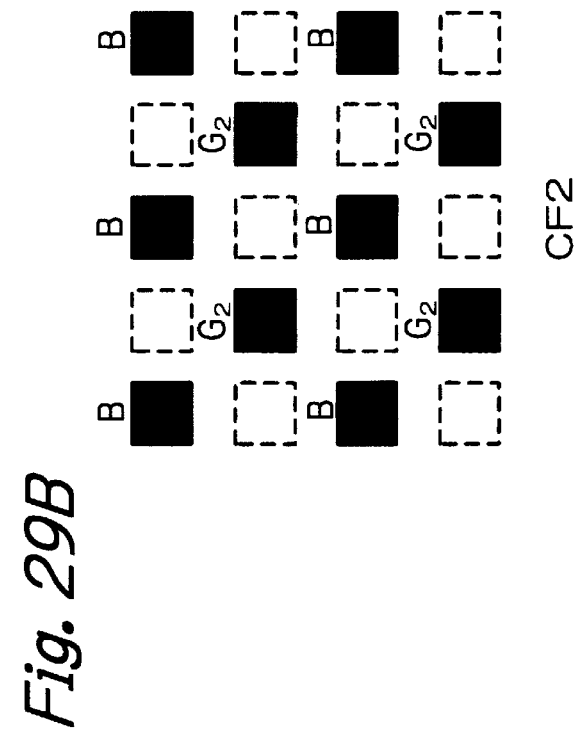

FIGS. 29A–29C show a first color filter CF made up of two color filters CF1 and CF2 and used in combination with two photosensitive portions. As shown, the color filter CF1 shown in FIG. 29A has a spatial color arrangement in which rows of color $G_1$ and rows of color R alternate with other in a honeycomb pattern. The color filter CF2 shown in FIG. 29B has a spatial color arrangement in which rows of color $G_2$ and rows of color B alternate with each other in a honeycomb pattern; the rows of color B correspond in position to the rows of color $G_1$ of the color filter CF1. When the color filters CF1 and CF2 are adhered together with the filter CF2 shifted by, e.g., one pixel pitch in the direction of row, the color filter CF shown in FIG. 29C with a honeycomb G square lattice, RB full-checker pattern can be easily produced.

Figure 30C:
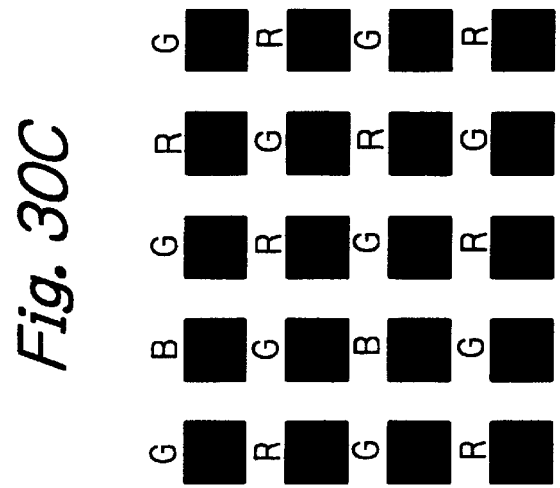
Figure 30A:
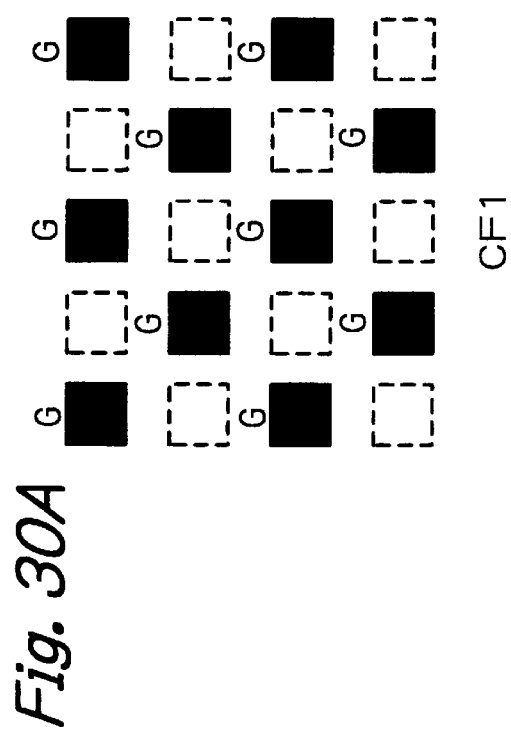
Figure 30B:
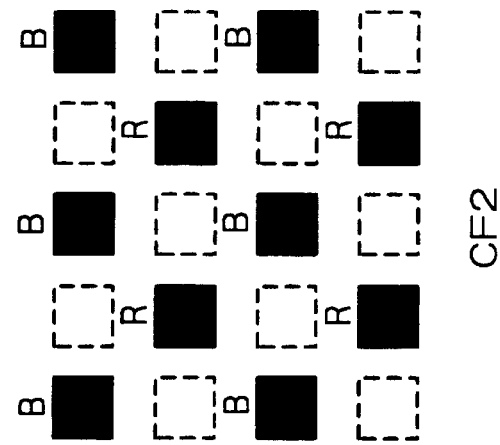

FIGS. 30A–30C show a second color filter CF also made up of two color filters CF1 and CF2. As shown, the color filter CF1 shown in FIG. 30A has the color G arranged in a honeycomb pattern. The color filter CF2 has rows of color R and rows of color B alternating with each other in a honeycomb pattern. The color filters CF1 and CF2 are adhered together with the filter CF2 shifted by one pitch in the direction of row. This readily implements a color filter having a Bayer pattern, as shown in FIG. 30C.

Figure 31C:
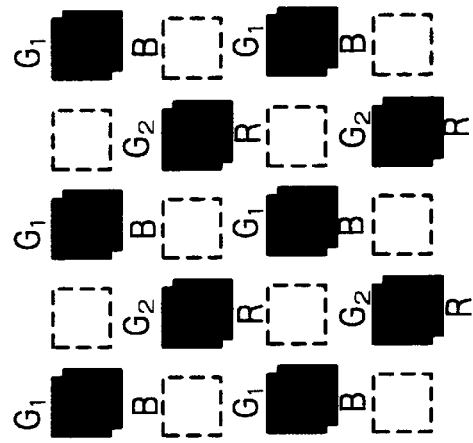
Figure 31A:
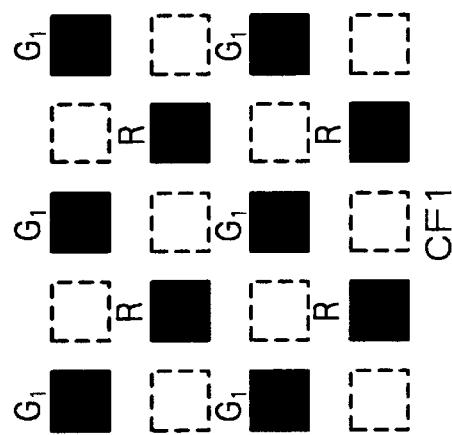
Figure 31B:
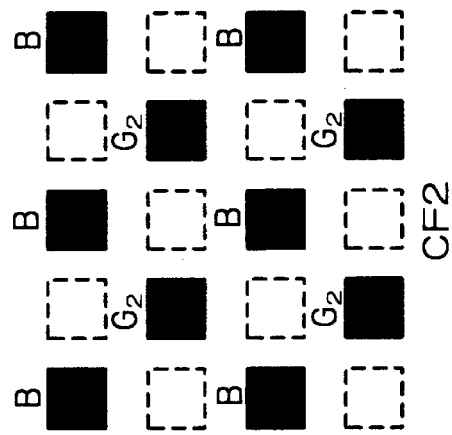

FIGS. 31A–31C show a third color filter CF also implemented by the two color filters CF1 and CF2 of the first color filter CF. As shown, the color filters CF1 and CF2 are adhered together with their pixel positions fully coinciding with each other. The resulting color filter has a honeycomb configuration, as shown in FIG. 31C.

Figure 32C:
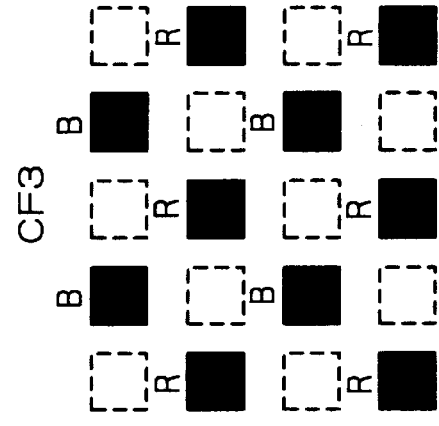
Figure 32B:
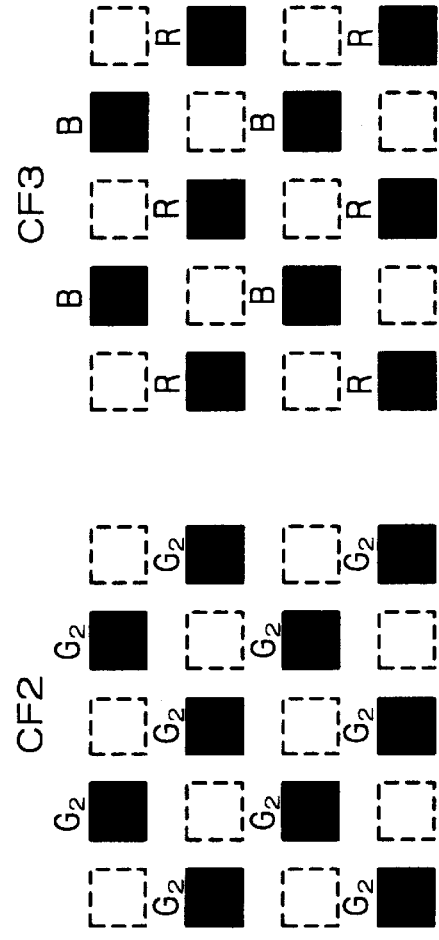
Figure 32A:
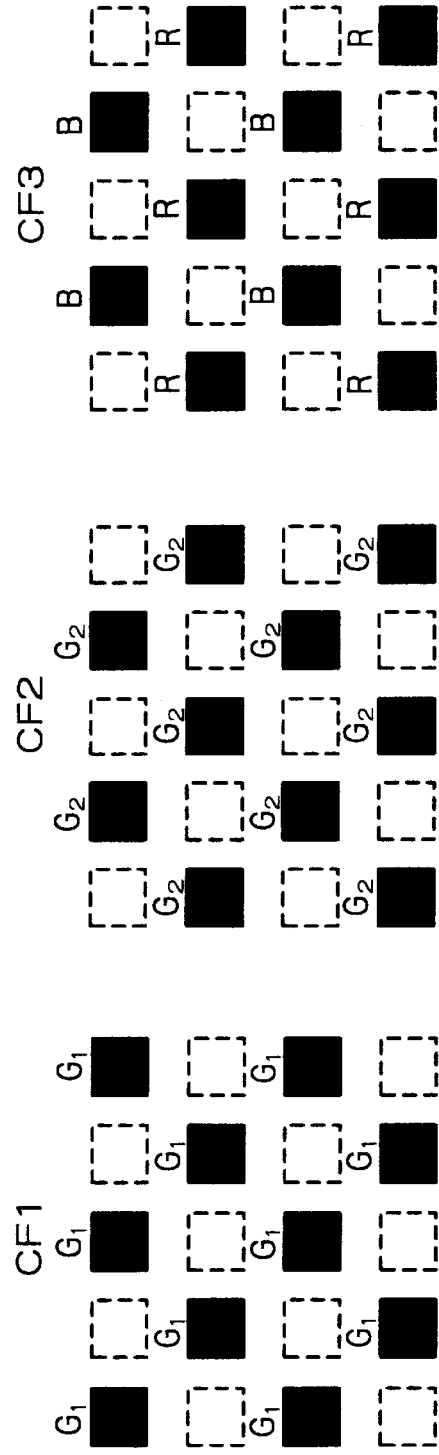
Figure 32E:
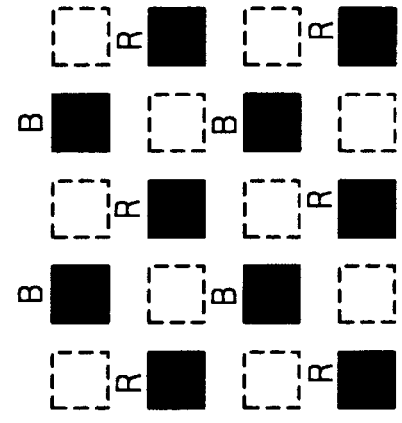
Figure 32D:
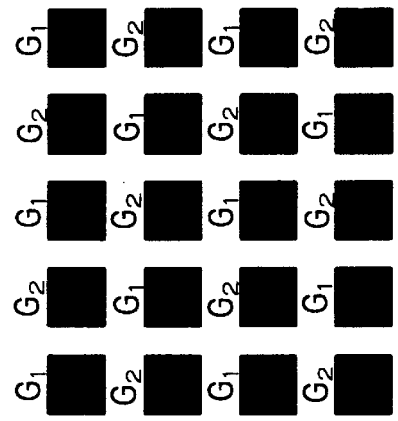

FIGS. 32A–32C show the spatial arrangement of a specific DG color filter CF made up of three color filters CR1, CF2 and CF3. As shown, the color filters CF1 and CF2 shown in FIGS. 32A and 32B, respectively, both have a honeycomb configuration, but are shifted from each other by a pixel pitch. Both of the color filters CF1 and CF2 are assigned to the same color $G_1$ and $G_2$. The color filter CF3 shown in FIG. 32C has pixels arranged in the same positions as the pixels of the color filter CF2 in a honeycomb configuration, but includes the has the colors R and B. The color filters CF2 and CF3 having pixels coinciding in position with each other are adhered together. This successfully implements either a square lattice arrangement of $G_1$ and $G_2$ shown in FIG. 32D or a honeycomb arrangement of R and B shown in FIG. 32E.

Figure 33D:
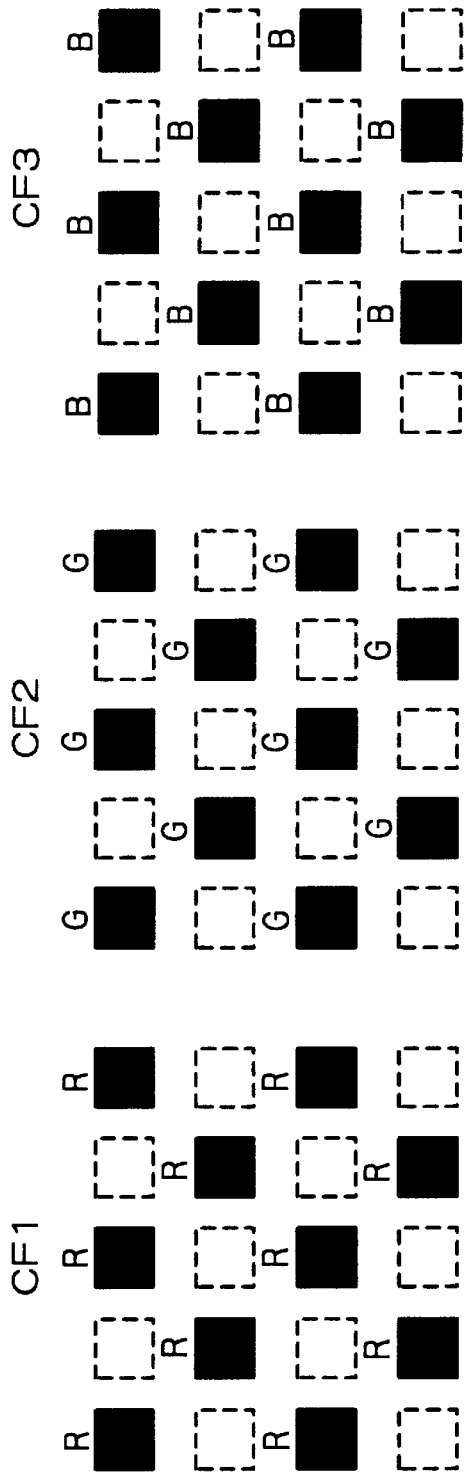

FIGS. 33A–33D show the spatial arrangement of another specific color filter CF also made up of three color filters CF1, CF2 and CF3. As shown, the color filters CF1, CF2 and CF3 shown in FIGS. 33A, 33B and 33C, respectively, have an identical honeycomb configuration as to the positions of the pixels. The color filters CF1–CF3 are assigned to the colors R, G and B, respectively. The color filters CF1–CF3 are adhered together with the filters CF1 and CF3 shifted from the filter CF2 by one pixel pitch. As shown in FIG. 33D, the resulting color filter CF has the color G and overlapping colors R and B alternating with each other.

Figure 34B:
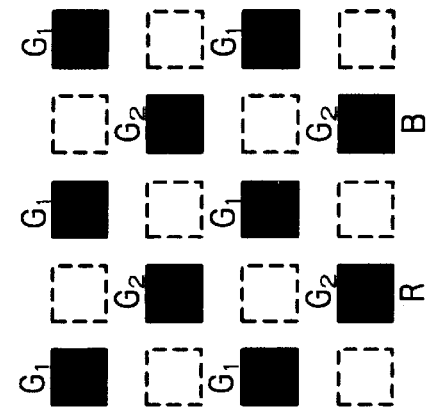
FIGS. 34A–34D show a relation between the spatial arrangement of three DG type color filters with a conventional square lattice arrangement and pixels to be interpolated.
Figure 34D:
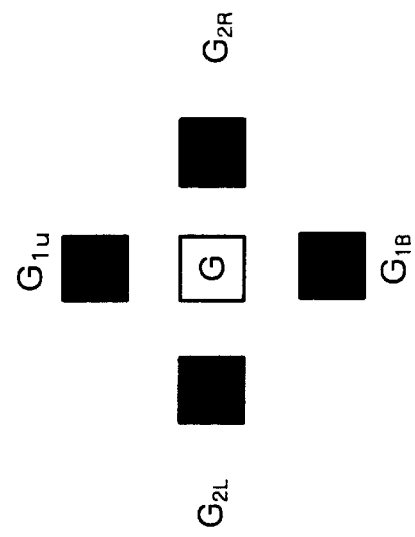
Figure 34A:
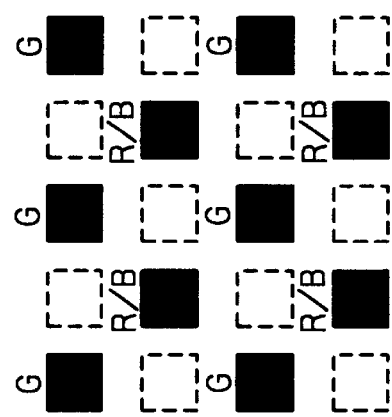
Figure 34C:
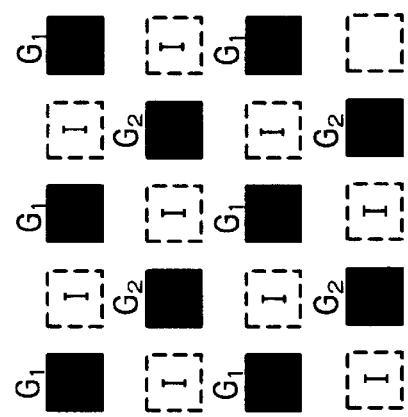
Figure 35A:
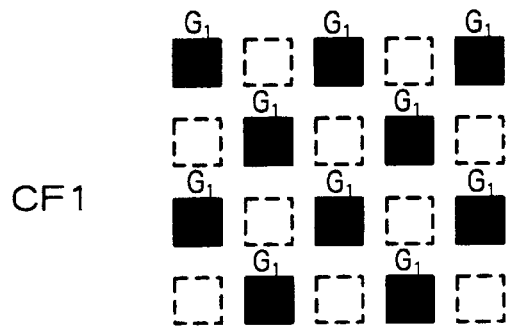
FIGS. 35A–35F show a relation between the patterns of colors implemented by four color filters and a spatial arrangement produced by combining them and applicable to the present invention.
Figure 35B:
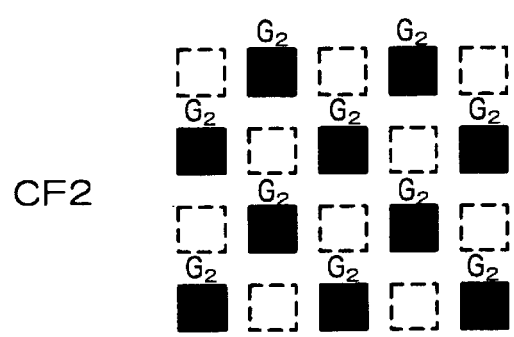
Figure 35C:
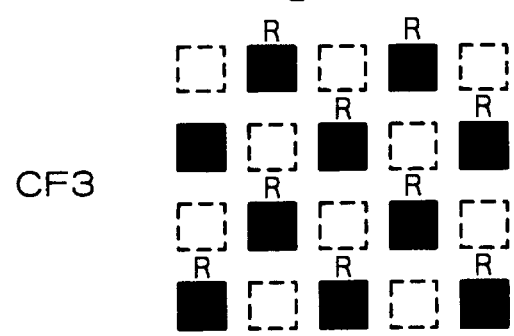
Figure 35D:
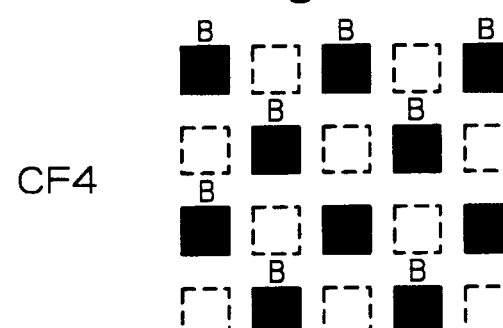
Figure 35E:
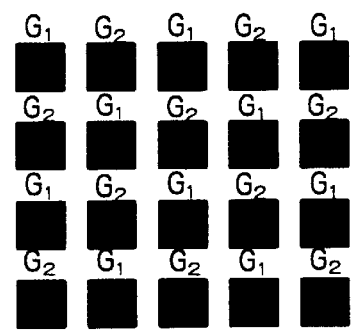
Figure 35F:
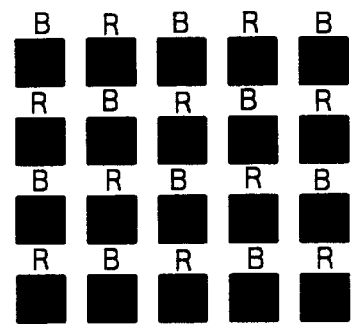

So long as the apertures are arranged in the conventional square lattice pattern, a color filter made up of three color filters is achievable even with, e.g., an RGB pixel shift shown in FIG. 34A, or a DG pixel shift system shown in FIG. 34B. In the DG pixel shift system of FIG. 34B, pixels to be interpolated correspond to positions represented by phantom squares I shown in FIG. 34C. For the interpolation, use is made of pixel data derived from the surrounding color $G_1$ and $G_2$. For example, as shown in FIG. 34D, pixels $G_{1U}$, $G_{1B}$, $G_{2L}$ and $G_{2R}$ above, below and at the right and left of a pixel G to be interpolated are used. Such data are used for calculation, as follows:

$$G=(G_{2L}+G_{2R})/2$$

$$G=(G_{1U}+G_{1B})/2 \qquad \text{Eq. (14)}$$

Alternatively, by using a constant K=0 through 1, the following calculation is performed:

$$G=K*(G_{2L}+G_{2R})/2+(1-K)*(G_{1U}+G_{1B})/2 \qquad \text{Eq. (15)}$$

For example, when the color $G_1$ and $G_2$ arranged in a honeycomb configuration and the R vertical stripes and B vertical stripes are combined in a square lattice configuration, as shown in FIG. 34B, the accuracy of signals at the time of R and B plane rearrangement can be enhanced with respect to the color G.

FIGS. 35A–35F show the spatial arrangement of a specific DG color filter made up of four color filters CF1–CF4. As shown, the color filter CF1 shown in FIG. 35A has the color $G_1$ arranged in a honeycomb pattern. The color filter CF2 shown in FIG. 35B has the same color, although labeled $G_2$ for distinction, as the color filter CF1 and is shifted from the filter CF1 by the pixel pitch. The color filter CF3 shown in FIG. 35C has the color R arranged in a honeycomb pattern identical with the honeycomb pattern of the color filter CF2. The color filter CF4 shown in FIG. 35D has the color B arranged in a honeycomb pattern identical with the honeycomb pattern of the color filter CF1. When the color filters CF1 and CF2 are adhered together such that they are complementary to each other, there can be implemented a $G_1$ and $G_2$ square lattice arrangement shown in FIG. 35E or an R and B square lattice arrangement shown in FIG. 35F.

With the above four-filter scheme, it is possible to increase the resolution of the colors R and B than with the three-filter scheme. The multi-filter configurations each doubles the pixel density after the adhesion of the filter elements and can therefore be implemented by, e.g., the square lattice configuration. It is to be noted that pixel data corresponding to the color $G_1$ and $G_2$ are fed to the various sections after combination, interpolation and so forth.

A plane-sequential single-filter color imaging apparatus using the solid-state imaging apparatus 10 will be briefly described hereinafter. The apparatus to be described is desirable for shooting a still subject. A plane-sequential single-filter system is desirably practicable with black-and-white devices for both of image pick-up and image receipt. Portions identical with the portions of the solid-state imaging apparatus 10 will be denoted by like reference numerals and will not be described in order to avoid redundancy.

The color imaging apparatus, generally, includes an image pick-up 11 having bidimensionally arranged photosensitive devices PD. A moving mechanism causes the image pick-up 11 to move in the horizontal direction (X) and vertical direction (Y) within a bidimensional plane parallel to the imaging surface of the image pick-up 11. A plurality of color filters CF of different colors are arranged in a honeycomb configuration and positioned on an optical path between a subject and the image pick-up 11, e.g., just in front of the image pick-up 11. A filter switching mechanism inserts one of a plurality of color filters CF into the optical path. Signals output from the image pick-up 11 are written to a recording/reproduction. A color signal processing 12 processes signals output from the image pick-up 11 and recording/reproduction.

The image pick-up section. 11, color filters CF and color signal processing 12 are constructed in the same manner as in the illustrative embodiments. Because the moving mechanism moves the image pick-up section 11, the color filters CF each has a greater than the imaging area of the section 11.

The moving mechanism finely moves the image pick-up section in accordance with the kind of the color filter CF, i.e., the amount of shift of pixels. If such fine control is difficult to perform, then an adequate displacement may be set and adjusted in accordance with the periodicity of the pixel pitch. The moving mechanism may include a stepping motor or similar drive source, a gear for transmitting the output torque of the drive source, a rack held in mesh with the gear for transforming the rotation of the gear to translation, and a translation controller for controlling the drive source. The image pick-up section 11 is mounted on the rack. The image pick-up section 11 is connected to the translation controller, recording/reproduction and color signal processing 12 by, e.g., a flexible printed circuit board, so that signals can be input and output despite the displacement of the image pick-up 11. With this arrangement, it is possible to move the image pick-up in matching relation to the kind of the color filter CF.

The filter switching mechanism includes a mount on which the color filters CF are mounted with their apertures positioned at the same radial positions of a disk. The apertures of the filters CF are spaced by a preselected angular distance taking account of the number of the filters CF, and each is capable of transmitting incident light. A motor cause the disk to rotate about the center of rotation. A rotation controller controllably drives the motor. The aperture surface on the mount may advantageously be parallel to the imaging surface. The output shaft of the motor extends throughout a hole formed in the center of the disk of the mount. The shaft is affixed to the disk by, e.g., adhesive applied to the edge of the above hole. The rotation controller controls the start and end of rotation such that the disk rotates by a preselected angle at a time. This allows the color filters CF to be selectively brought into the optical path, as needed.

The recording/reproduction receives pixel data via, e.g., an SCSI interface. Signals output from the image pick-up 11 are written to the recording/reproduction in the form of pixel data each time in accordance with the combination of the operation of the filter switching mechanism and that of the moving mechanism. Therefore, a single picture is completed by a plurality of shots. The resulting pixel data are written to the recording/reproduction and then read out of the same. When such pixel data are fed to the color signal processing 12, a high quality image attaching importance to color reproducibility and/or resolution is output as in any one of the previous embodiments. The color imaging apparatus using the color filters CF and image pick-up 11 arranged in a honeycomb configuration, as stated above, does not need sophisticated arrangements or adjustments on an assembly line. It is therefore not necessary to provide on-chip color filters on the photosensitive devices.

The apparatus is practicable not only with a single-filter arrangement but also with a two-filter arrangement including two color filters and two image pick-up sections. The apparatus with the two-filter arrangement may be regarded as a plane-sequential color imaging apparatus including a high resolution image pick-up section in which black and white are arranged in a square lattice pattern.

Fourth Embodiment

A fourth embodiment of the present invention will be described with reference to FIGS. 36–58. The embodiment to be described hereinafter is more effective than the foregoing embodiments using the basic concept of the present invention. Briefly, in the illustrative embodiment, the imaging apparatus has a single photosensitive portion or filter and has photosensitive devices arranged in a honeycomb pattern, i.e., has the center of the geometrical arrangement of photosensitive devices shifted by half a pitch in the directions of row and column. Use is made of an RGB filter for color separation. Image signals picked up and digitized are subjected to adaptive signal processing which is an adequate combination of the previously stated procedures.

Figure 36:
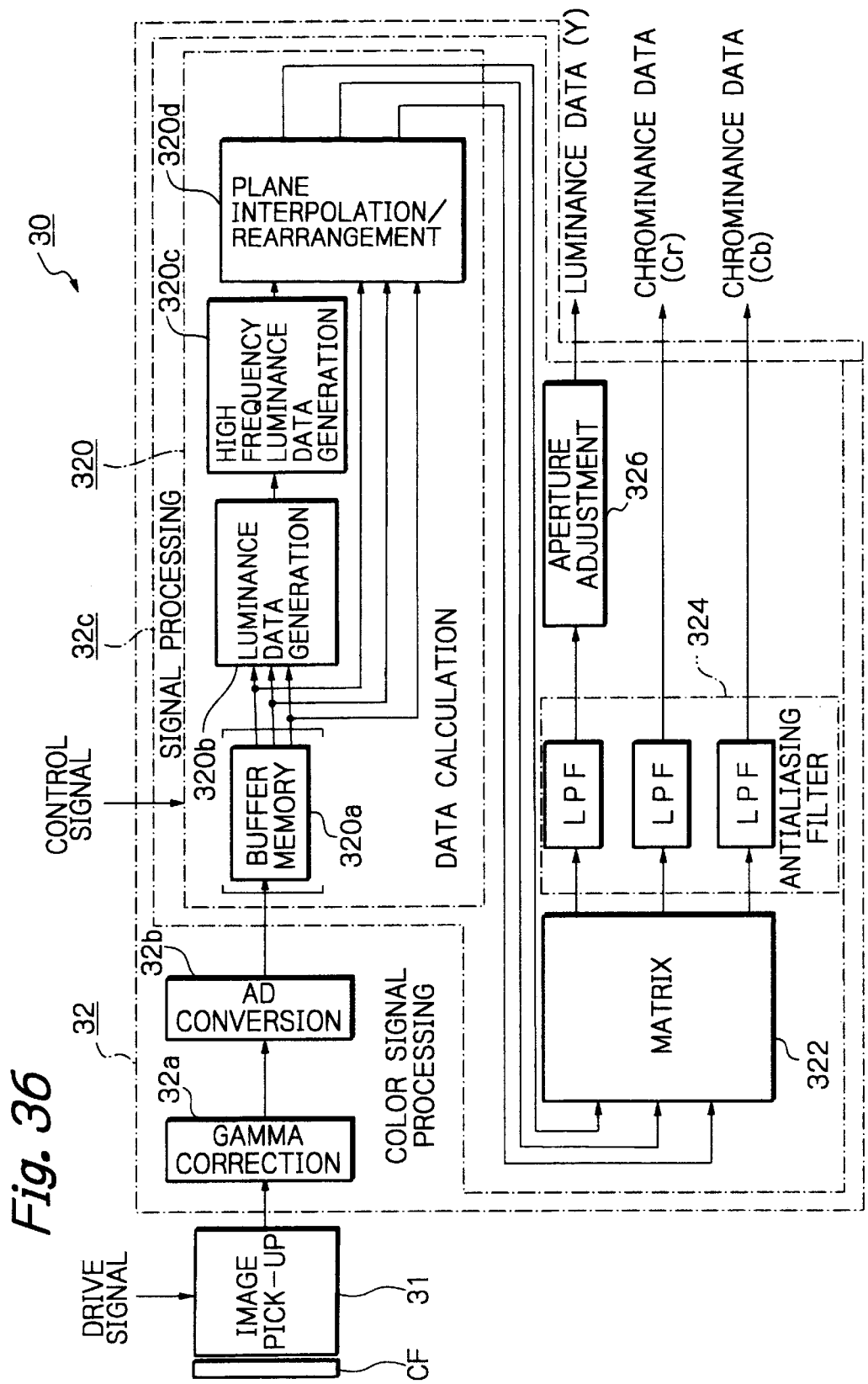
FIG. 36 is a schematic block diagram showing a fourth embodiment of the solid-state imaging apparatus in accordance with the present invention.

As shown in FIG. 36, a solid-state imaging apparatus, generally 30, includes the color filter CF and an image pick-up 31 each having the same configuration as in the previous embodiments. The image pick-up 31 has photosensitive devices arranged in a honeycomb pattern and each having, e.g., a square shape. A color signal processing 32, like the color signal processing 12 of the first embodiment, has a gamma correction 32a, an AD conversion 32b, and a signal processing 32c. The gamma correction 32a and AD conversion 32b have the same function as each other.

The signal processing 32c is made up of a data calculation 320, a matrix 322, an antialiasing filter 324, and an aperture adjustment 326. The data calculation 320 includes various calculating sections for executing calculation with pixel data input via the AD conversion 32b. When the photosensitive devices of the image pick-up 31 are implemented by CCDs, the signal processing 32c should preferably include a nondestructive buffer memory 320a, so that accurate pixel data may be fed to the above calculating sections without being destroyed. By contrast, when the photosensitive elements are implemented by MOS (Metal Oxide Semiconductor) type imaging devices, the buffer memory 320a is not necessary because such imaging devices are originally nondestructive; in this case, pixel data to be output can be controlled by drive signals.

Specifically, the data calculation 320 includes, in addition to the buffer memory 320a, a luminance data generation 320b, a high frequency luminance data generation 320c, and a plane interpolation/rearrangement 320d. The data calculation 320 is controlled by a control signal output from a system controller not shown. The buffer memory 320a feeds R, G and B pixel data to the luminance data generation 320b and plane interpolation/rearrangement 320d. The luminance data generation 320b generates luminance data Y for each expected position of the checker pattern.

The high frequency luminance data generation 320c is a digital filter for filtering luminance data Y output from the luminance data generation 320b. The digital filter is implemented by a low pass filter in order to interpolate the positions where photosensitive devices are absent, i.e., virtual pixels and to increase the frequency band of the luminance data. High frequency luminance data $Y_h$ output from the generation 320c are delivered to the plane interpolation/rearrangement 320d.

Figure 37:
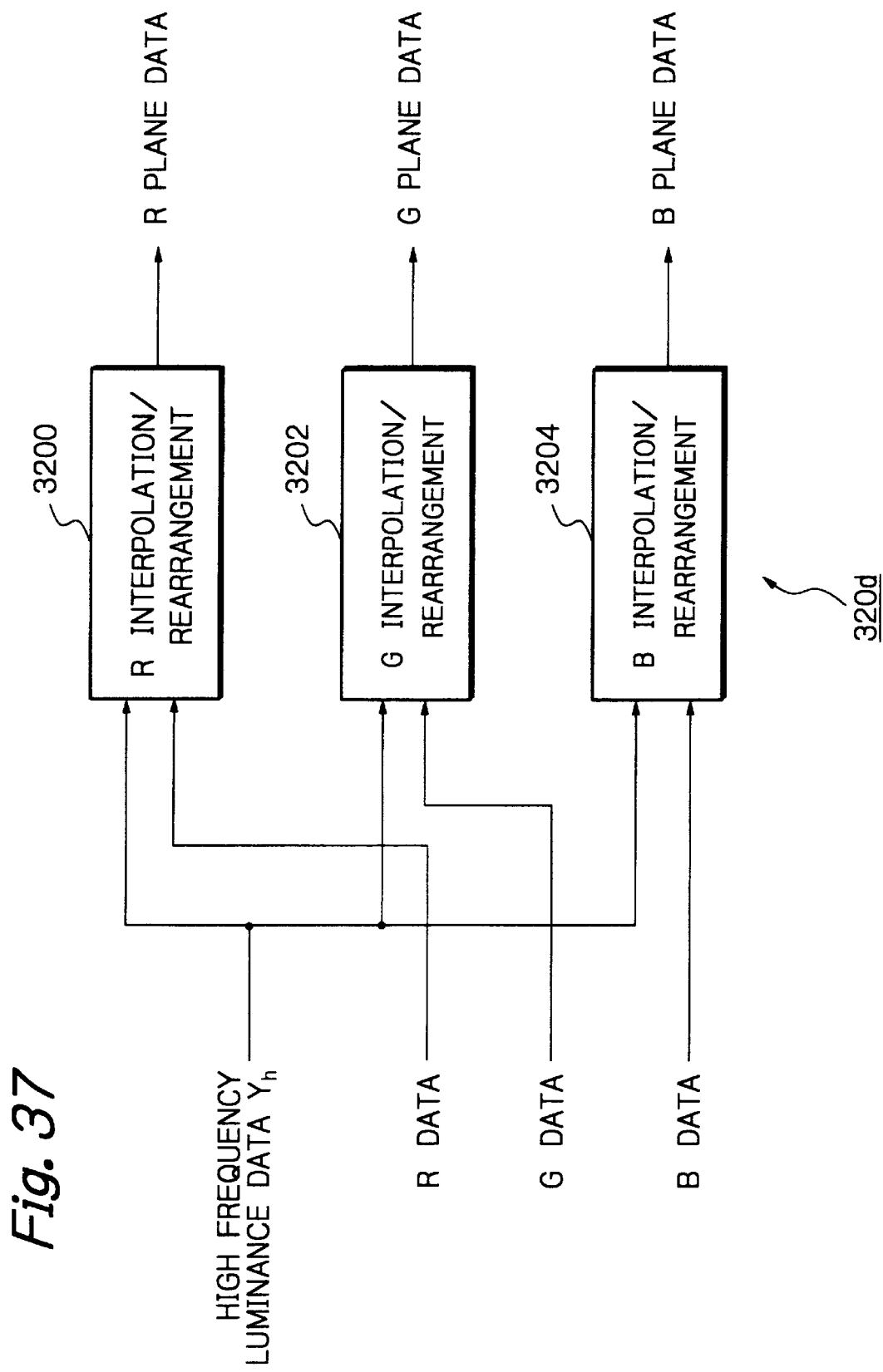
FIG. 37 is a schematic block diagram showing a specific construction of a plane interpolation/rearrangement section included in the fourth embodiment.

FIG. 37 shows a specific configuration of the plane interpolation/rearrangement 320d. As shown, the interpolation/rearrangement 320d includes an R, a G and a B interpolation/rearrangement 3200, 3202 and 3204 each constituting a calculating section. The high frequency luminance data $Y_h$ are fed to one input terminal of each of the interpolation/rearrangements 3200–3204. Pixel data corresponding to colors to interpolate, i.e., R, G and B data are respectively applied to the other inputs of the interpolation/rearrangements 3200–3204. The interpolation/rearrangements 3200–3204 each determines, at the time of plane interpolation and rearrangement, surrounding virtual pixels at the same time by using pixel data produced by calculations, as will be described in detail later.

The matrix 322, FIG. 36, produces luminance data Y and chrominance data $C_r$ and $C_b$ from the R, G and B data interpolated and rearranged. To produce such data, the matrix 322 includes a calculating section not shown. Specifically, by applying the Eq. (13) to the luminance data Y, the matrix 322 generates chrominance data $C_r=R-Y_h$ and $C_b=B-Y_h$. The antialiasing filter 324 is implemented by a digital filter so adjusted as to include high frequency components, as in the previous embodiments. The aperture adjustment 326 has a conventional construction for applying an aperture effect, e.g., contour enhancement to the luminance data. This construction does not need the exclusive frequency overlap prevention block because it originally prevents frequency bands from overlapping each other in the event of increasing the frequencies of the luminance data. Therefore, while the data calculation 320 performs calculations, the matrix 322 and successive circuits should only be implemented by conventional configurations and operations. This further enhances the cost performance of the apparatus 30.

Figure 38:
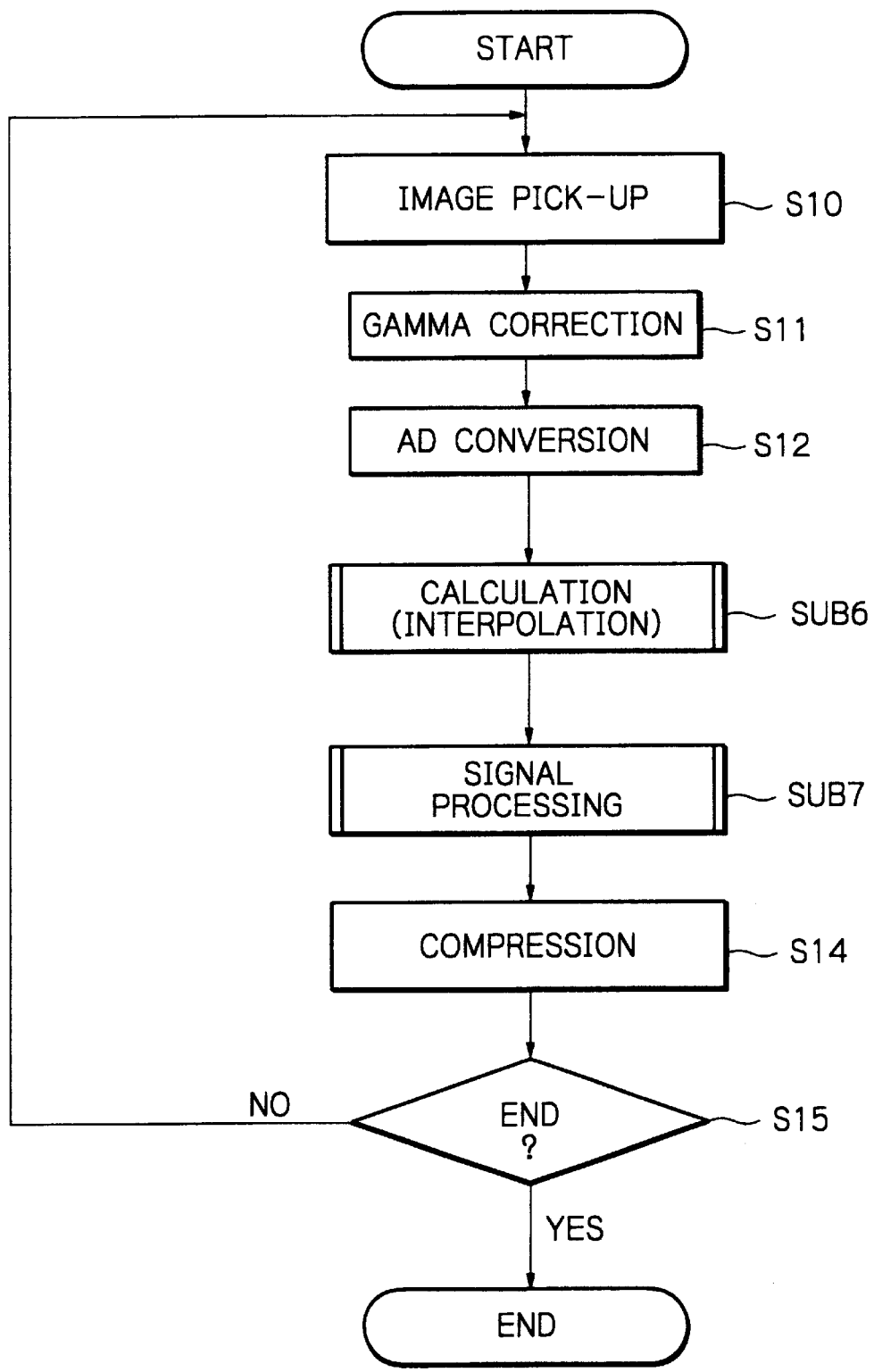
FIG. 38 is a flowchart demonstrating a main routine particular to the fourth embodiment.

A specific operation of the apparatus 30 will be described hereinafter with reference to FIG. 38 showing a main routine. As shown, when a power switch provided on the apparatus 30 is turned on, a system controller, not shown, initializes the various section of the apparatus 30. After the initialization, the image pick-up 31 picks up a desired subject, i.e., outputs an image signal representative of the subject in response to a drive signal (step S10). The gamma conversion 32a executes gamma correction with the above image signal and delivers the converted image signal to the AD correction 32b (step S11). The AD conversion 32b transforms the input image signal to a corresponding digital signal or pixel data (step S12). Therefore, the circuitry following the AD conversion 32b executes digital signal processing. The steps S10–S12 are identical with the steps S10–S12 described with reference to FIG. 10 and therefore will not be described specifically.

To deliver the digital pixel data color by color, the buffer memory 320a is used in combination with the CCD image sensor, as stated earlier. The buffer memory 320a feeds the R, G and B pixel data to the luminance data generation 320b and plane interpolation/rearrangement 320d in response to a write enable signal, a read enable signal, an address signal and other various control signals received from the system controller.

Subsequently, in a subroutine SUB6, there is executed interpolation (see FIG. 39) for interpolating luminance data (see FIGS. 42A and 42B) and interpolating, due to the use of a single color filter, pixel data of colors other than the colors of the color filter. As a result, R, G and B pixel data are produced over the entire picture. For the generation of the pixel data, the luminance data generation 320b, high frequency luminance data generation 320c and plane interpolation/rearrangement 320d of the data calculation 320 are sequentially operated. The pixel data are fed from the plane interpolation/rearrangement 320d to the matrix 322.

In a subroutine SUB7 following the subroutine SUB6, luminance data and chrominance data $C_r$ and $C_b$ are produced form each of the R, G and B pixel data. Then, the frequency band of each data is limited while the luminance data Y are subjected to aperture adjustment. The matrix 322, antialiasing filter 324 and aperture adjustment 326 to which such a procedure is assigned can be implemented by circuitry customarily included in a solid-state imaging apparatus.

The luminance data Y and chrominance data $C_r$ and $C_b$ are fed to a display and a compressing section not shown in FIG. 36. The display receiving the high quality image data is capable of displaying an image with a higher quality or allowing it to be printed with a higher quality. In a step S14, the pixel data are reduced in amount by compression and then written to a semiconductor memory or an optical, magnetic or magneto optical recording medium. Subsequently, in a step S15, whether or not the user of the apparatus 10 desires to stop shooting is determined. If the user desires to continue the shooting operation (NO, step S15), then the program returns to the step S10; if otherwise, (YES, step S15), then the power switch, for example, is turned off.

Figure 39:
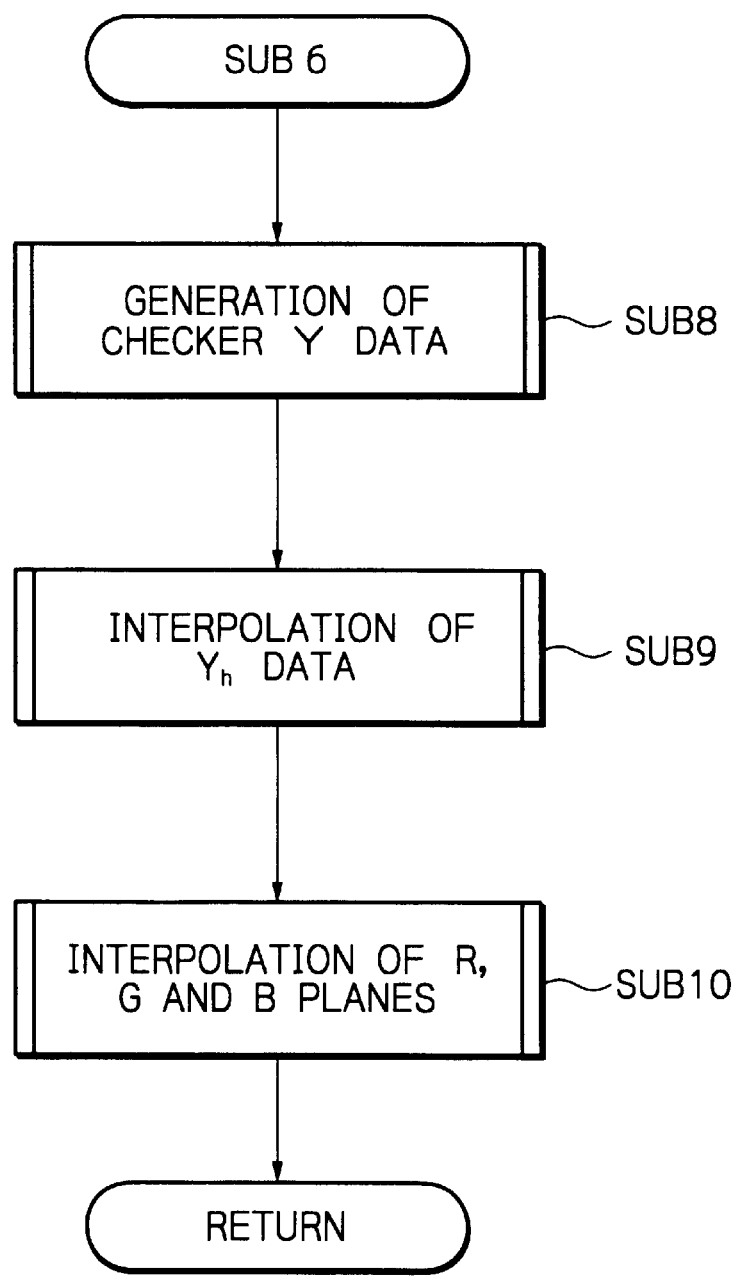
FIG. 39 is a flowchart showing a subroutine SUB6 included in the main routine of FIG. 38 in detail.
Figure 40:
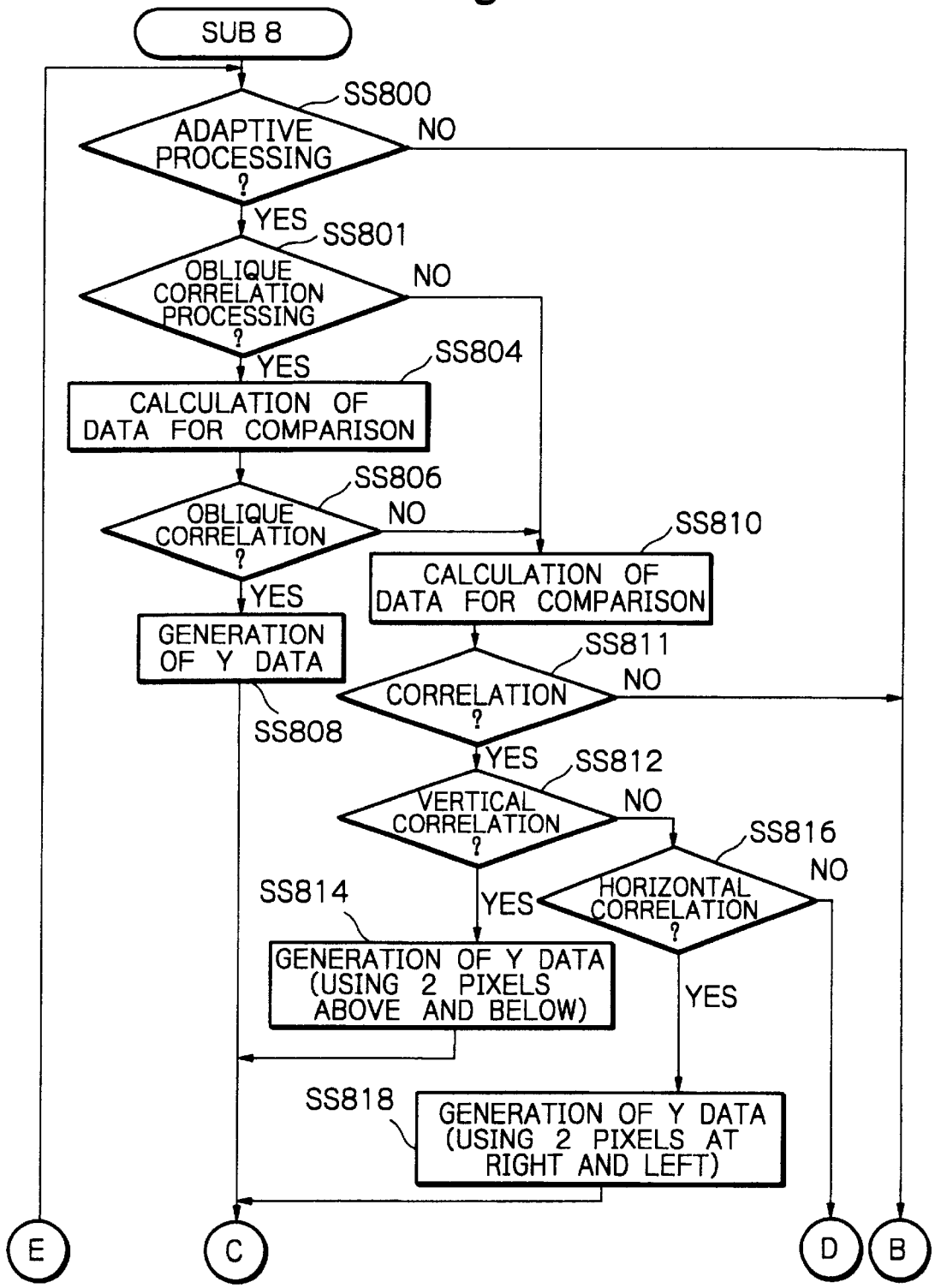
FIGS. 40 and 41 are flowcharts showing, in combination, a subroutine SUB8 included in the subroutine of FIG. 39 in detail.
Figure 41:
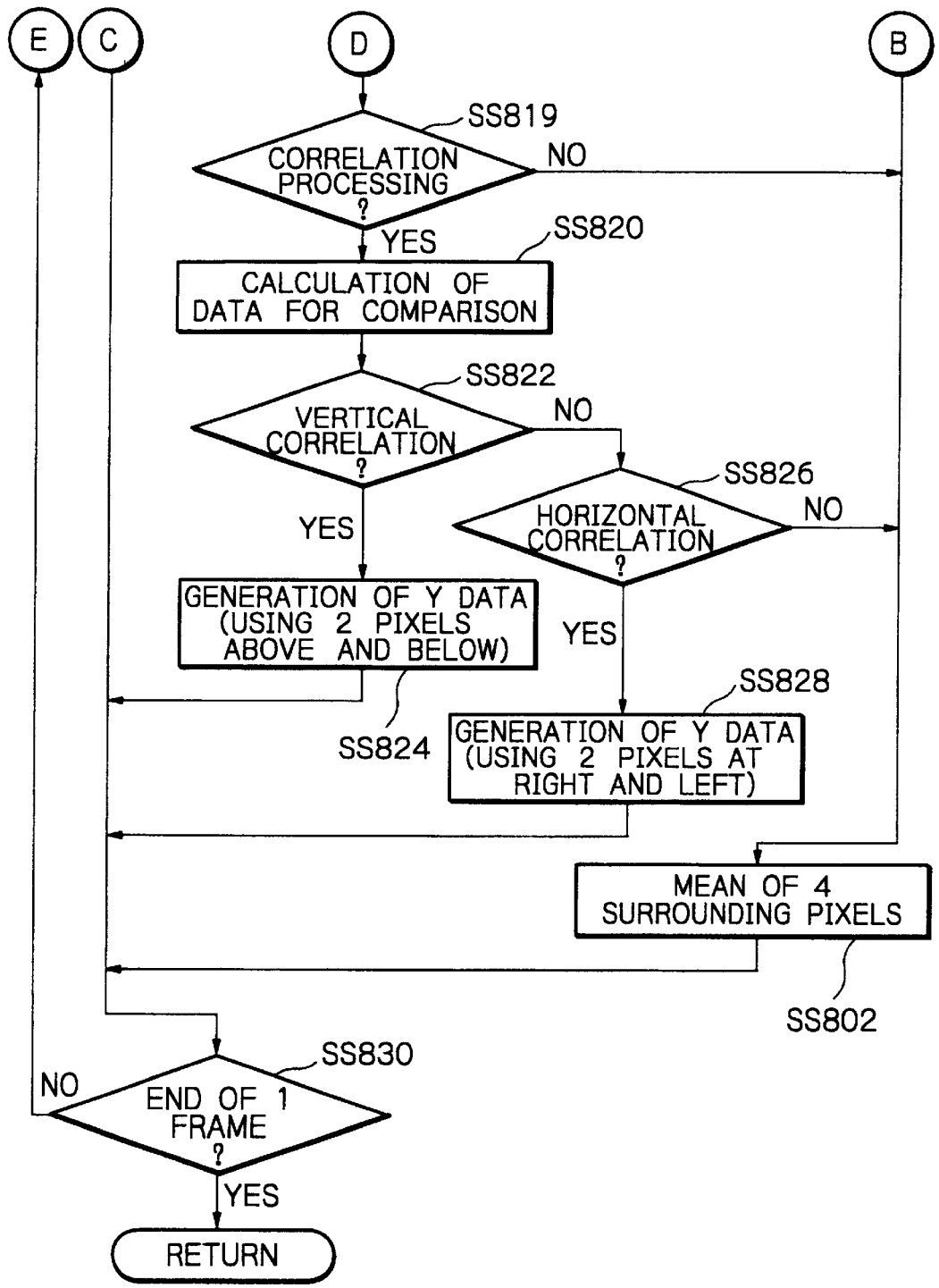

FIG. 39 shows the subroutine SUB6, FIG. 38, assigned to the data calculation 320 in detail. As shown, in a subroutine SUB8, luminance data Y are generated in a checker pattern giving consideration to colors to be obtained in correspondence to the positions of the actual photosensitive devices. The luminance data Y are calculated in a preselected mode that will be described later. In a subroutine SUB9, luminance data for virtual pixels where photosensitive elements are absent are generated, and the luminance data are increased in frequency. Let the luminance data with increased frequencies be labeled $Y_h$. In a subroutine SUB10, R, G and B plane rearrangement is executed by using the luminance data $Y_h$ and R, G and B.

The subroutines SUB8, SUB9 and SUB10 will be described more specifically hereinafter. First, the subroutine SUB8 will be described with reference to FIG. 41. As shown, whether or not an adaptive process mode is set is determined (substep SS800). If the answer of the substep SS800 is NO, then the operation is transferred to a substep SS802 shown in FIG. 40 via a transfer mark B. If the answer of the substep SS800 is YES, then the program advances to a substep SS801 for determining whether or not oblique correlation processing should be executed. If the answer of the substep SS801 is YES, then a substep SS804 is executed; if otherwise (NO, substep SS804), then a substep SS810 is executed.

Figure 42A:
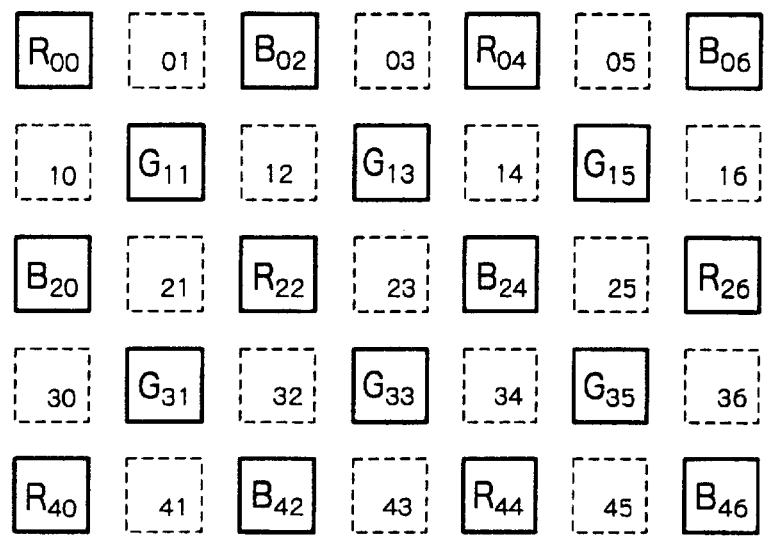
FIGS. 42A and 42B show a relation between the bidimensional arrangement of photosensitive devices and the arrangement of luminance data derived from the photosensitive devices.

In the substep SS802, luminance data is calculated without regard to the adaptive process mode. FIG. 42A shows the original bidimensional arrangement of the CCD image sensors of the image pick-up 31. In FIG. 42A, suffixes are representative of the positions of the devices or pixels in a matrix configuration. Also, solid squares and phantom squares are representative of actual pixels and virtual pixels, respectively. Basically, luminance data Y can be calculated by use of G pixel data and R and B pixel data (0.5*R+0.5B), as well known in the art. In this case, too, the G pixel data is directly dealt with as luminance data (G pixel data= luminance data). Assume that the color at the position of a certain actual photosensitive device is not G, but is R or B. Then, luminance data $Y_{21}$, for example, corresponding to the position of pixel data $R_{22}$ is produced by using the pixel data $R_{22}$ and four B pixel data $B_{02}$, $B_{20}$, $B_{24}$ and $B_{42}$ surrounding it, as follows:

$$Y_{22}=R_{22}/2+(B_{02}+B_{20}+B_{24}+B_{42})/8 \qquad \text{Eq. (16)}$$

Likewise, luminance data $Y_{24}$ corresponding to the position of pixel data $B_{24}$ is expressed by using the pixel data $B_{24}$ and four R pixel data $R_{04}$, $R_{22}$, $R_{26}$ and $R_{44}$ surrounding it, as:

$$Y_{24}=B_{24}/2+(R_{04}+R_{22}+R_{26}+R_{44})/8 \qquad \text{Eq. (17)}$$

Figure 42B:
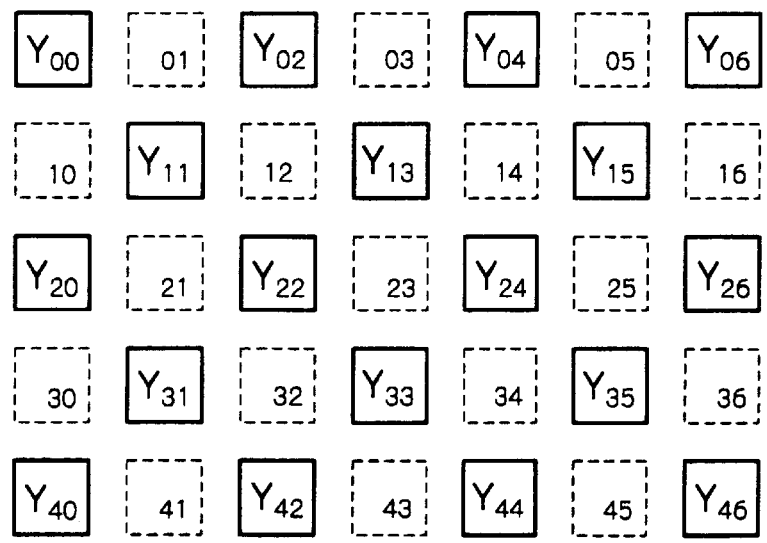
Figure 43A:
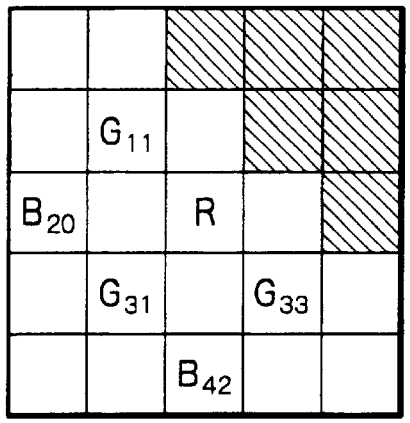
FIGS. 43A–43F show color boundary patterns allowing oblique correlations to be detected in the subroutine SUB8 of FIG. 40.
Figure 43B:
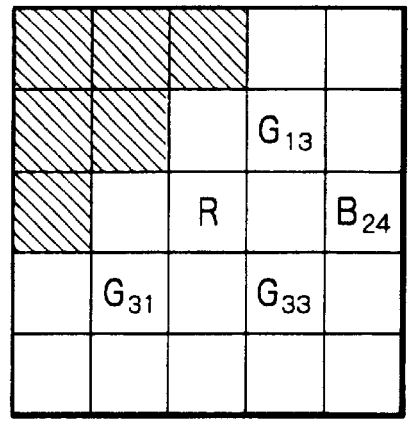
Figure 43C:
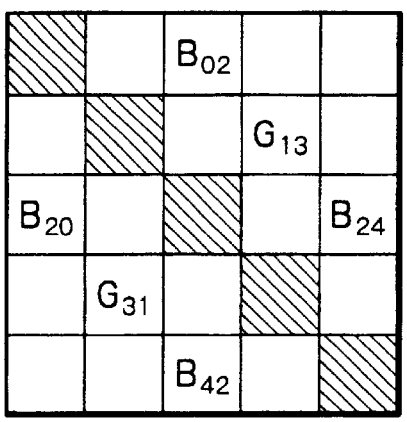
Figure 43D:
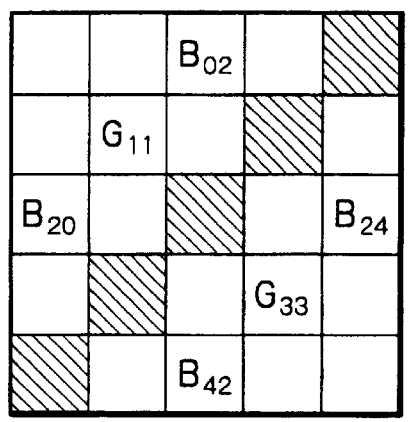
Figure 43E:
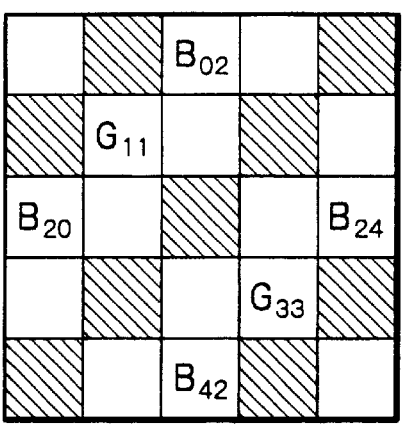
Figure 43F:
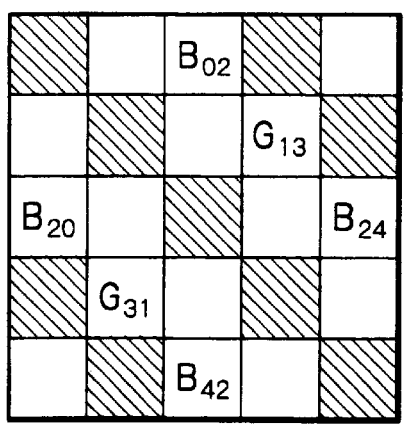

The resulting luminance data Y having a checker pattern are shown in FIG. 42B. Such a calculation is executed even when a correlation is not detected in any one of the oblique, vertical and horizontal directions. The substep SS802 is followed by a substep SS830 that will be described later.

In the substep SS804, data for comparison is generated for determining directions in which pixel data surrounding pixel data to be subjected to adaptive processing relate to the pixel data to be processed. For example, assuming the pixel data $R_{22}$ shown in FIG. 42A, data AG for comparison is produced by using surrounding pixel data $G_{11}$, $G_{13}$, $G_{31}$ and $G_{33}$, as follows:

$$AG=|G_{11}+G_{33}-(G_{13}+G_{31})| \qquad \text{Eq. (18)}$$

Surrounding G pixel data are also used to calculate data AG for comparison for B pixel data. One of the resulting values having a greater rightward or leftward slope is used as the data AG.

In a substep SS806 following the substep SS804, whether or not pixel data diagonally facing each other at opposite sides of pixel data to be processed have a correlation (oblique correlation hereinafter) is determined. For this decision, a reference value J1 is set beforehand. If the data AG is greater than, or equal to, the reference value J1 (YES, substep SS806), then a substep SS808 is executed; if otherwise (NO, substep SS806), a substep SS810 is executed.

In the substep SS808, a mean value of the four pixel data G used to calculate the data AG is produced as luminance data Y. By the oblique correlations, at least six patterns shown in FIGS. 43A–43F, are determined with respect to the pixel data $R=R_{22}$. It is likely that false colors appear around the boundaries between the areas with hatching and the areas without hatching shown in FIGS. 43A and 43B. However, when the luminance data Y of the R pixel data around the boundaries are calculated by the above procedure, false colors at the boundaries can be effectively reduced when seen in the entire picture. Luminance data Y of the pixel data $B=B_{24}$ can also be adaptively produced in the same manner as in the substeps SS806 and 808, although not described specifically in order to avoid redundancy. The substep SS808 is followed by a substep SS830 shown in FIG. 41 via a transfer mark C.

More specifically, in the substep SS810, data $ABR_V$ in the vertical direction and data $ABR_H$ in the horizontal direction for comparison are produced for the pixel data $R=R_{22}$ by using surrounding pixel data of the other color B, as follows:

$$ABR_V = |B_{02} - B_{42}| \quad \text{Eq. (19)}$$

$$ABR_H = |B_{20} - B_{24}| \quad \text{Eq. (20)}$$

Subsequently, in a substep SS811, whether or not a correlation is absent is determined. Specifically, new correlation values ($ABR_H - ABR_V$) and ($ABR_V - ABR_H$) are calculated by using the data $ABR_V$ and $ABR_H$ produced for comparison. If the two correlation values both are smaller than another preselected reference value J2, a correlation is determined to be absent in both of the horizontal and vertical directions (NO, substep SS811). This is also followed by the step SS802, FIG. 41, via the transfer mark B. If the answer of the substep SS811 is YES, then a substep SS812 is executed, determining that some correlation exists. When the processing is to be ended at this stage, the operation may be transferred to the substep SS830 via a transfer mark C.

In the substep SS812, whether or not pixel data vertically facing each other at opposite sides of pixel data to be processed have a correlation (vertical correlation hereinafter) is determined. For this decision, use is made of a reference value J2a. If a difference between the data $ABR_H$ and $ABR_V$ is greater than, or equal to, the reference value J2a, then it is determined that a vertical relation exists between the above pixel data (YES, substep SS812). This is followed by a substep SS814. If otherwise, (NO, substep SS812), then it is determined that no correlation exist between the pixel data. This is followed by a substep SS816.

The presence of a correlation between the above pixel data means that the values of the pixel data are close to each other. Therefore, in the substep SS814, luminance data Y is calculated by use of the pixel data $B_{02}$ and $B_{42}$ Specifically, the luminance data $Y_{22}$ is produced by:

$$Y_{22} = R_{22}/2 + (B_{02} + B_{42})/4 \quad \text{Eq. (21)}$$

Thereafter, the substep SS830 is executed via the transfer mark C, determining that the calculation of the luminance data Y for the pixel data observed has ended.

In the substep SS816, whether or not pixel data horizontally facing each other at opposite sides of pixel data to be processed have a correlation (horizontal correlation hereinafter) is determined. For this decision, use is made of a reference value J2b. If a difference between the data $ABR_H$ and $ABR_V$ is greater than, or equal to, the reference value J2b, then it is determined that a horizontal relation exists between the above pixel data (YES, substep SS816). This is followed by a substep SS818. If otherwise, (NO, substep SS816), then it is determined that no correlation exist between the pixel data. This is followed by a substep SS819, FIG. 41, via a transfer mark D.

In the substep SS818, luminance data Y is calculated by use of the pixel data $B_{20}$ and $B_{24}$ having been determined to have a correlation. In this case, the luminance data $Y_{22}$ is produced by:

$$Y_{22} = R_{22}/2 + (B_{20} + B_{24})/4 \quad \text{Eq. (22)}$$

Thereafter, the substep SS830 is executed via the transfer mark C, determining that the calculation of the luminance data Y for the pixel data observed has ended.

In the substep SS819, whether or not a correlation between, e.g., B pixels surrounding an R pixel should be detected is determined. Because an R pixel is located at the center of surrounding B pixels, the distance between the pixels determined in the substep SS812 or SS816 is short. Therefore, whether or not a correlation exists in a narrower range is determined by the following procedure. If the answer of the substep SS819 is YES, then the program advances to a substep SS820. If the answer of the substep SS819 is NO, then the program advances to the step SS802, determining that neither one of the reference values J2a and J2b different from J2 is satisfied. The following procedure may not be executed, if desired, in which case the substep SS819 will be simply followed by the substep SS802.

In the substep SS820, data for comparison are again calculated. In this case, data are produced in the vertical and horizontal directions by determining correlations between the pixel data being observed and the surrounding pixel data and adding the resulting correlation values. As for the luminance data Y for the pixel data $R_{22}$, data for comparison $ACR_V$ and $ACR_H$ are produced by using surrounding pixel data of the other color B, as follows:

$$ACR_V = |B_{02} - R| + |B_{42} - R| \quad \text{Eq. (23)}$$

$$ACR_H = |B_{20} - R| + |B_{24} - R| \quad \text{Eq. (24)}$$

The substep SS820 is followed by a substep SS822. By using the data $ACR_V$ and $ACR_H$, it is possible to further reduce the distance between the pixel data and therefore to detect correlations within a much narrower range than in the substeps SS812–SS818.

In the substep SS822, whether or not pixel data vertically facing each other at opposite sides of pixel data to be processed have a correlation is determined. For this decision, use is made of a reference value J3 (which may be divided into J3a and J3b for horizontal and vertical, respectively). If a difference between the data $ACR_H$ and $ACR_V$ is greater than, or equal to, the reference value J3, then it is determined that a vertical relation exists between the above pixel data (YES, substep SS822). This is followed by a substep SS824. If otherwise, (NO, substep SS822), then it is determined that no correlation exist between the pixel data. This is followed by a substep SS826.

If a difference between the data ($ACR_V - ACR_H$) is greater than, or equal to, the reference value J3 (YES, step SS826), the program advances to a substep SS828, determining that a horizontal correlation exists. In this case, luminance data Y in the substep SS828 is calculated by using pixel data and Eq. (22), as stated earlier in relation to the substep SS818. This is followed by the substep SS830. If the answer of the substep SS826 is NO, then the program advances to the substep SS802, determining that a horizontal correlation does not exist. In the substep SS802, the pixel data being observed and the pixel data of the other color (B in this case) are added and then averaged by use of the Eq. (16) and then multiplied by a coefficient of 0.5 to thereby output luminance data Y. This is followed by the substep SS830.

In the substep SS830, whether or not one frame of luminance data having the checker pattern have been fully generated is determined. This can be done only if, e.g., the calculated luminance data Y are counted and compared with the photosensitive devices to see if the former is coincident in number with the latter or not. If the answer of the substep SS830 is NO, then the program returns to the substep SS800, FIG. 40, via a transfer mark E, determining that the processing has not ended. If the answer of the substep SS830 is YES, then the program returns to the subroutine SUB9. As a result, the luminance data Y are generated at the positions where the photosensitive devices are arranged in a checker pattern, as shown in FIG. 42B.

Figures 44A, 44B, 44C, 44D:
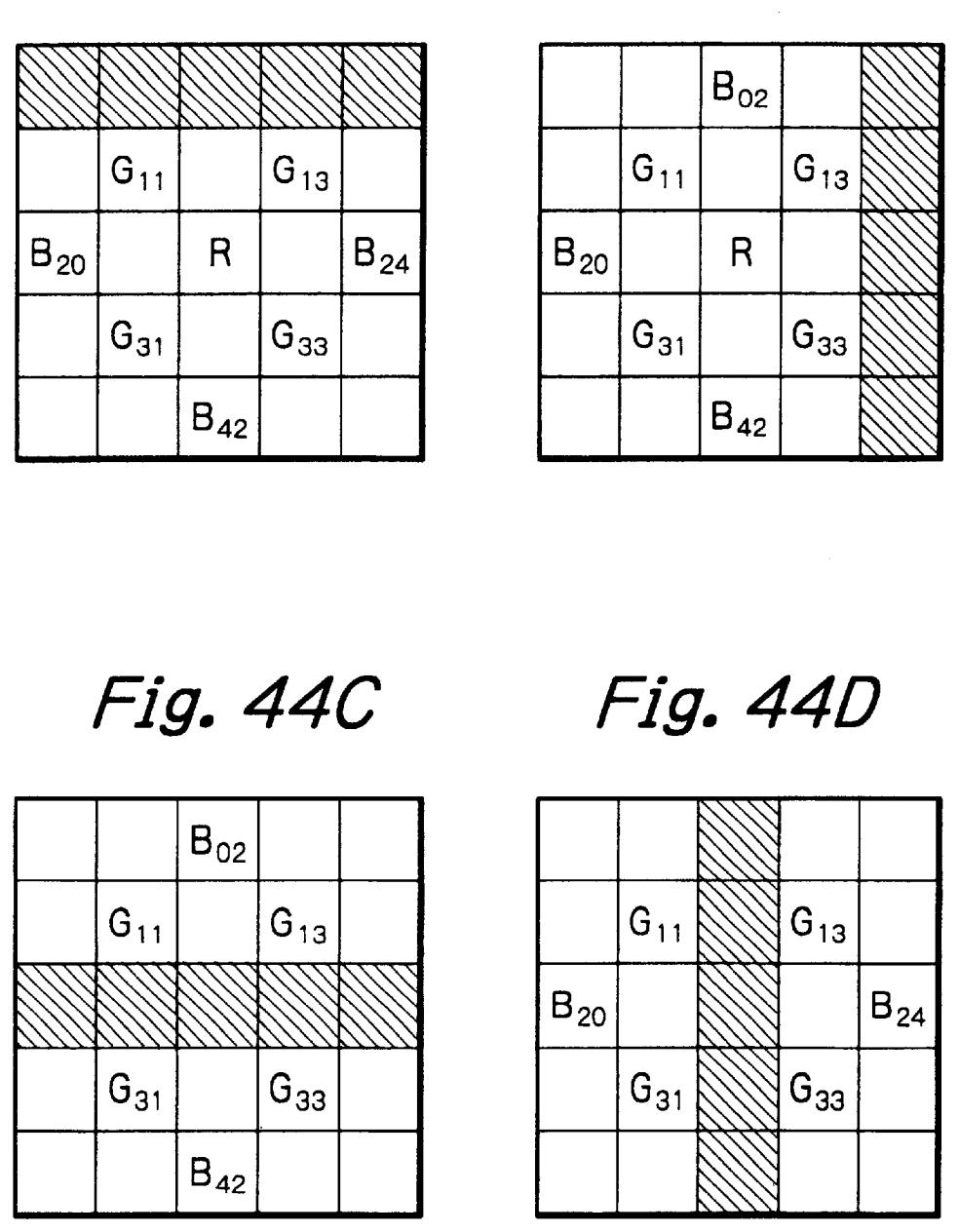
Figure 45A:
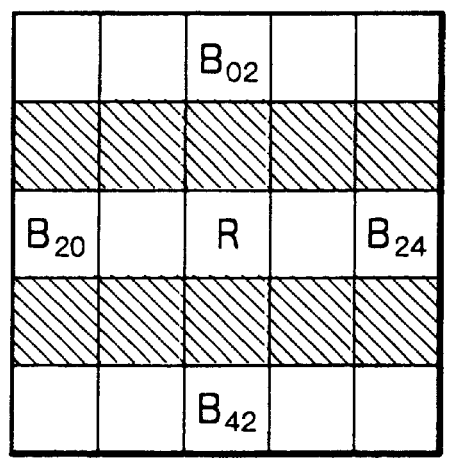
FIGS. 45A and 45B show patterns with which color boundaries are difficult to determine in the subroutine SUB8 of FIGS. 40 and 41.
Figure 45B:
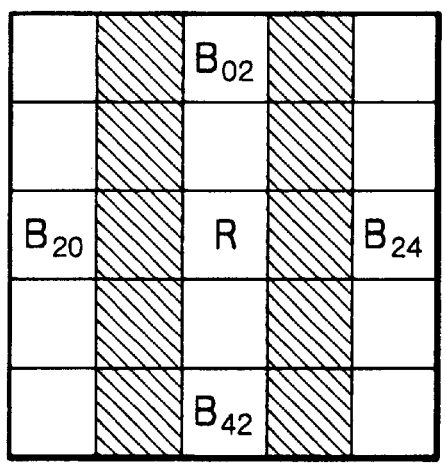

In the image including a color boundary shown in FIG. 43 or 44 specifically, the direction of the color boundary can be estimated on the basis of the direction of a correlation. On the other hand, assume that luminance data for a pixel R ($=R_{22}$) shown in FIG. 45 is to be calculated from the surrounding pixel data $B_{02}$, $B_{20}$, $B_{24}$ and $B_{42}$. Then, a correlation cannot be determined in the horizontal direction or the vertical direction.

Figure 46:
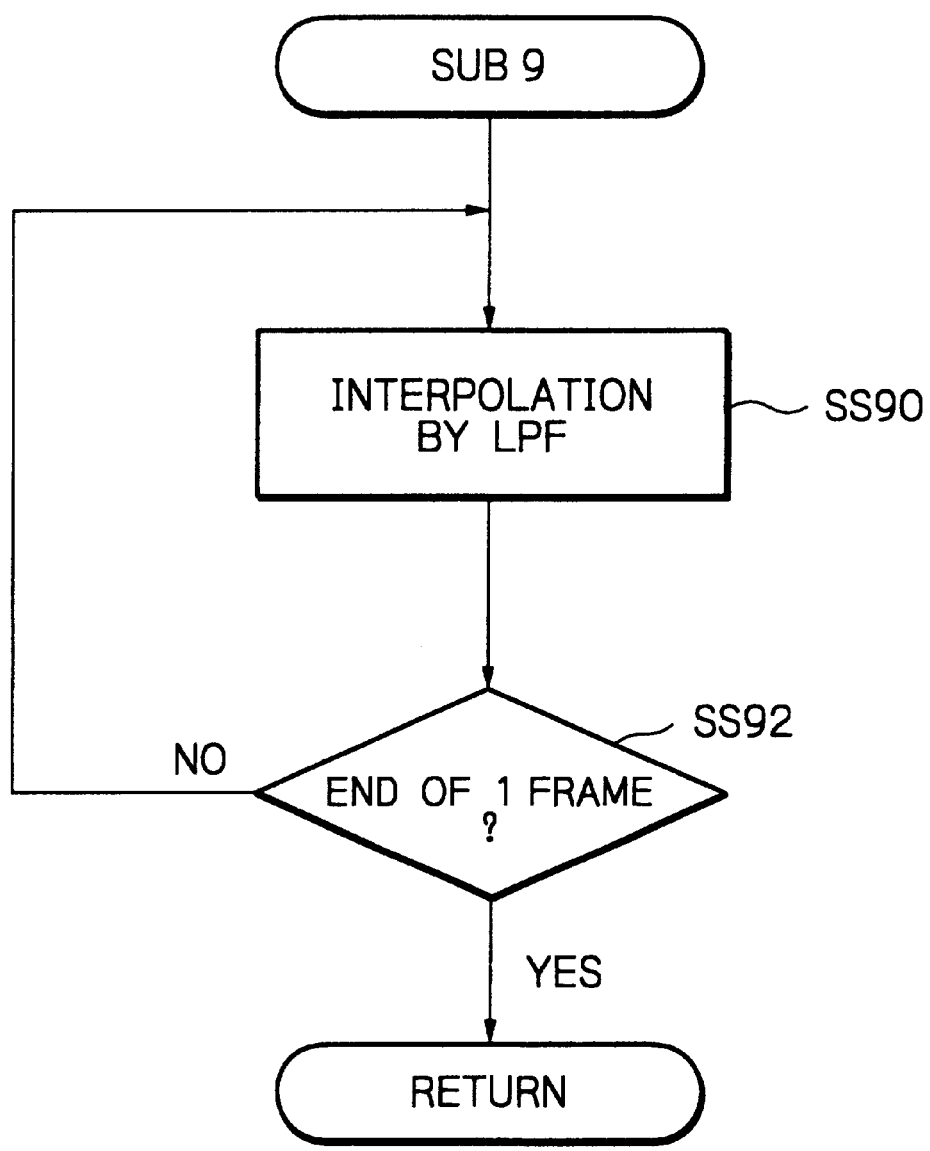
FIG. 46 is a flowchart showing a subroutine SUB9 included in the flowchart of FIG. 39 in detail.
Figure 47:
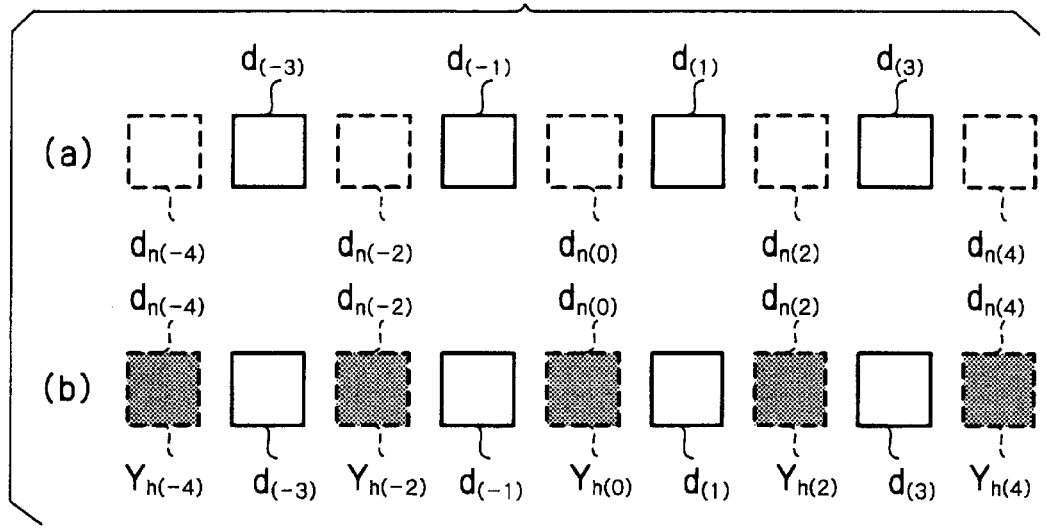
FIG. 47 shows how pixel data are interpolated while low pass filter processing is under way in the flowchart of FIG. 46.

The subroutine SUB9 included in the subroutine SUB6 will be described with reference to FIG. 46 in detail. The subroutine SUB9 is based on the construction of the digital filter included in the high frequency luminance data generation 320c, as stated earlier. In the subroutine SUB9, low pass filter processing unique to the digital filter is executed, and pixel data for virtual pixels are generated for interpolation. FIG. 47 demonstrates the interpolation executed together with the low pass filter processing. In FIG. 47, pixels $d_{(-3)}$, $d_{(-1)}$, $d_{(1)}$ and $d_{(3)}$ corresponding to actual photosensitive devices are indicated by solid lines while pixels corresponding to virtual photosensitive devices are indicated by phantom lines and interposed between the actual photosensitive devices or pixels. Pixels $d_{n(-4)}$, $d_{n(-2)}$, $d_{n(0)}$, $d_{n(2)}$ and $d_{n(4)}$ corresponding to the virtual photosensitive devices are assumed to store no data in relation to the actual photosensitive devices, i.e., ZEROs are set in the pixels $d_{n(-4)}$–$d_{n(4)}$ beforehand. Assume that the pixel $d_{n(0)}$ shown in part (a), FIG. 47, is to be interpolated in the horizontal direction. Then, luminance data $Y_{h(0)}$ shown in part (b), FIG. 47, is produced on the assumption that the digital filter has tap coefficients of $k_0$, $k_1$, $k_2$, $k_3$, $k_4$, . . . , $k_n$, as follows:

$$Y_{h(0)}=k_0{}^*d_{n(0)}+k_1{}^*(d_{(1)}+d_{(-1)})+k_2{}^*(d_{n(-2)}+d_{n(2)})+k_3{}^*(d_{(-3)}+d_{(3)})+k_4{}^*(d_{n(-4)}+d_{n(4)})+\ldots+k_n{}^*(d_{n(-n)}+d_{n(n)}) \quad \text{Eq. (25)}$$

In this case, however, zero data alternate with the actual data, as shown in part (a), FIG. 47, so that the number of coefficients is doubled. This is also true with the other pixels $d_{n(-4)}$, $d_{n(-2)}$, $d_{n(2)}$ and $d_{n(4)}$ to be interpolated. By the interpolation, luminance data $Y_{h(-4)}$, $Y_{h(-2)}$, $Y_{h(2)}$ and $Y_{h(4)}$ shown in part (b), FIG. 47, are produced.

Figure 48:
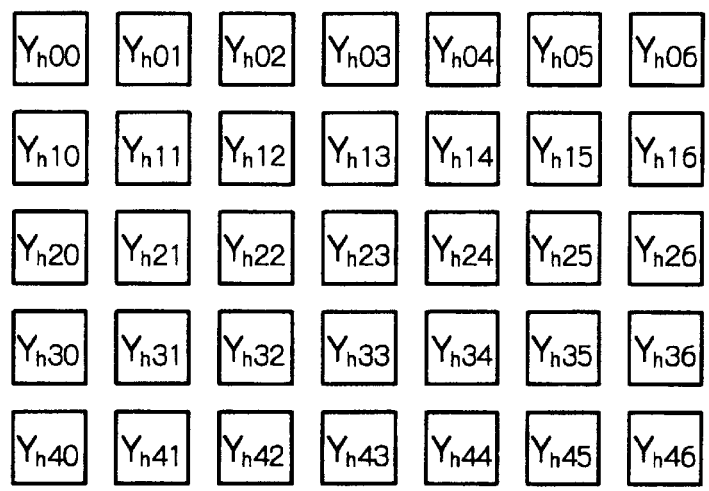
FIG. 48 shows a relation between luminance data lying in a high frequency range and output by the procedure of FIG. 46 and the bidimensional arrangement of pixel data.

As for the vertical direction, the low pass filter processing is also executed by the high frequency luminance data generation 320c. At this stage, data of the pixels corresponding to the virtual photosensitive devices have already been interpolated by the above horizontal interpolation, i.e., pixel data have already been density arranged. The low pass filter processing can therefore be executed with the usual number of coefficients. Assume that the resulting high frequency components are represented by a matrix, as shown in part (b), FIG. 42. Then, luminance data $Y_h$ including high frequency components are generated, as shown in FIG. 48. Let the luminance data $Y_h$ including high frequency components be referred to as high frequency luminance data hereinafter.

Figure 49:
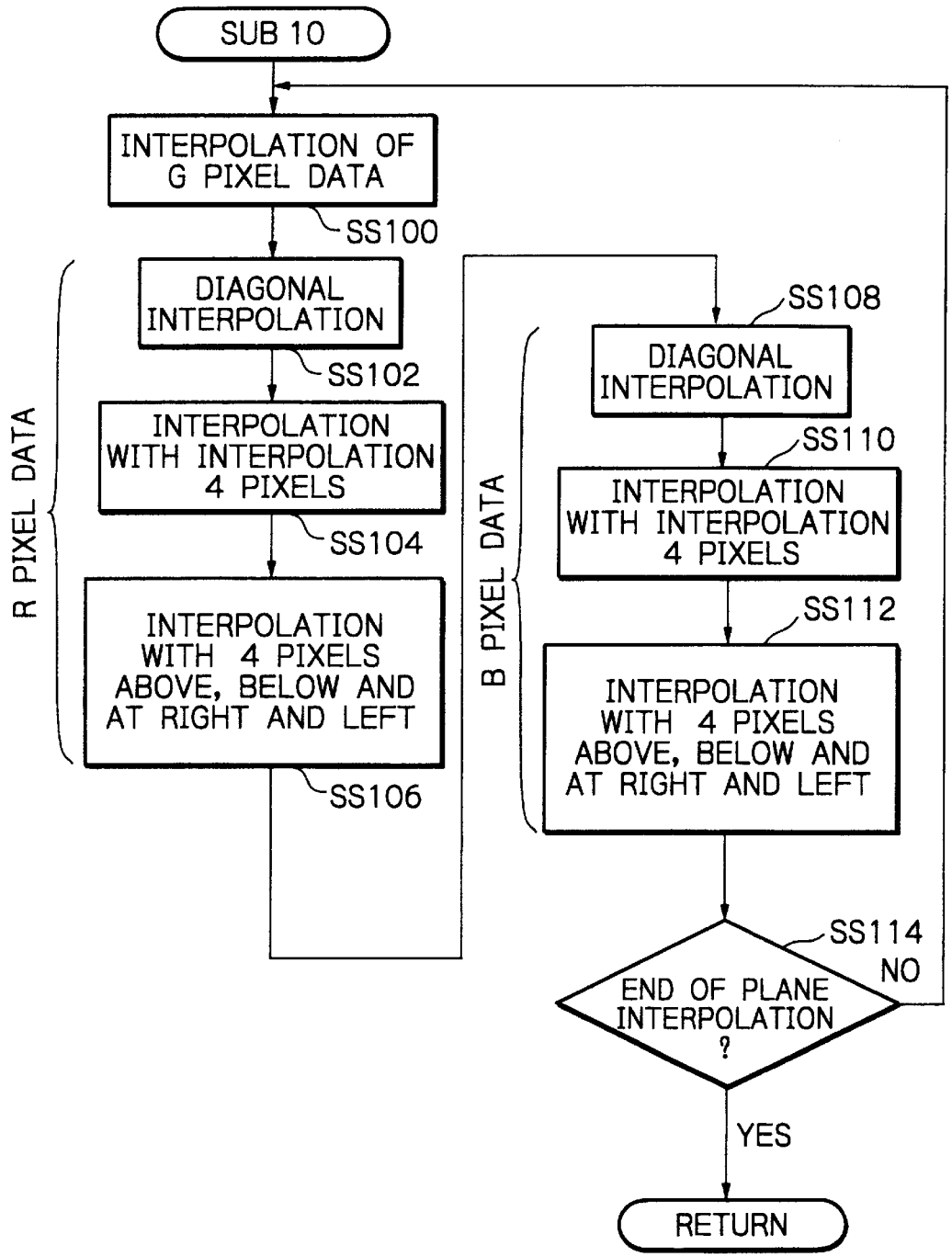
FIG. 49 is a flowchart showing a subroutine SUB10 included in the flowchart of FIG. 39 in detail.

The subroutine SUB10 shown in FIG. 49 is as follows. As shown in FIG. 37, the subroutine SUB10 is assigned to the plane interpolation/rearrangement 320d. The high frequency luminance data $Y_h$ generated in the subroutine SUB9 and the pixel data of a color to be interpolated and corresponding to the data $Y_h$ are input to the preselected calculating sections included in the interpolation/rearrangement 320d. As shown in FIG. 37, the high frequency data $Y_h$ is fed to all of the R, G and B interpolation/rearrangements 3200–3204. Such pixel data are used to interpolate pixel data for the virtual photosensitive devices color by color, as will be described with reference to FIG. 49. First, the G pixel data are interpolated (substep SS100). Because a G stripe, RB full-checker pattern shown in FIG. 50 specifically is used, pixels storing existing pixel data G are represented by solid squares. On the other hand, pixels not storing G pixel data, i.e., pixels corresponding to the virtual photosensitive devices and pixels of colors other than G are represented by phantom squares. Let the pixels not storing pixel data G be referred to as virtual pixels. For interpolation, a group of four existing pixel data are used at a time.

Figure 50:
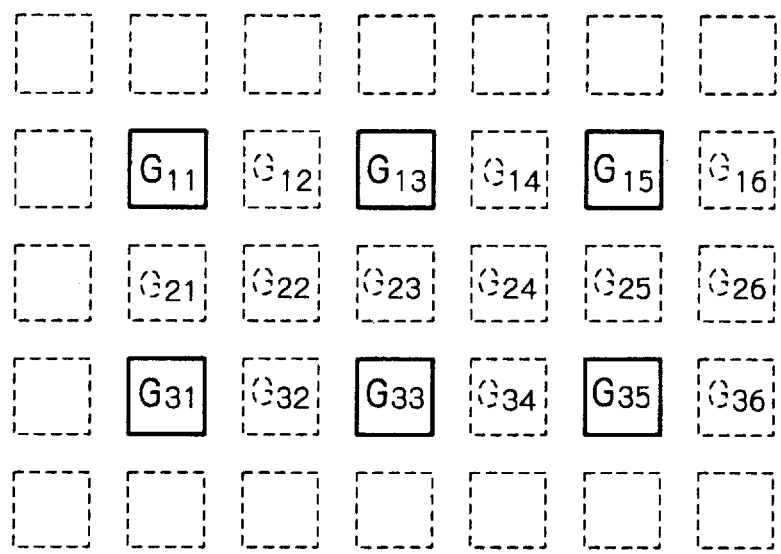
FIG. 50 shows a positional relation between pixel data to be interpolated and existing pixels to be dealt with in the subroutine SUB10 of FIG. 49 as to G pixel data.

Specifically, assume the pattern shown in FIG. 50 including virtual pixels $G_{12}$, $G_{14}$, $G_{16}$, $G_{21}$, . . . , $G_{26}$. When the row including the virtual pixels $G_{32}$, $G_{34}$ and $G_{36}$ should be interpolated, four adjoining pixel data $G_{11}$, $G_{13}$, $G_{31}$, and $G_{33}$, four adjoining pixel data $G_{13}$, $G_{15}$, $G_{33}$ and $G_{35}$ and so forth are used. In addition, for the calculation, the high frequency luminance data shown in FIG. 48 and corresponding to the G pixel data to be used for interpolation are used. The pixel data $G_{21}$, for example, stored in a virtual pixel is interpolated by using existing data corresponding to two pixels of the same row as the above virtual pixel and high frequency luminance data as well as the luminance data of the position to be interpolated, as follows:

$$G_{21}=(G_{11}+G_{31})/2-(Y_{h11}+Y_{h31})/2+Y_{h21} \quad \text{Eq. (26)}$$

With the above Eq. (26), it is possible to interpolate the virtual pixel $G_{23}$. Likewise, the virtual pixel $G_{12}$ is interpolated by using existing data of two pixels on the same row as the pixel $G_{12}$ and high frequency luminance data as well as the high frequency luminance data of the position to be interpolated, as follows:

$$G_{12}=(G_{11}+G_{13})/2-(Y_{h11}+Y_{h13})/2+Y_{h12} \quad \text{Eq. (27)}$$

With the above equation (27), it is possible to interpolate the virtual pixel $G_{32}$. The pixel data $G_{22}$ located at the center of the four pixel data $G_{11}$, $G_{13}$, $G_{31}$ and $G_{33}$ is produced by using the pixel data and high frequency luminance data of the four positions, as follows:

$$G_{22}=(G_{11}+G_{13}+G_{31}+G_{33})/4-(Y_{h11}+Y_{h13}+Y_{h31}+Y_{h33})/4+Y_{h22} \quad \text{Eq. (28)}$$

With the above equation (28), it is possible to interpolate the virtual pixel $G_{23}$. When interpolation is effected with the four pixel data $G_{13}$, $G_{15}$, $G_{33}$ and $G_{35}$ regarded as a group, it suffices to calculate the pixel data $G_{14}$, $G_{34}$ and $G_{25}$ because the pixel data $G_{23}$ has already been calculated. This operation is repeated to complete the plane image of the pixel data G. However, such a relation does not hold at the outermost edges of the plane image. In light of this, boundary values may be set for accurate interpolation beforehand. Of course, the data at the peripheral portion of the image do not have to be calculated because they are positioned outside of an effective picture.

Figure 51:
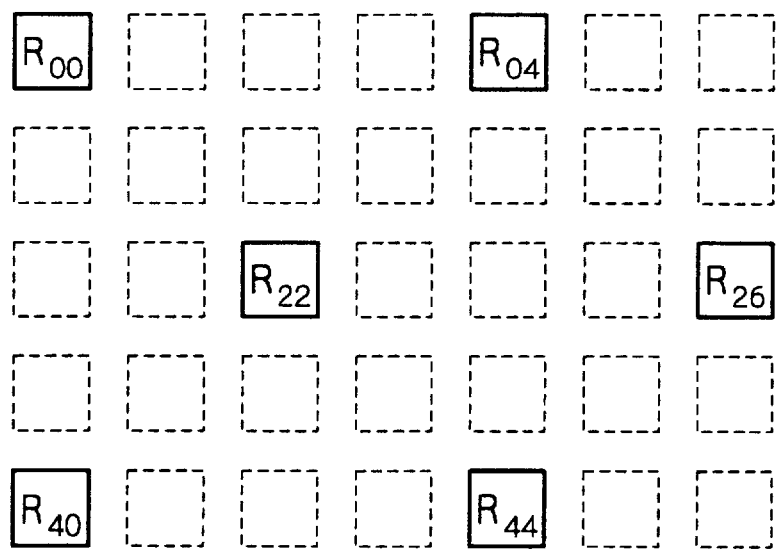
FIG. 51 shows a positional relation between pixel data to be interpolated and existing pixels to be dealt with in the subroutine SUB10 of FIG. 49 as to R pixel data.

Subsequently, in a substep SS102, pixel data R are calculated. Again, pixels corresponding to existing data and calculated pixel data are represented by solid squares while virtual pixels are represented by phantom squares. As shown in FIG. 51, existing pixel data R are only $R_{00}$, $R_{04}$, $R_{22}$, $R_{26}$, $R_{40}$ and $R_{44}$. In this case, in the substep SS102, two pixel data obliquely adjoining a virtual pixel to be interpolated and high frequency luminance data, FIG. 48, corresponding to the two pixels are used. For example, the pixel data $R_{11}$ is calculated by using the pixel data $R_{00}$ and $R_{22}$ and associated high frequency luminance data $Y_{h00}$ and $Y_{h22}$, as follows:

$$R_{11}=(R_{00}+R_{22})/2-(Y_{h00}+Y_{h22})/2+Y_{h11} \qquad \text{Eq. (29)}$$

Likewise, the virtual pixels $R_{11}$, $R_{31}$ and $R_{33}$ are calculated by applying the pixel data $R_{04}$ and $R_{22}$, pixel data $R_{40}$ and $R_{22}$ and pixel data $R_{44}$ and $R_{22}$, respectively, to the relation represented by the Eq. (29). If the existing pixel data $R_{26}$ is also taken into account, then the virtual pixels $R_{15}$ and $R_{35}$ can also be generated by the oblique interpolation. The calculated pixel data are shown in FIG. 52.

In a substep SS104, a pixel surrounded by the pixels calculated in the substep SS102 is interpolated. For interpolation, the four calculated pixel data and associated high frequency luminance data are used. For example, as shown in FIG. 52, pixel data $R_{24}$ is calculated by use of the surrounding pixel data $R_{13}$, $R_{15}$, $R_{33}$ and $R_{35}$ and associated high frequency luminance data, as follows:

$$R_{24}=(R_{13}+R_{15}+R_{33}+R_{35})/4-(Y_{h13}+Y_{h15}+Y_{h33}+Y_{h35})/4+Y_{h24} \qquad \text{Eq. (30)}$$

When the surrounding pixels satisfy a relation equivalent to the Eq. (29), the pixel data $R_{02}$, $R_{20}$ and $R_{42}$ shown in FIG. 53 are attained by interpolation. Stated another way, all the pixel data to be used for interpolation are positioned obliquely, as seen from the pixel to be interpolated.

In a substep SS106, the pixel data produced by the foregoing substeps are used. Among them, the pixel data above, below and at the right and left of a pixel to be interpolated are used for interpolation. For example, pixel data $R_{12}$ is calculated by use of four pixel data above, below and at the right and left of the data $R_{12}$ and associated high frequency luminance data, as follows:

$$R_{12}=(R_{02}+R_{11}+R_{13}+R_{22})/4-(Y_{h02}+Y_{h11}+Y_{h13}+Y_{h22})/4+Y_{h12} \qquad \text{Eq. (31)}$$

Pixel data $R_{14}$, $R_{32}$ and $R_{34}$ in the same positional relation can be calculated if data are substituted for the Eq. (30). If the rightmost pixels in FIG. 53 are followed by other pixels, then pixel data $R_{16}$ and $R_{36}$ can also be calculated.

Figure 54:
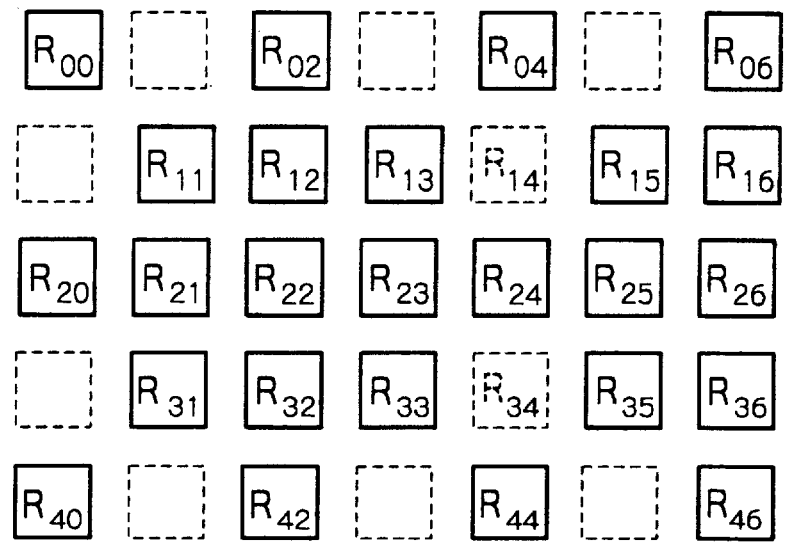
FIG. 54 shows a positional relation produced by adding interpolation using four pixel data above, below and at the right and left of pixels to be interpolated to the relation of FIG. 52.
Figure 55:
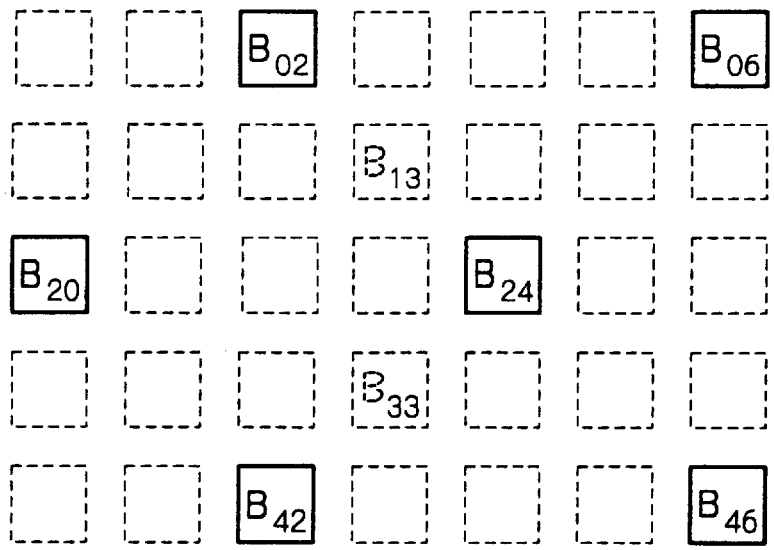
FIG. 55 shows a positional relation between pixel data to be interpolated and existing pixels to be dealt with in the subroutine SUB10 of FIG. 49 as to B pixel data.

As shown in FIG. 54, virtual pixels not interpolated are left at the peripheral portion of the image. Such virtual pixels may each be interpolated on the basis of three pixels surrounding it and by using the above scheme. For example, the pixel data of a virtual pixel $R_{01}$ is calculated by:

$$R_{01}=(R_{00}+R_{02}+R_{11})/3-(Y_{h00}+Y_{h02}+Y_{h11})/3+Y_{h02} \qquad \text{Eq. (32)}$$

Pixel data $R_{03}$, $R_{05}$, $R_{10}$, $R_{30}$, $R_{41}$, $R_{43}$ and $R_{45}$ are interpolated in the same manner as the pixel data $R_{01}$. Finally, the entire plane picture relating to the pixel data R is interpolated.

Subsequently, substeps SS108, SS110 and SS112 are executed for the interpolation of pixel data B. The substeps SS108, SS110 and SS112 are respectively oblique interpolation, center interpolation using four data, and center interpolation using pixels above, below and at the right and left of a pixel to be interpolated.

Such interpolation conforms to the R pixel data interpolation, i.e., the steps S102–S106. This will be seen by comparing the R pixel data of FIG. 51 and the B pixel data of FIG. 55. Specifically, in FIG. 55, the B pixel data are different from the R pixel data R of FIG. 51 in that they are shifted by each two columns in the horizontal direction, i.e., the direction of row from the matrix represented by the suffixes. In light of this, to interpolate a virtual pixel by using the Eqs. (29)–(32), it is preferable to execute calculation by adding "2" to the suffixes representative of the columns of the pixel data located at the right-hand side and greater than 2 inclusive. To calculate, e.g., the pixel data $B_{13}$ or $B_{33}$, the color B is substituted for the color R of the Eq. (29), and the positional relation between the pixel data $R_{00}$ and $R_{31}$ is related to the pixel data $B_{02}$ and $B_{33}$, as follows:

$$B_{11+2}=(B_{00+2}+B_{22+2})/2-(Y_{h00+2}+Y_{h22+2})/2+Y_{h11+2}$$

$$B_{13}=(B_{02}+B_{24})/2-(Y_{h02}+Y_{h24})/4+Y_{h13} \qquad \text{Eq. (33)}$$

$$B_{31+2}=(B_{22+2}+B_{40+2})/2-(Y_{h22+2}+Y_{h40+2})/4+Y_{h31+2}$$

$$B_{33}=(B_{24}+B_{42})/2-(Y_{h24}+Y_{h42})/2+Y_{h33} \qquad \text{Eq. (34)}$$

To interpolate pixel data at the left-hand side where the suffixes representative of columns are smaller than "2", calculation may be executed, like the calculation of the pixel data $R_{13}$ using the pixel data $R_{04}$ and $R_{22}$, subtracting "2" from the suffixes. For example, the pixel data $B_{11}$ is produced by:

$$B_{13-2}=(B_{04-2}+B_{22-2})/2-(Y_{h04-2}+Y_{h22-2})/2+Y_{h13-2}$$

$$B_{11}=(B_{02}+B_{20})/2-(Y_{h02}+Y_{h20})/4+Y_{11} \qquad \text{Eq. (35)}$$

The same relation in the other Eqs. (30)–(32). By executing interpolation in the substeps SS110 and SS12 while considering the above relation, it is possible to rearranged the B pixel data in a plane. This is followed by a substep SS114.

In the substep SS114, whether or not the plane interpolation/rearrangement has been completed with all of the colors is determined. If the answer of the step SS114 is NO, then the program returns to the substep SS100. This decision may be effected color by color, if desired. If the answer of the substep SS114 is YES, then the program ends the subroutine SUB6 and advances to a subroutine SUB7.

Figure 56:
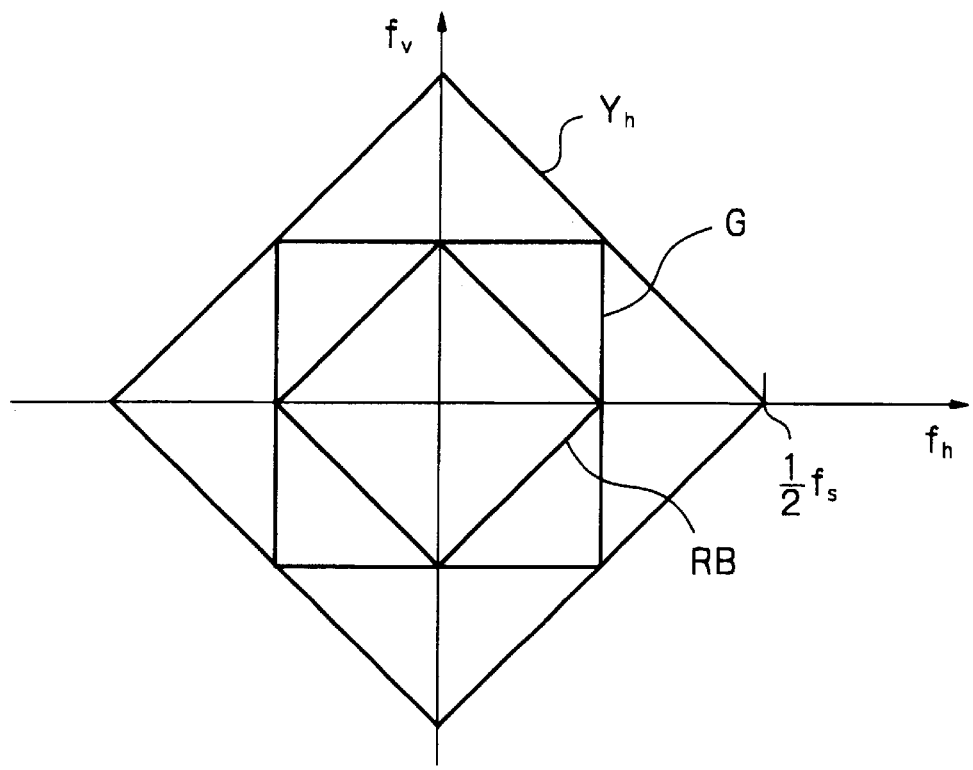
FIG. 56 shows a relation between horizontal spatial frequency bands derived from the processing particular to the fourth embodiment.

FIG. 56 shows the data produced in the subroutine SUB6 in terms of the frequency band of a signal. In FIG. 56, the ordinate and abscissa respectively indicate frequencies ($f_v$) in the vertical direction and frequencies ($f_h$) in the horizontal direction. As shown, the R and B pixels arranged in a checker pattern and alternating with each other by each two pixels are represented by a distribution indicated by a line RB. By contrast, the G pixels having a distribution indicated by a line G contains the distribution RB because they are arranged in a stripe pattern by four pixels including pixel shift and are therefore high in frequency. The spatial frequency of the G pixels G intersects the horizontal and vertical frequency axes at substantially $f_s/4$, The high frequency luminance signals $Y_h$ produced by interpolation contain the two distributions G and RB, as indicated by a line $Y_h$, and have a frequency band extending to $f_s/2$.

Figure 57A:
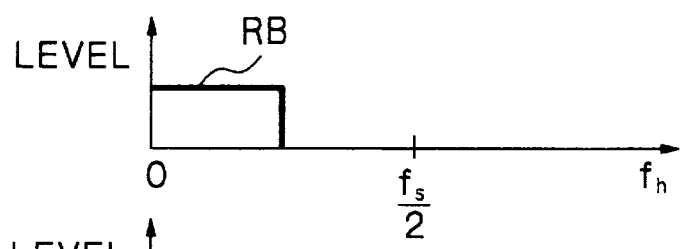
FIGS. 57A, 57B and 57C show graphs each showing a particular relation between each processing included in the fourth embodiment and the horizontal spatial frequency band.
Figure 57B:
Figure 57C:
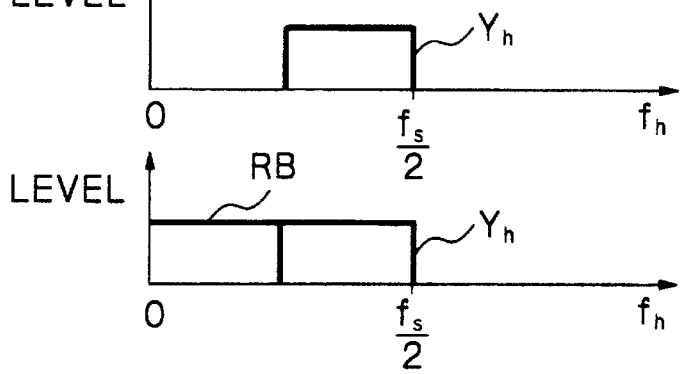

FIGS. 57A–57C show frequency bands each derived from particular processing. In FIGS. 57A–57C, the ordinate and abscissa respectively indicate signal levels and spatial frequencies in the horizontal direction. A signal RB shown in FIG. 57A, is representative of a frequency band derived from the digitization of the R and B image signals. A high frequency luminance signal $Y_h$ shown in FIG. 57B is representative of a frequency band occurring when the data output form the high frequency luminance data generation 320c are regarded as a signal. The signal $Y_h$ has a cut-off frequency of around $f_s/2$ at the high frequency side. The plane interpolation/rearrangement 320d executes interpolation in such a manner as to combine the signals RB and $Y_h$, thereby producing a spatial frequency band in the horizontal direction shown in FIG. 57C. R, G and B plane images produced by such processing are used as high frequency component data.

Figure 58:
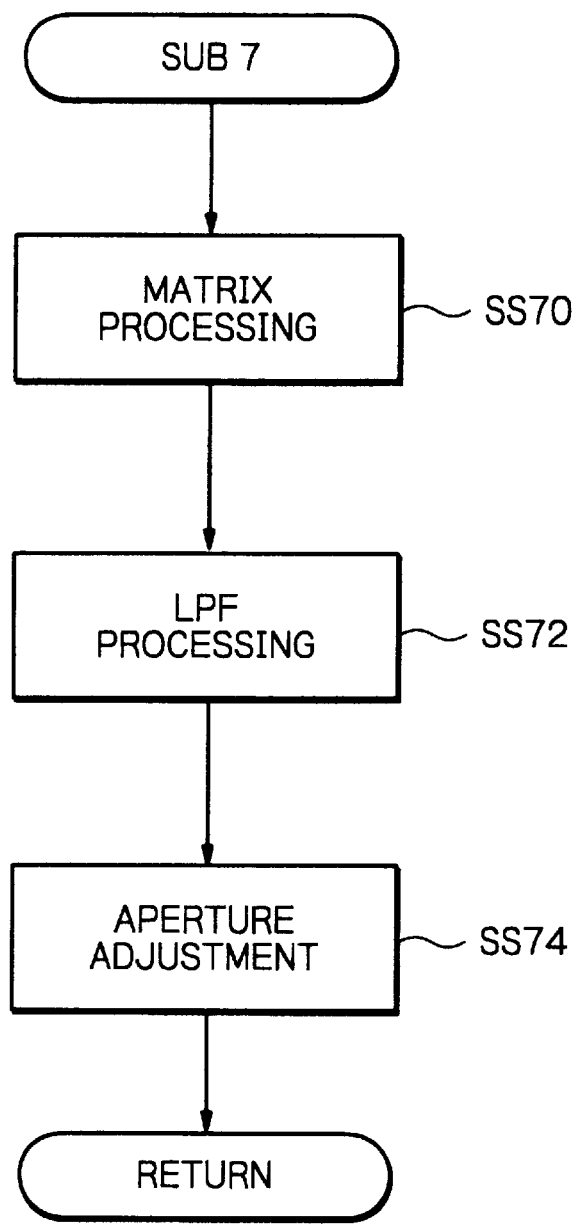
FIG. 58 is a flowchart showing a subroutine SUB7 included in the flowchart of FIG. 38 in detail.

FIG. 58 shows the subroutine SUB7 in detail. As shown, in a substep SS70, the matrix 322 executes matrix processing with the R, G and B data output from the signal processing 32c, thereby producing luminance data Y and chrominance data (R−Y) and (B−Y). Then, in a substep SS72, LPF processing extending over a broad range is effected in order to reduce aliasing distortions. The LPF processing is assigned to the antialiasing filter 324 and produces chrominance data $(R-Y)=C_r$ and $(B-Y)=C_b$. The luminance data Y are further subjected to aperture adjustment by the aperture adjustment 326, FIG. 36, (substep SS74). Thereafter, the program returns to the main routine of the apparatus 30.

The image signals or data produced by the above procedure have a resolution higher than the original resolution. This, coupled with the fact that false signals apt to appear at color boundaries are reduced, further improves the quality of the image.

The apparatus 30 is applicable even to a multi-filter system, e.g., a two-filter system in which a subject picked up through the optics is projected on two imaging surfaces. In the two-filter system, photosensitive devices forming the two imaging surfaces are bidimensionally arranged in the direction of row and the direction of column. In addition, the photosensitive devices are arranged such that when the identical images incident to the two imaging surfaces are spatially superposed on each other, the centers of the geometrical imaging surfaces are shifted by half a pitch from each other in the direction of row and the direction of column. In this case, the color filters are positioned in front of the photosensitive devices and configured such that they constitute an RGB color filter when spatially superposed on each other. By executing the previously stated signal processing with the resulting image signals, it is also possible to produce a high quality image including a suppressive of pseudo colors.

The apparatus 30 may be provided with a plane-sequential type of construction. Specifically, The apparatus 30 includes optics, a filter switching section, a moving section, and a recording section at its stage preceding the signal processing stage. The optics focuses the image of a subject on a single imaging surface. The filter switching section inserts one of the filters CF into the optical path between the optics and a bidimensionally arranged image pick-up. The moving section moves the image pick-up within a bidimensional plane parallel to the imaging surface. Every time the image pick-up is moved by the moving section, an image picked up is plane-sequentially written to a recording section. Every time the image pick-up section is moved, the resulting image is shifted from the immediately preceding image by half a pitch in both of the direction of row and that of column. In this case, too, a high quality image with a minimum of false colors is achievable if the image signals are subjected to the previously stated processing.

The above construction noticeably reduces the load on the calculating section heretofore required to execute signal processing in accordance with shifted pixels. This has heretofore been done in order to detect correlation values in the horizontal and vertical directions for improving resolution in the two directions. In addition, the illustrative embodiment reduces the scale of circuitry for increasing resolution in the horizontal and vertical directions to their limits. Further, the honeycomb arrangement insures the size and therefore sensitivity of the individual pixel and increases yield on a production line. As for image quality, uniform interpolation, for example, is successful to reduce false colors particular to a single-filter system. Particularly, when a digital camera is constructed by use of an imaging apparatus with optics using a silver halide sensitive type of film, false colors can be reduced without resorting to an optical low pass filter.

Because the illustrative embodiment makes it needless to detect correlation values in the horizontal and vertical directions, it can increase resolutions up to or over the conventional limits while noticeably reducing signal processing requirements. It follows that the circuit scale can be maintained adequate even when the software processing is replaced with hard wired processing.

A digital camera in accordance with the present invention and a recording and/or reproducing method therefor will be described hereinafter. A digital camera implemented as a digital still camera or a digital video camera is used to produce an electric signal representative of a scene and record and reproduce it in the form of digital data. It will be seen from the foregoing description that a digital camera uses an IC (Integrated Circuit) memory, magnetic recording medium, magnetooptical recording medium or similar recording medium in place of the conventional silver halide sensitive type of film.

Figures 59, 59A:
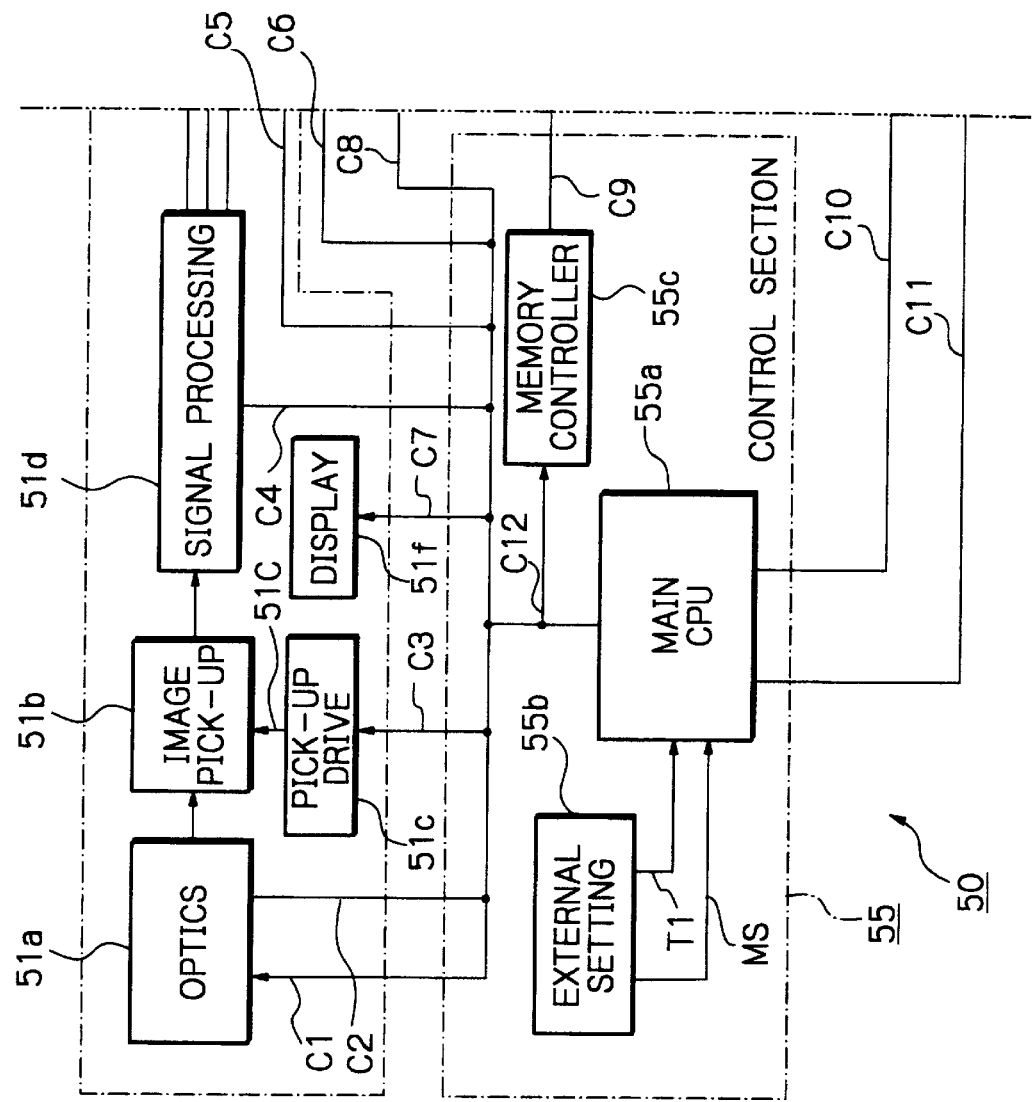

Reference will be made to FIGS. 59–73 for describing the digital camera of the present invention implemented as a digital still camera by way of example. As shown in FIGS. 59A and 59B, the digital still camera, generally 50, includes a camera section 51, a reproducing section 52, a switch or selector(i.e., camera/reproduction selector) 53 for selecting either the camera section 51 or the reproducing section 42, a recording/reproduction 54, and a control section 55.

Figure 60:
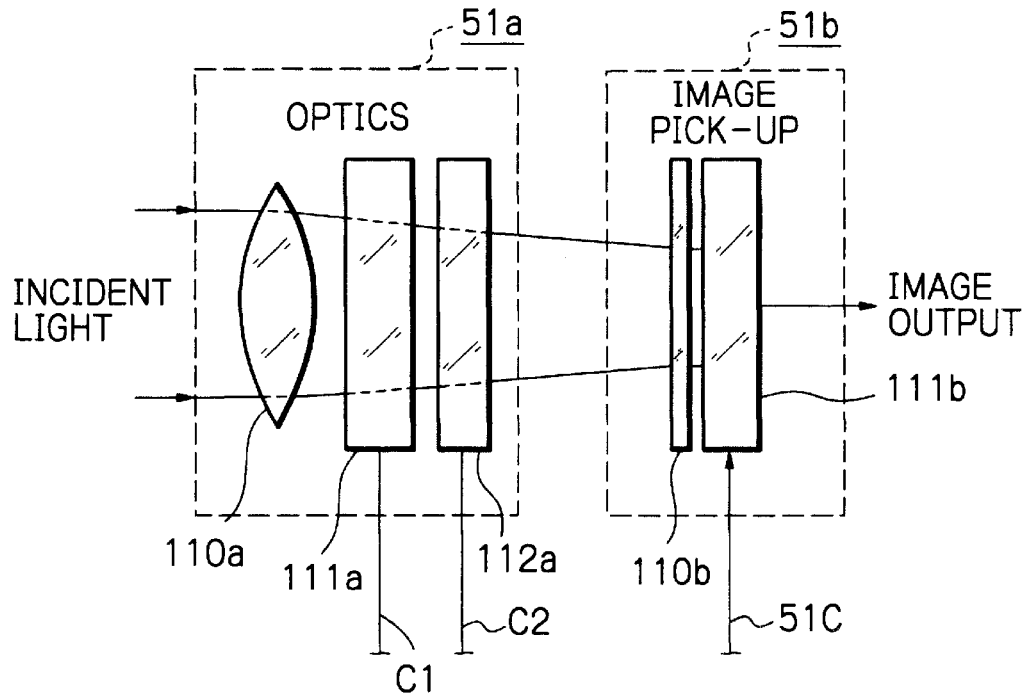
FIG. 60 is a schematic block diagram showing optics and an image pick-up section shown in FIG. 59A.

The camera section 51 includes optics 51a, an image pick-up 51b, a pick-up drive 51c, a signal processing 51d, an amount-of-data adjustment 51e, a display 51f, and a mode selection 51g. As shown in FIG. 60 specifically, the optics 51a is made up of the lens 110a for focusing incident light on the imaging surface of a photosensitive section, an iris adjusting mechanism 111a for adjusting the quantity of light transmitted through the lens 110a, and a shutter mechanism 112a for adjusting the duration exposure. The mechanisms 111a and 112a cooperate to adjust the quantity of light to be incident to the image pick-up 51b in response to control signals C1 and C2, respectively, output from the control section 55. The control signals C1 and C2 are based on the output of a photosensor not shown. When the camera 50 has an autofocus function, the lens 110a has its focal distance controlled by the control section 55.

Figure 61:
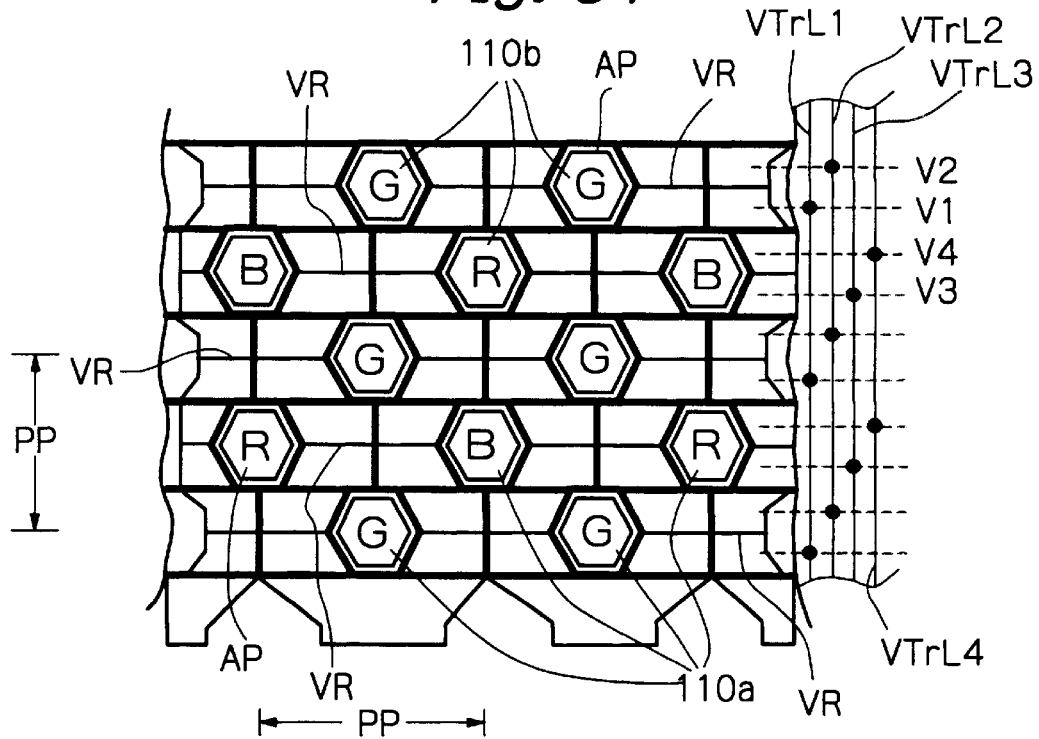
FIG. 61 shows a relation between a photosensitive section with a honeycomb arrangement and a color filter included in an image pick-up section of FIG. 60 and seen from the imaging surface side.

As also shown in FIG. 60 specifically, the image pick-up 51b is made up of a color filter 110b and a photosensitive section 111b. The color filter 110b has a honeycomb arrangement with shifted pixels and having an RGB spectral characteristic. The photosensitive section 111b outputs an electric signal corresponding to the quantity of light passed through the color filter 110*b*. As shown in FIG. 61, vertical transfer lines VTrL1–VTrL4 deliver, via electrodes, (not shown) signals output from photosensitive devices or cells to vertical transfer registers VR. The registers VR sequentially transfer the input signals in the vertical direction of the photosensitive section 111*a* in response to, among control signals 51C output from the pick-up drive 51*c*, FIG. 59A, vertical transfer drive signals V1–V4.

The pick-up drive 51*c* generates a drive signal in response to a control signal C3 output from the control section 55 (see FIG. 59A). The pick-up drive 51*c* feeds a drive signal 112*b* to the photosensitive section 111*b* of the image pick-up 51*b* in order to cause it to read the output signals of the photosensitive section lllb over all of the pixels. The pick-up drive 51*c* feeds the drive signals 51C to the photosensitive section lllb even when the image pick-up 51*b* has an electronic shutter function. The pick-up drive 51*c* makes the amount of exposure adequate by controlling the iris and shutter and the timing of an electronic shutter via the image pick-up 51*b*.

The positional relation between the color filter 110*b* and the photosensitive section 111*b* will be outline with reference to FIG. 61. As shown, the photosensitive section 111*a* includes apertures AP arranged in a honeycomb pattern and each having a hexagonal shape. If desired, each aperture AP may have a square configuration rotated by 45 degrees, e.g., a rhombic configuration or may be octagonal.

As shown in FIG. 61, photosensitive devices are positioned beneath the color filter 110*b* covering the apertures AP. Assume that the photosensitive devices are arranged at a pixel pitch PP in both of the horizontal and vertical directions. Then, the apertures AP are bidimensionally arranged such that the consecutive rows and consecutive columns each are shifted in the horizontal and vertical directions, respectively, by the pixel pitch PP. When the apertures AP each is implemented as a polygon having four or more sides, they may be densely arranged without any space in matching relation to the polygon. For example, to densely arrange the hexagonal apertures AP shown in FIG. 61, they may be shifted by one half of the pixel pitch PP in the horizontal and vertical directions. Such a dense arrangement depends on the shape of each aperture AP.

Figure 62A:
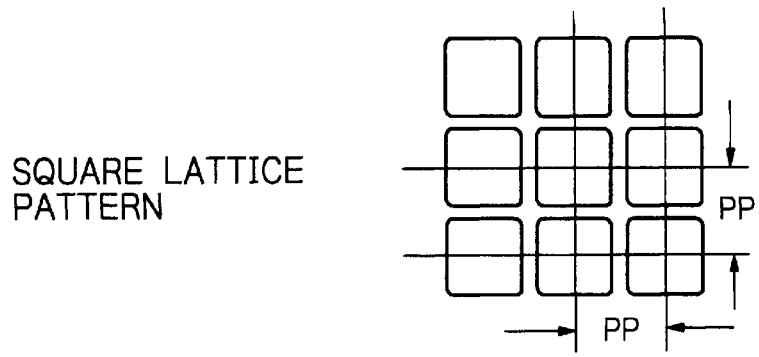
FIGS. 62A and 62B show a relation between the honeycomb arrangement of FIG. 61 and a square lattice arrangement.
Figure 62B:
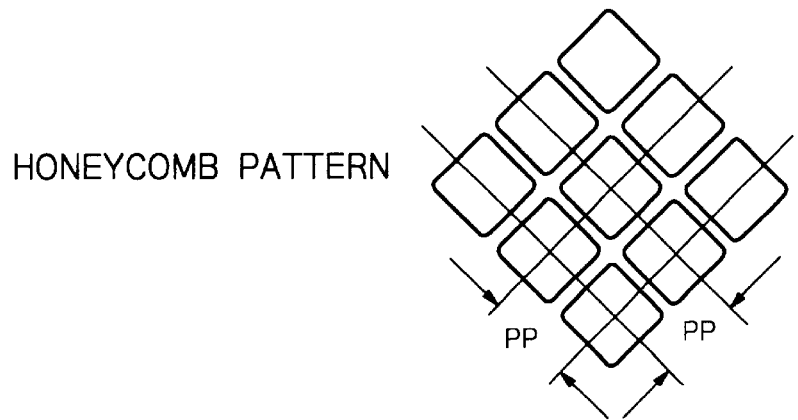
Figure 63:
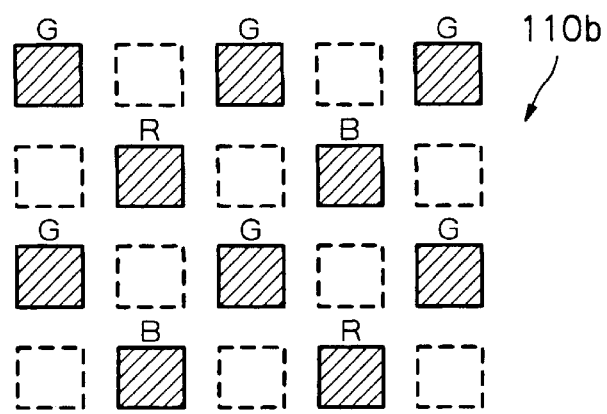
FIG. 63 shows the honeycomb arrangement of a color filter shown in FIG. 60.

As for the image pick-up 51*b*, the conventional square lattice arrangement and the honeycomb arrangement compare as follows. FIG. 62A shows a square lattice arrangement having a pixel pitch PP of N $\mu$m in both of the horizontal and vertical directions. As shown in FIG. 62B, the honeycomb arrangement is equivalent to the square arrangement rotated by an angle of 45 degrees. Further, as shown in FIG. 63, the color filter 110*b* equivalent in arrangement with the honeycomb arrangement constitute a G stripe, RB fullchecker pattern. That is, the filters of three primary colors R, G and B are shifted in accordance with the shifted arrangement of the photosensitive devices. In FIGS. 62A and 62B, phantom squares are representative of virtual pixels where photosensitive devices are absent. In the pattern shown in FIG. 63, R and B may be replaced with each other. The filter of three primary colors R, G and B may be replaced with a filter of complementary colors, if desired.

Assume that the square lattice arrangement has nearby pixels spaced by a distance of |PP|=N $\mu$m in both of the horizontal and vertical directions. Then, the nearby pixels of the honeycomb arrangement are spaced by a distance of $N*(2)^{-1/2}$ which is shorter than the distance |PP| (see FIG. 64A). With the honeycomb arrangement, therefore, it is possible to arrange the pixels more densely than with the square lattice arrangement. This, in principle, realizes a $2^{1/2}$ times higher resolution in both of the horizontal and vertical directions. When the honeycomb configuration is rearranged into the square lattice configuration matching with an output format, interpolation is executed with the virtual pixels represented by circles in FIG. 64B, on the basis of the pixels surrounding them and represented by dots in FIG. 64B. It will be seen that by rearranging the honeycomb configuration into the square lattice configuration while effecting interpolation, it is possible to achieve higher resolution than by simply arranging the photosensitive devices in the square lattice configuration.

Figure 65:
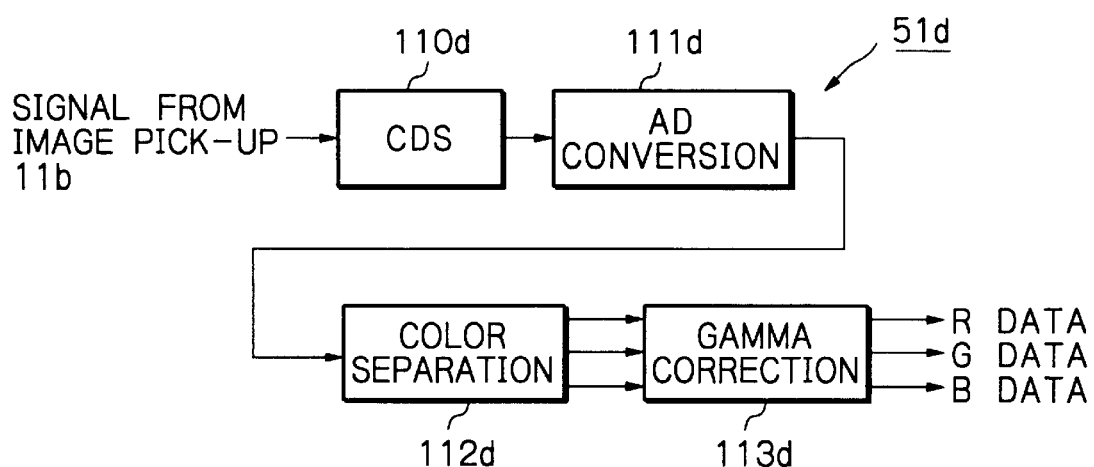
FIG. 65 is a schematic block diagram showing a signal conversion section shown in FIG. 59A.

The signal processing 51*d* samples the output of the image pick-up 51*b* in accordance with a control signal C4 output from the control section 55 (see FIG. 59A) and executes various kinds of signal processing with the sampled signals. As shown in FIG. 65 specifically, the signal conversion 51*b* includes a CDS (Correlated Double Sampling) 110*d*, an AD conversion 111*d*, a color separation 112*d*, and a gamma correction 113*d*. The CDS 110*d* samples and holds the output of the image pick-up 51*d* two times and performs subtraction with the resulting two signal levels in order to reduce noise. The AD conversion 111*d* converts the output of the CDS 110*d* to a digital signal. The color separation 112*d* separates the output of the AD conversion 111*d* into R, G and B signals. The gamma correction 113*d* multiplies the signals output from the color separation 112*d* by a coefficient in order to convert the tonality of the signals. For example, the gamma correction 113*d* executes conversion such that its output signal has a gamma value of 0.45.

Figure 66:
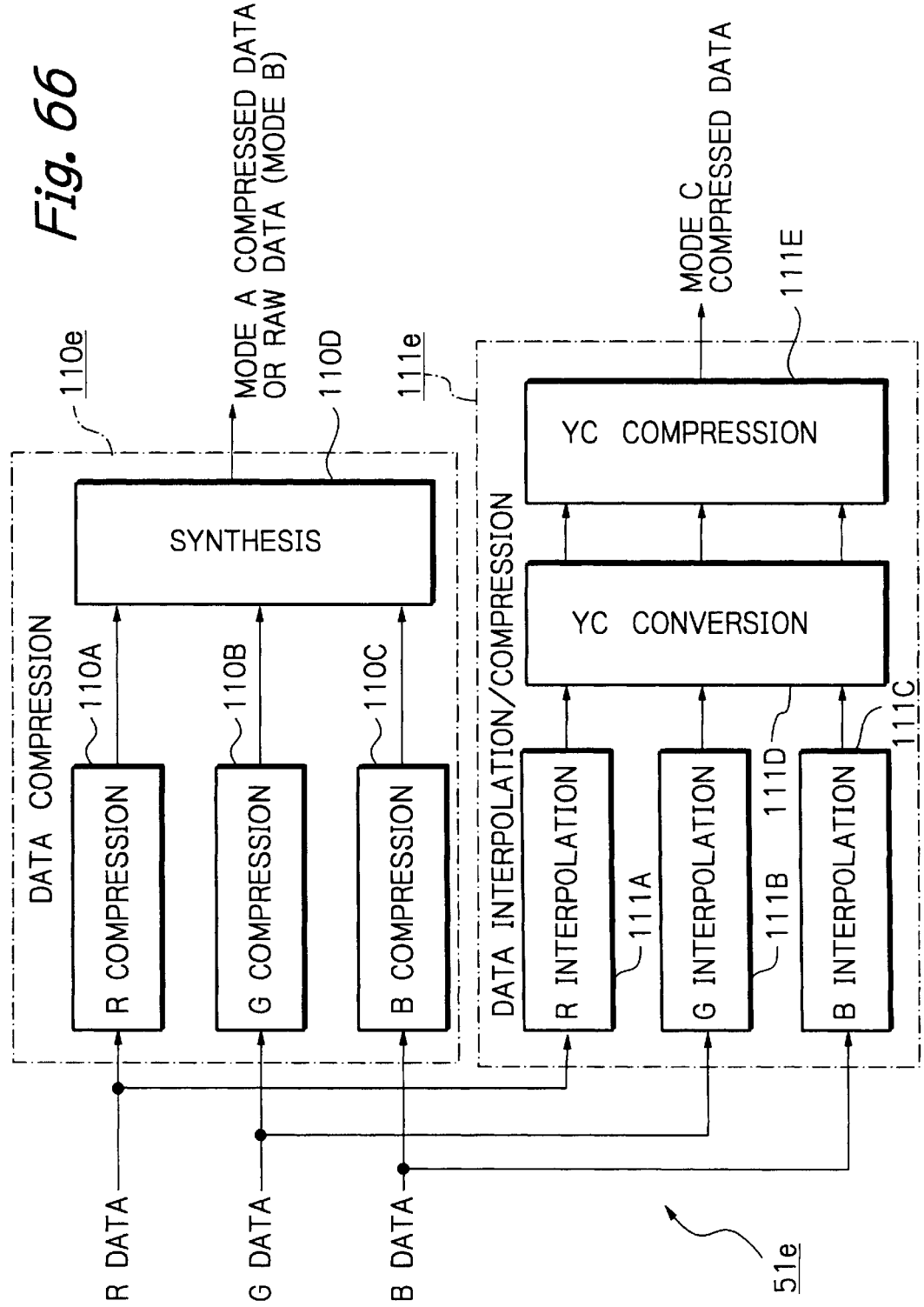
FIG. 66 is a schematic block diagram showing an amount-of-data adjustment section shown in FIG. 59B.

The amount-of-data adjustment 51*e* compresses and interpolates the output signals of the signal processing 51*d* in accordance with control signals C5 output from the control section 55, thereby adjusting the amount of data. Specifically, as shown in FIG. 66, the adjustment 51*e* is made up of a data compression 110*e* and a data interpolation/compression 111*e*. The data compression 110*e* and data interpolation/compression 111*e* each executes respective processing in response to a particular control signal C5, although not shown in FIG. 66 specifically. The data compression 110*e* compresses the output signals of the signal processing 51*d*. The data compression 110*e* is selectively operable in a mode A for compression or a mode B for non-compression or through processing. The data interpolation/compression 111*e* interpolates and compresses the output signals of the signal processing 51*d*. The compression effected by the interpolation/compression 111*e* will be referred to as a mode C hereinafter.

Specifically, the data compression 110*e* has an R, a G and a B compression 110A, 110B and 110C, respectively, and a synthesis 110D. The data interpolation/compression 111*e* has an R, a G and a B interpolation 111A, 111B and 111C, respectively, a YC conversion 111D, and a YC compression 111E.

The R, G and G compressions 110A–110C execute compression based on differential PCM (Pulse Code Modulation) processing or JPEG (Joint Photograph Experts Group) compression processing with the R, G and B data, respectively. The differential PCM processing is based on the fact that a pixel to be coded and surrounding pixels have a high correlation. For the JPEG compression, when use is made of, e.g., a base line system, an input image (raster image) is divided into subblocks each having 8×8 pixels. Each subblock of pixel data are subjected to DCT (Discrete Cosine Transform). As a result, the pixel data lying in the time domain are transformed to DCT coefficients, i.e., data lying in the frequency domain and multiplied by weighting coefficients fed from a quantization table. Then, the DCT coefficients are subjected to zigzag Huffman coding from DC components to AC components. For the JPEG compression, the R, G and B compressions 110A–110C each regards the R, G or B data as luminance signal components. The YC compression 111E also executes the JPEG compression except that it compresses the luminance signal and two chrominance signals. The YC conversion 111D preceding the YC compression 111E transforms the R, G and B data to the luminance signal Y and two chrominance signals (R−Y) and (B−Y) while effecting 4:2:2 subsampling.

Calculations for interpolation to be performed by the R, G and B interpolations 111A–111C will be described specifically later. The data compression 110e adds an identification (ID) code representative of the mode A or B to the head of the data. Likewise, the interpolation/compression 111e adds an ID code representative of the mode C to the head of the data.

A switch or write mode selector 51g has terminals 1a and 1b respectively connected to the outputs of the data compression 110e and data interpolation/compression 111e included in the amount-of-data adjustment 51e. The switch 110e selects either one of the signals output from the data compression 110e and interpolation/compression 111e in response to a control signal C6 output from the control section 55. The control signal C6 is representative of mode set information input on an external mode setting 55b included in the control section 55, as will be described specifically later. The camera section 11 therefore outputs a signal adjusted in the amount of data in the mode A, B or C. It is to be noted that when a continuous shoot command is input, the switch 51g selects a write mode practicable with a short signal processing time, i.e., the mode B in the illustrative embodiment.

The display 51f is implemented as, e.g., an electronic viewfinder or an LCD (Liquid Crystal Display). The display 51f displays a scene being picked up via the optics 51a and superposes on the scene, e.g., information set on the camera 50 in accordance with a control signal C7 output from the control section 55.

As shown in FIG. 59B, the selecting section 53 is a switch having a terminal 3a connected to the camera section 51, a terminal 3b connected to the reproducing section 52, and a terminal 3c connected to the data input/output terminal, not shown, of the recording/reproduction 54. The switch 53, like the switch 51g, transfers the input signal to the camera section 51 or the reproducing section 52 in response to a control signal C8 output from the control section 55, i.e., depending on the record/reproduce mode of the camera 50.

For the recording/reproduction 54, use is made of, e.g., an IC memory card or similar semiconductor memory, a magnetic disk or an optical disk formatted in accordance with the standard of the camera 50. The recording/reproduction 54 records or reproduces image data in response to a control signal C9 output from a memory controller 55c included in the control section 55. Specifically, the recording/reproduction 54 writes image data fed from the camera section 51 in a record mode or reads them out in a reproduce mode.

The reproducing section 52 includes a write mode detection 52a, a switch or read mode selector 52b, and an image reproduction 52c. Before reproduction, the reproducing section 52 must determine the mode in which the image data were written to the recording/reproduction 54. For this purpose, the write mode detection 52a detects the previously mentioned ID code in response to a control signal C10 output from the control section 55. Then, the write mode detection 52a selects a read mode matching with the detected write mode and delivers a selection signal S2 representative of the read mode to the switch 52b. At this instant, the write mode detection 52a feeds the data read out of the recording/reproduction 54 to the switch 52b.

As shown in FIG. 59B, the switch or write mode selector 52b has an input terminal 2a connected to the output terminal of the write mode detection 52a, and output terminals 2b and 2c connected to the image reproduction 52c. The switch 52b transfers the image data to the terminal 2b in the mode A or B or transfers them to the terminal 2c in the mode C in accordance with the selection signal S2 fed from the write mode detection 52a.

Figure 67:
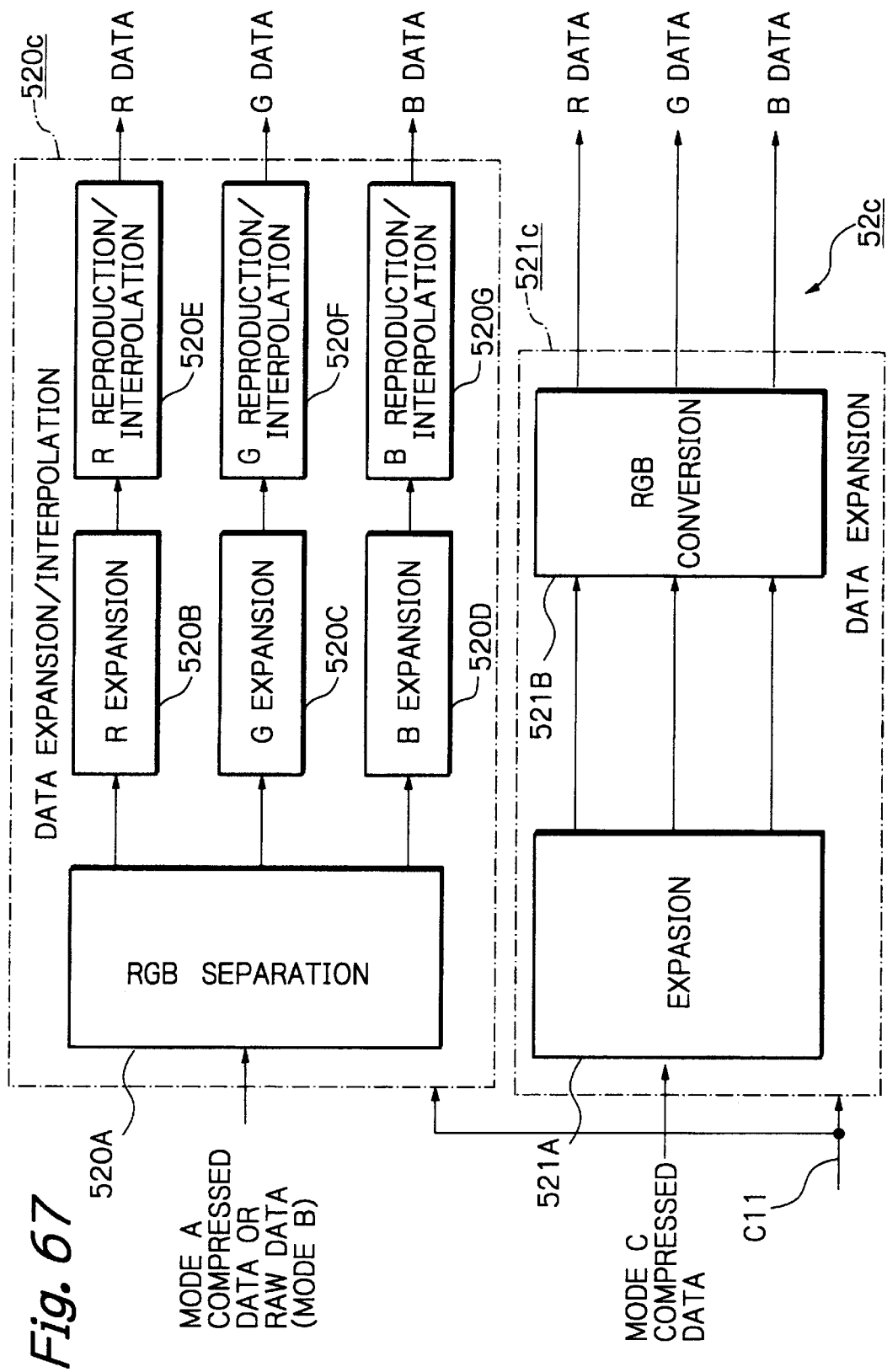
FIG. 67 is a schematic block diagram showing an image reproduction section shown in FIG. 59B.

A specific construction of the image reproduction 52c is shown in FIG. 67. As shown, the image reproduction 52c is generally made up of a data expansion/interpolation 520c and a data expansion 521c. The image reproduction 52c increases, in response to a control signal C11 output from the control section 55, the amount of image data to one identical with or greater than the amount of image data to be input to the amount-of-data adjustment 51e.

The data expansion/interpolation 520c has an RGB separation 520A, an R, a G and a B expansion 520B, 520C and 520D, and an R, a G and a B reproduction/interpolation 520E, 520F and 520G. The data expansion 521c has an expansion 521A and an RGB conversion 521B. The RGB separation 520A separates the image data received via the terminal 2a of the read mode selector 52b into the R, G and B image data.

The R, G and B expansions 520B–520D respectively receive the compressed R, G and B image data from the RGB separation 520A, and each executes expansion inverse to compression effected by the data compression 510e of the camera section 51. That is, expansion executed with the R data, G data and B data is inverse to the differential PCM processing or the JPEG compression processing stated earlier. Particularly, JPEG expansion is such that monodimensional image data read out are transformed to bidimensional image data, then scanned zigzag, and then dequantized by use of the same table as at the time of compression. As a result, the DCT coefficients are restored and then subjected to inverse DCT conversion in order to reconstruct the image. It should be noted that the reconstructed image is constituted by the raw R, G and B pixel data picked up. The data expansion 521c also executes such JPEG expansion processing.

Figure 64A:
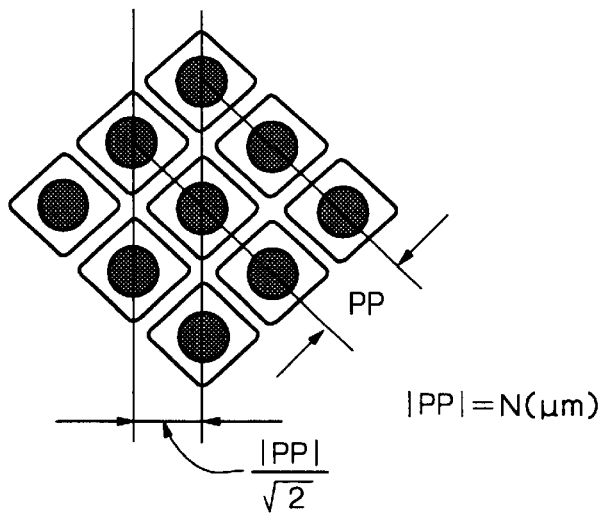
FIGS. 64A and 64B show a relation between the pixels in the honeycomb arrangement of FIG. 61 and virtual pixels produced by interpolation.
Figure 64B:
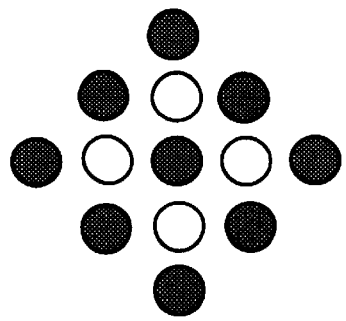

FIG. 64B shows actual pixels and virtual pixels represented by circles and dots, respectively. The R, G and B reproduction/interpolations 520E–520G each generates the pixel data of the virtual pixels on the basis of pixel data of the actual pixels, i.e., raw image data. In this manner, the data expansion/interpolation 520c outputs R, G and B data with high resolution.

The data expansion 521c subjects the data fed from the expansion 521A and compressed in the mode C to JPEG expansion. The RGB conversion 521B transforms the YC signals, i.e., luminance signal Y and two chrominance signals R−Y and B−Y to R, G and B data. Each of the data expansion/interpolation 520c and data expansion 521c has its data lines of the same colors connected together so as to output R, G and B data.

The control system 55 has a main CPU 55a in addition to the external setting section 55b and memory controller 55c. The main CPU 55a sends the control signals C1–C11 to the preselected sections in accordance with information input on, e.g., the setting section 55b. In response, the camera section 51, reproducing section 52 and selecting section 53 individually operate at adequate timings.

Figure 68:
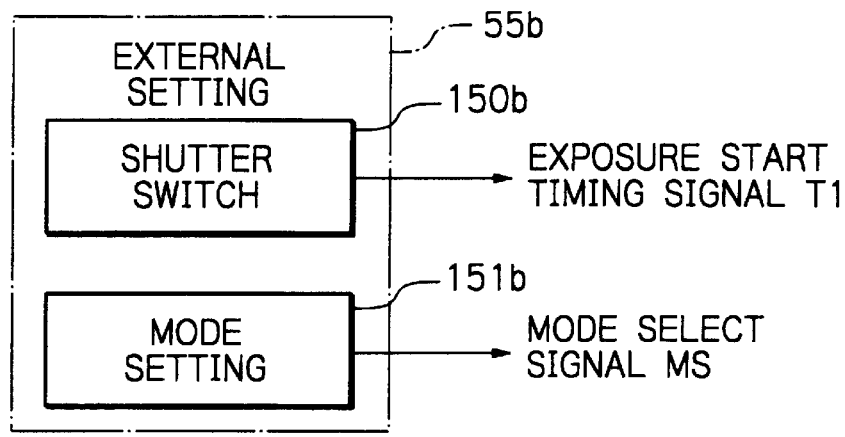
FIG. 68 is a schematic block diagram showing an external setting section shown in FIG. 59A.

As shown in FIG. 68, the external setting section 55b includes a shutter switch 150b and a mode setting 151b both of which are mounted on the casing of the camera 50 for easy operation. The shutter switch 150b sends an exposure start timing signal T1 to the main CPU 55a. Particularly, when the signal T1 is continuously input to the main CPU 55a for more than a preselected period of time, the main CPU 55a forcibly sets up the mode B without regard to the set mode, determining that continuous shooting occurs. At this time, the main CPU 55a causes the data compression 110e to execute through processing. The mode setting 151b is operated by the user to select one of the three different modes A, B and C and sends a signal MS representative of the mode selected to the main CPU 55a. The signal MS allows the main CPU 55a to determine whether importance should be attached to the image quality or the number of pictures to be taken.

The memory controller 55c is controlled by a control signal C12 output from the main CPU 55a and sends the previously stated read/write control signal C9 to the recording/reproduction 54.

Figure 69:
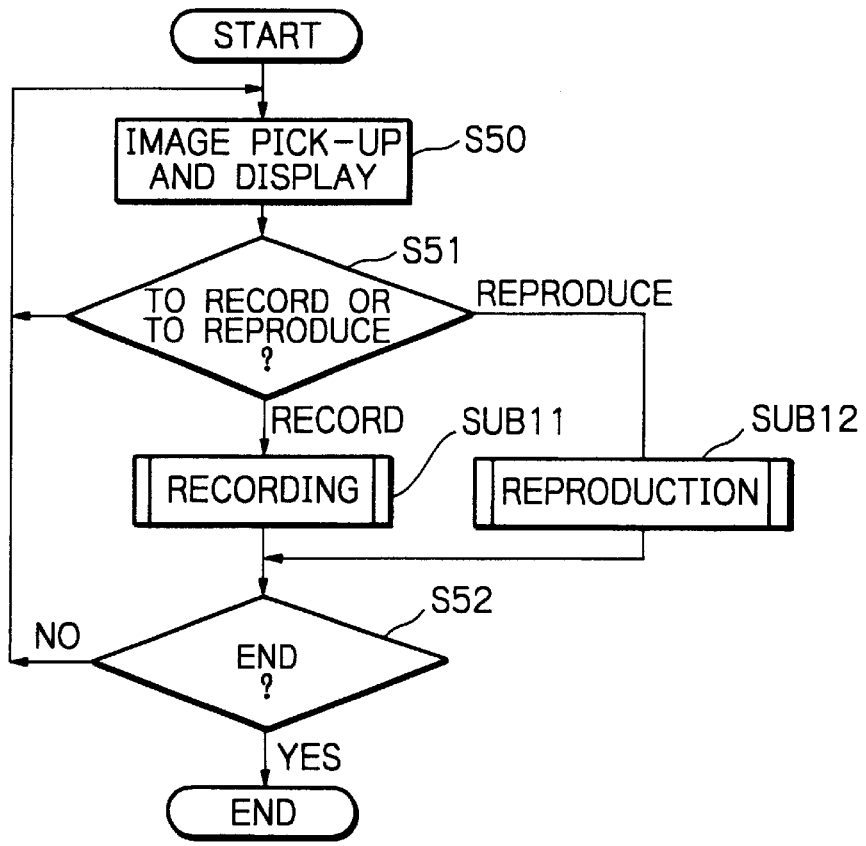
FIG. 69 is a flowchart demonstrating a main routine to be executed by the camera of FIGS. 59A and 59B.

A specific operation of the digital still camera 50 will be described with reference to FIG. 69 (main routine). As shown, after the power switch, not shown, of the camera 50 has been turned on, preprocessing for preparing the camera 50 for recording a subject is executed (step S50). Specifically, on the turn-on of the power switch, imagewise light is incident to the image pick-up 51b via the optics 51a. The resulting image signals are processed by the signal processing 51d. As shown in FIG. 65 specifically, the signal processing 51d executes different kinds of processing with an AD conversion 111d, a color separation 112d and a gamma correction 113d and feeds the resulting R, G and B data to the display 51f. At the same time, a mode selected on the camera 50 and preselected standard data are sent to the main CPU 55a. The display 51f may display such data while superposing them on a picture.

After the step S50, either the record mode or the reproduce mode is selected on the camera 50 (step S51). When the record mode is selected, a subroutine SUB11 is executed. When the reproduce mode is selected, a subroutine SUB12 is executed.

In the subroutine SUB11, the image signals are digitized and then written to a recording medium in a mode matching with the processing or the setting. The subroutine SUB11 is followed by a step S52. In the subroutine SUB12, pixel data read out of the recording/reproduction 54 are restored to pixel data matching with the mode selected at the time of writing. The subroutine SUB12 is also followed by the step S52.

In the step S52, whether or not the processing of the camera 50 should end is determined. If the answer of the step S52 is YES, then the power source of the camera 50 is turned off. If the answer of the step S52 is NO, meaning that the camera 50 is to be continuously used, then the operation returns to the step S50.

Figure 70:
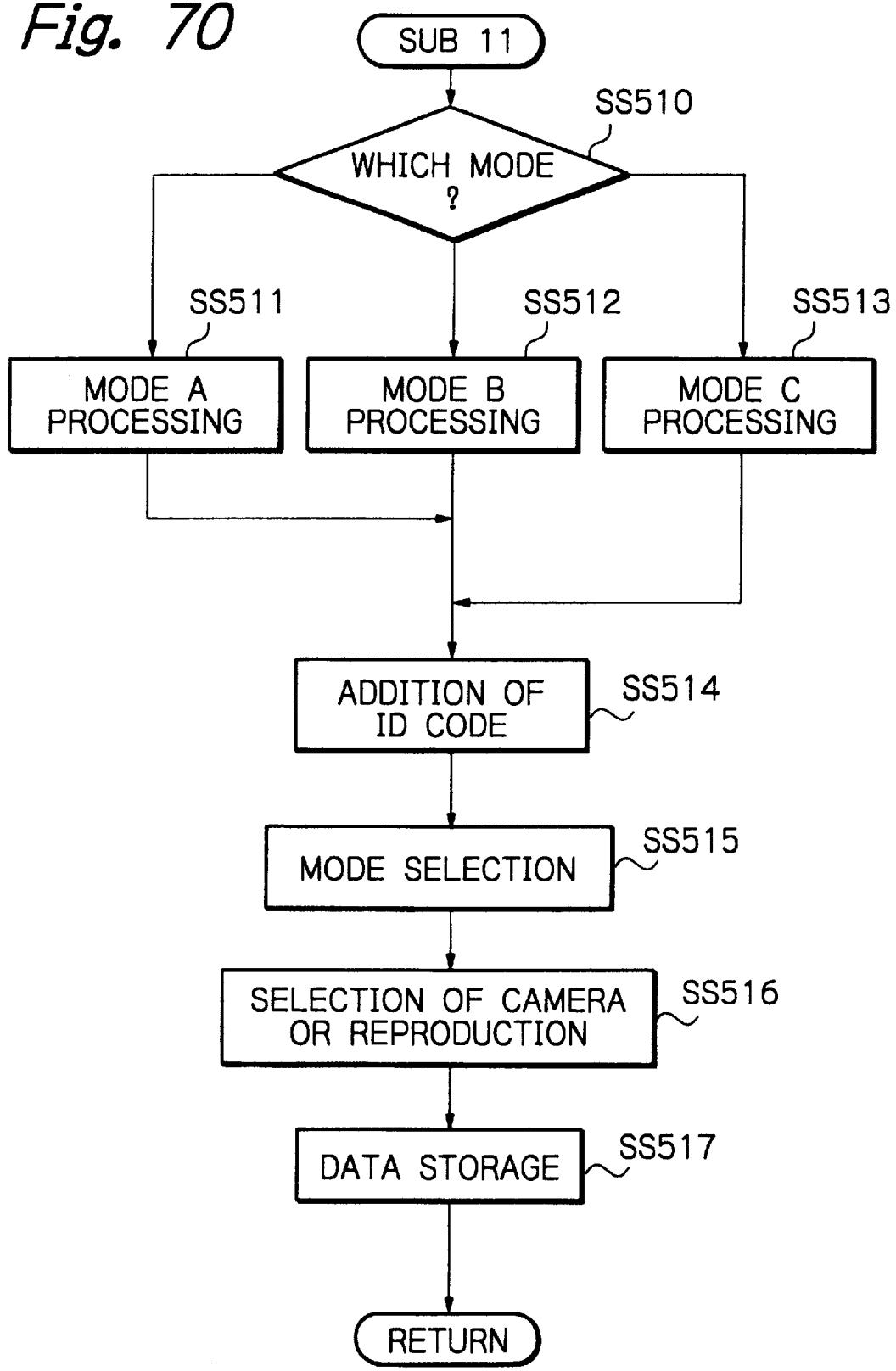
FIG. 70 is a flowchart showing a subroutine included in the main routine of FIG. 69 in detail.

FIG. 70 shows the subroutine SUB11 in detail. As shown, when the record mode is selected, which of the modes A, B and C is indicated by the control signal C5 output from the main CPU 55a is determined (substep SS510). When the control signal C5 indicates the mode A, B or C, a substep SS511, SS512 or SS513, respectively, is executed. In each of the substeps SS511–SS513, the amount-of-data adjustment 51e adjusts the amount of pixel data fed from the signal processing 51d. The adjustment 51e includes the data compression 110e and data interpolation/compression 111e, as stated earlier. The R, G and B data are input to each of the data compression 110e and data interpolation/compression 111e.

Specifically, in the substep SS511, the data compression 110e executes JPEG compression with the input data in response to the control signal C5 indicative of the mode A. More specifically, the R, G and B compressions 110A–110C respectively execute JPEG compression with the R data, G data and B data (first compression). The compressed R, G and B data are input to the synthesis 110D. The synthesis 110D dot-sequentially samples the R, G and B data while combining them. By the dot-sequential sampling, ten-bit data, for example, are transformed to eight-bit data. For example, the synthesis 110D outputs a sequence of combined data GG . . . GRBRB . . . . By the above procedure, the number of pixel data becomes smaller than the number of photosensitive devices included in the image pick-up 51b.

In the substep SS512, in response to the control signal C5 indicative of the mode B, the data compression 110e executes through processing, i.e., does not compress the data output from the R, G and B compressions 110A–110C. Therefore, the data output from the signal processing 51d are raw data the number n of which is the same as the number of the bidimensionally arranged photosensitive devices. The through processing is effected under the control of the main CPU 55a when the shutter switch 150b is continuously pressed, as stated earlier.

In the substep SS513, in response to the control signal C5 indicative of the mode C, the data interpolation/compression 111e executes interpolation and JPEG compression on the basis of the input R, G and B data. More specifically, the R, G and B interpolations 111A–111C each generates pixel data for positions to be interpolated on the basis surrounding pixel data. As a result, R, G and B data are produced in a spatially square lattice arrangement.

Figure 71A:
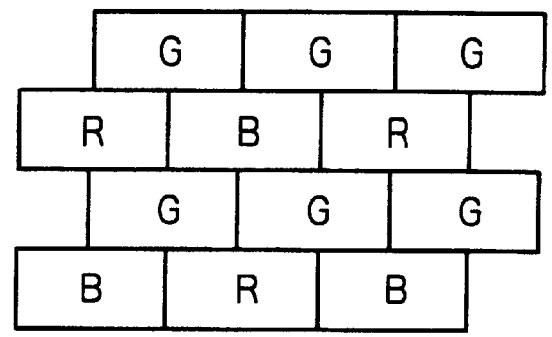
FIGS. 71A, 71B and 71C show a relation between actual R, G and B pixels and R and B pixels produced by interpolation in the main routine of FIG. 69.
Figure 71B:
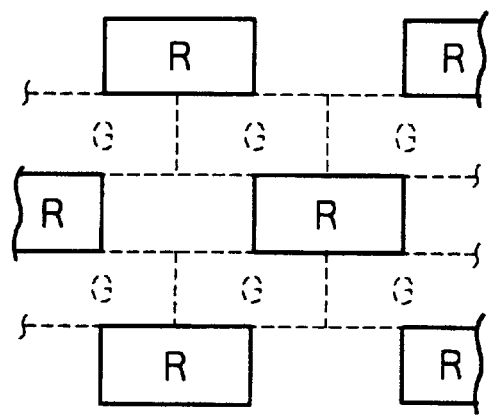
Figure 71C:
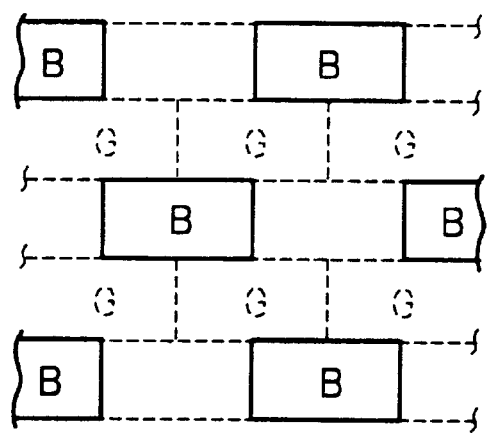

When a single photosensitive portion has a G stripe, RB full-checker pattern, the actual pixels are arranged in a pattern shown in FIG. 71A, taking account of the shift of pixels. The pixels R and the pixels B respectively have patterns shown in FIGS. 71B and 71C when separated from each other. As the patterns shown in FIGS. 71A–71C indicate, the G pixels and the R and B pixels are deviated from each other by half a pitch in spatial sampling position. Assuming that the total number of pixels is n, then the number of G pixels is n/2 while the number of R pixels and that of B pixels are n/4 each. The R pixels and B pixels each are interpolated on the basis of the pixels of the other. At this instant, data derived from the G pixels are directly output without being subjected to interpolation. As for the R pixels and B pixels, a mean value of two data on lines above and below a line of G pixels is produced; the resulting data correspond in position to the G pixels are indicated by phantom lines in the pattern shown in FIGS. 71A or 71B. For the calculation, use may be made of, but not limited to, the $Y_H \cdot Y_L$ scheme. The R pixels B pixels produced by the interpolation are the same in number as the G pixels.

The YC conversion 111D executes YC conversion with the R, G and B pixel data subjected to the above interpolation (YC conversion). Specifically, the YC conversion 111D transforms the R, G and B pixel data to luminance data Y=0.30R+0.59G+0.11B and two kinds of chrominance data (R−Y) and (B−Y) by matrix processing. Further, the YC conversion 111D executes 4:2:2 subsampling with the resulting pixel data [Y, (R−Y), (B−Y)]. The number of the subsampled luminance data Y remains the same, i.e., n/2, but the numbers of the subsampled chrominance data (R−Y) and (B−Y) both are n/4 because they are one half of the number of the G pixels. At this stage, the total number of pixels is double the number of G pixels. That is, the total number of pixels is n/2×2=n equal to the total number n of photosensitive devices. The pixel data [Y, (R−Y), (B−Y)] are fed to the YC compression 111E. The YC compression 111E executes, e.g., JPEG compression with the input pixel data (second compression).

After the substep SS511, SS512 or SS513, an ID code representative of the mode is added to each pixel data (substep SS514) although not shown specifically in FIG. 66. The ID code may be added to the head of each pixel data.

Subsequently, one of the different kinds of pixel data subjected to the substeps SS511–SS514, i.e., one write mode is selected (substep SS515). A mode in which the camera 50 picks up a desired subject is set on the mode setting 151b before shooting. A signal MS representative of the mode selected is fed to the main CPU 55a. The main CPU 55a sends a control signal C6 matching with the setting to the switch or write mode selector 51g. In response, the switch 51g transfers the pixel data of a write mode designated by the control signal C6 to the terminal 3a of the switch or selector 53.

The switch 53 selects either the camera section 51 or the reproducing section 52 to which the pixel data should be fed (step SS516). Specifically, the switch 53 selects the terminal 3a when the pixel data output from the camera 51 should be fed to the recording/reproduction 54, or selects the terminal 3b when the reproducing section 52 should be selected, as will be described specifically later.

The pixel data fed from the switch 53 are written to the addresses of the recording/reproduction 54 under the control of the memory controller 55c (substep SS517). The recording/reproduction 54 is implemented by an IC card, built-in flash memory, magnetic disk, optical disk or similar recording medium. Thereafter, the program returns.

If desired, an arrangement may be made such that when the mode A or B is selected, the mode C under way is interrupted, or vice versa. This successfully reduces the power consumption of the camera 50.

Figure 72:
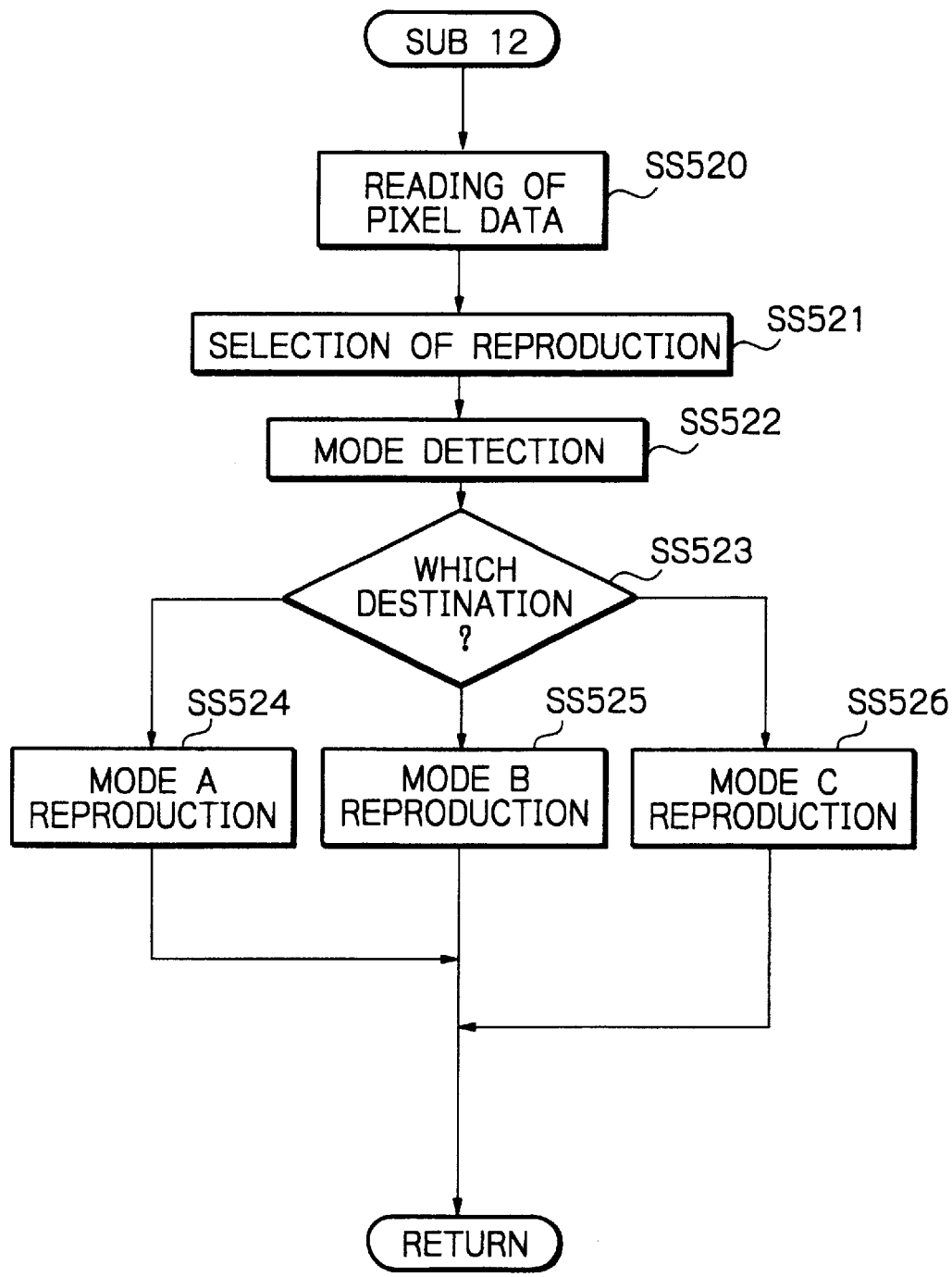
FIG. 72 is a flowchart showing a subroutine SUB12 included in the main routine of FIG. 69 in detail.

FIG. 72 shows a reproduction procedure specifically. When a reproduce mode is selected on, e.g., the external setting 55b, the main CPU 55a executes the subroutine SUB12. As shown, pixel data are read out of the recording/ reproduction 54 (substep SS520). At this instant, the memory controller 55c controls the recording/reproduction 54 as to address, timing and so forth. The pixel data read out are fed to the write mode detection 52a.

Subsequently, the switch or selector 53 selects the terminal 3b and therefore the reproducing section 52 as a destination to which the pixel data should be fed (substep SS521). As a result, the pixel data are delivered to the reproducing section 52.

The write mode detection 52a determines, on the basis of the ID code, a mode in which the pixel data were written (substep SS522). The ID code is a write mode written by the camera section 51 in accordance with a preselected rule. The write mode, i.e., mode A, B or C is set as a read mode in the reproduce mode. The write mode detection 52a reads a selection signal S2 matching with the read mode and feeds it to the mode selection 52b. At the same time, the detection 52a picks out the detected ID code. This allows, at the time of pixel data expansion and interpolation, the pixel data to be fed in an arrangement matching with a preselected format.

A read mode corresponding to the write mode detected by the write mode detection 52a is selected, and a destination to which the pixel data should be fed is selected on the basis of the read mode (substep SS523). When the read mode is the mode A, B or C, the program advances to a substep SS524, SS525 or SS526, respectively. In the mode A or B, the switch or read mode selector 52b transfers the pixel data to the data expansion/interpolation 520c via its terminal 2b. In the mode C, the switch 52b delivers the pixel data to the data expansion 521c via its terminal 2c.

In a substep SS524 following the substep SS523, the pixel data are expanded and then used for interpolation. This processing will be described specifically with reference to FIG. 67. In the data expansion/interpolation 520c, the RBG separation 520A separates the input pixel data into an R data sequence, a G data sequence, and a B data sequence. The R, G and B data sequences are input to the R, G and B expansions 520B, 520C and 520D, respectively. The expansions 520B–520D each expands the respective data by DPCM (Differential Pulse Code Modulation) expansion or JPEG expansion corresponding to the compression scheme (first expansion). As a result, the amount of data before compression is restored. The restored R, G and B pixel data are fed to the R, G and B reproduction/interpolations 520E, 520F and 520G, respectively.

The R, G and B reproduction/interpolations 520E–520G each uses the respective input pixel data to generate, e.g., pixel data for the positions indicated by circles in FIG. 64B, by interpolation. Such interpolation produces a greater amount of data than before adjustment, so that higher resolution and therefore higher image quality than at the time of a shot is achieved.

In the substep SS525, the pixel data in the mode B are restored. Specifically, the RBG separation 520A separates the pixel data in the same manner as in the substep SS524. At this time, the number of pixels constituting a single picture is the same as the number of photosensitive devices of the image pick-up 51b. The R, G and B expansions 520A–520D simply execute through processing with the pixel data not subjected to compression, although not shown in FIG. 67. The R, G and B reproduction/interpolations 520E–520G effect interpolation in the same manner as in the substep SS524 in order to increase the amount of restored data.

In the substep SS526, the data expansion 521c restores the pixel data of the mode C. Specifically, in the data expansion 521c, the expansion 521A executes restoration corresponding to, e.g., JPEG expansion and 4:2:2 reduction or thinning (second expansion). The restoration includes the restoration of 4:2:2 subsampling. The pixel data [Y, (R−Y), (B−Y)] in the mode C turn out the n pixel data after the JPEG expansion. That is, the R and B pixel data are formed at the same positions as the G pixel data. The expansion 521A feeds the pixel data [Y, (R−Y), (B−Y)] to the RBG conversion 521B. The RGB conversion 521B transforms the YC data, i.e., [Y, (R−Y), (B−Y)] to R, G and B pixel data. The number of these R, G and B data is double the number of pixels representative of the original image. This is also successful to restore a greater amount of data than before compression.

As stated above, the substeps SS524–SS526 each increases the amount of pixel data to or above the amount output before adjustment. Therefore, image data of high quality can be fed at the time of reproduction.

Assuming that the image pick-up 51b has n photosensitive devices in total, Table 1 shown below compares the prior art applied to a square lattice CCD image sensor and a honeycomb CCD image sensor and the present invention (camera 50) applied to a honeycomb CCD image sensor with respect to the number of pixels.

TABLE 1

|  |  | Prior Art | | Invention |
| --- | --- | --- | --- | --- |
| CCD Structure | | Square Latice | Honeycomb | Honeycomb |
| Number of CCD Pixels | | n | n | n |
| Number of Pixels After Gamma Conversion | G | n/2 | n/2 | n/2 |
| | R | n/4 | n/4 | n/4 |
| | B | n/4 | n/4 | n/4 |
| Mode A ½ Compression | | — | — | n/2 |
| Mode B Non-Compression | | — | — | n |
| Amount of DATA (Total Number of Pixels) After YC Processing | Y | n | 2n | — |
| | R-Y | n/2 | n | — |
| | B-Y | n/2 | n | — |
| Amount of DATA During YC Processing After Mode C Interpolation | Y | — | — | n/2 |
| | R-Y | — | — | n/4 |
| | B-Y | — | — | n/4 |
| Amount of DATA (Total Number) During Conventional & Mode C JPEG Compression | | 1/4 | n/2 | n/4 |
| | | 1/8 | n/4 | n/8 |
| Compression | | n/4 | n/2 | n/8  n/2 |
| Ratio of Amount of DATA (Total Number of Pixels) on Medium | | JPEG 1/8 | JPEG 1/8 | JPEG  Mode 1/8  A ½ |

As shown in Table 1, all the CCD image sensors have n pixels. The numbers of R, G and B pixels subjected to gamma conversion are n/4, n/2 and n/4, respectively, in all of the cases listed in Table 1. In the mode B or non-compression mode, n raw data are recorded. In the mode A compressing the n raw data to one half, the number of pixels is simply n/2.

As for the single-filter square lattice CCD image sensor, the number of pixels produced by the YC conversion is double the number of CCDs (n+n/2+n/2). As for the honeycomb arrangement, the number of pixels output by the YC conversion is four times greater than the number of CCDs (2n+n+n). This undesirably increases the signal processing time.

By contrast, in the mode B particular to the present invention, the numbers of R, G and B data subjected to interpolation are n/2 each. The R, G and B data are transformed to luminance data Y and two chrominance data (R-Y) and (B-Y) by YC processing and subjected to 4:2:2 subsampling. As a result, n/2 G pixels, n/4 R pixels and n/4 G pixels are available with the camera 50, so that the total number of pixels is n/2+n/4+n/4=n. If the n pixels are subjected to JPEG compression, e.g., ¼ or ⅛1 compression, then the number of pixels is reduced to n/4 or n/8, respectively. The numbers of pixels, or amounts of data, on a recording medium are listed at the bottom of Table 1.

With the above construction, the camera 50 is operable in a mode meeting the user's need, i.e., higher image quality or a greater number of pictures to be taken. In addition, the camera 50 obviates a long signal processing time ascribable to an increase in the number of photosensitive devices heretofore relied on for the improvement of image quality. The camera 50 therefore implements a short signal processing time at the time of, e.g., continuous shooting. A reproduced image has higher quality than at the time of a shot in any of the three different modes, so that the continuous shooting function is not degraded despite high resolution specifications. Further, as Table 1 indicates, a compression efficiency two times to four times higher than the conventional compression efficiency is achievable.

Moreover, because the amount of image data is adjusted in matching relation to the mode, the image data can be written to a recording medium by signal processing having a variable time width. This realizes continuous shooting that has been difficult with a digital still camera attaching importance to resolution. Therefore, pixel data can be compressed more efficiently than conventional. An ID code representative of a mode in which pixel data were processed at the time of recording is stored together with the image data and allows the image data to be efficiently reproduced in a corresponding mode. In addition, because the reproduced image data are greater in number than pixels representative of an image picked up without regard to the mode, an image of higher quality is achievable in each mode.

An image reproducing apparatus implemented by the present invention will be outlined with reference to FIG. 73. The apparatus reproduces from a recording medium image data produced by executing signal processing, in the mode A, B or C by way of example, with bidimensional image data output from photosensitive devices positioned beneath apertures arranged in a honeycomb arrangement.

As shown in FIG. 73, the reproducing apparatus, generally 60, includes a reproduction 61, a write mode detection 62, a switch or read mode selector 63, an image reproduction 64, a reproduction control 65, and a main control 66. The write mode detection 62, read mode selector 63 and image reproduction 64 each has the same function as in the digital still camera 50. The reproduction 61,is simplified in construction so as to perform only reproduction. The reproduction control 65 therefore controls only the reading of pixel data. The main control 66 controls the write mode detection 62, read mode selector 63, image reproduction 64, and reproduction control 65. The apparatus 60 subjects the image data read out of a recording medium to the same processing as effected by the reproducing section 52 of the camera 50.

The reproducing apparatus 60 is capable of executing adequate signal processing with the image data including an ID code. The reproduced image data are greater in number than pixels representative of an image picked up, so that image quality is enhanced in any one of the modes.

The entire disclosure of Japanese patent application Nos. 331555/1997, 1954/1998 and 285126/1998 filed on Dec. 2, 1997, Jan. 8, 1998 and Oct. 7, 1998, respectively, including the specifications, claims, accompanying drawings, and abstracts of the disclosure is incorporated herein by reference in their entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A solid-state imaging apparatus for picking up light representative of a subject and incident via apertures and executing signal processing with resulting signals to thereby output signals lying in a broad frequency band, said apparatus comprising:

an image pick-up section comprising:
a photosensitive portion including photosensitive devices for photoelectrically transducing the light incident via said apertures, wherein nearby ones of said photosensitive devices are shifted from each other in a vertical direction and/or a horizontal direction in a bidimensional pattern;

electrodes arranged outside of apertures formed in a front of said photosensitive portion for picking up signals output from said photosensitive devices; and vertical transfer registers for sequentially transferring the signals output from said electrodes in a vertical direction of said photosensitive portion;

a plurality of color filters respectively arranged on the apertures of said photosensitive devices and each having a particular spectral characteristic;

a gamma correction circuit for executing gamma correction with the signals output from said vertical transfer registers;

a digitization circuit for digitizing outputs of said gamma correction to thereby output digital data;

a recording/reproduction circuit for recording or reproducing the digital data output from said digitizing circuit; and a signal processing circuit for attaching, assuming that regions void of said photosensitive devices in plane data output from said recording/reproducing circuit and ascribable to a shift of said photosensitive devices are virtual photosensitive devices, importance to accurate color reproduction and to a horizontal and/or a vertical resolution and executing item-by-item signal processing on the basis of data output from said photosensitive devices adjoining said virtual photosensitive devices, said signal processing circuit comprising:
a calculation circuit for attaching importance to the accurate color reproduction and to the horizontal and/or the vertical resolution and executing the item-by-item signal processing;

a pseudo addition circuit for adding, in a pseudo frequency fashion, component signals output from said calculation circuit and attaching importance to the color reproducibility and the resolution, respectively; and an overlap prevention circuit for preventing, when signals output from said calculation circuit and respectively attaching importance to the horizontal resolution and the vertical resolution include identical frequency bands, said identical frequency bands from overlapping each other.

2. An apparatus in accordance with claim 1, wherein each of said apertures has either one of a square shape and a polygonal shape, and wherein, assuming that a distance between said photosensitive devices corresponding in position to said apertures is a pixel pitch, said apertures are shifted from each other by said pixel pitch every other column in a vertical direction or every other row in a horizontal direction in a bidimensional pattern, or said apertures with said square shape rotated by an angle 45 degree or said polygonal shape are arranged in a bidimensional honeycomb pattern.

3. An apparatus in accordance with claim 1, wherein assuming three primary colors R (red), G (green) and B (blue), comprises R color filters, G color filters and B color filters corresponding in position to said photosensitive devices for forming a shifted G square lattice and an RB full-checker pattern shifted from said G square lattice by one half of the pixel pitch.

4. An apparatus in accordance with claim 1, wherein said pseudo addition circuit comprises:
a first addition circuit having a minus input terminal for receiving a first component signal output from said calculation circuit with a frequency band up to which importance should be attached to the resolution, and a plus input terminal for receiving a second component signal output from said calculation circuit lower in frequency than said first component signal;

a filter circuit for freeing an output of said first addition circuit and said first component signal from an aliasing distortion; and a second addition circuit for adding outputs of said filtering circuit.

5. An apparatus in accordance with claim 1, wherein said overlap prevention circuit comprises:
a filter circuit for limiting the identical frequency band of one of signals output from said pseudo addition circuit; and an addition circuit for adding an output of said filter circuit and the other signal including the identical frequency band.

6. An apparatus in accordance with claim 1, wherein said signal processing circuit comprises:
a plane interpolation and rearrangement circuit for producing, paying attention to R, G and B, three component signals in a form of plane data including color data at positions of said virtual photosensitive devices, taking account of color reproducibility;

a chrominance matrix circuit for generating chrominance signals and a luminance signal on the basis of said three component signals;

a contour signal generation circuit for generating, as a signal for enhancing a contour, a component signal attaching importance to resolution from data to be input to said plane interpolation and rearrangement circuit; and a contour enhancement circuit for adding said signal output from said contour signal generating circuit and the luminance signal output from said chrominance matrix circuit.

7. An apparatus in accordance with claim 6, wherein said contour signal generation circuit generates said signal by executing correlation detection and interpolation with only G data.

8. An apparatus in accordance with claim 1, further comprising:
a write/read control circuit for controlling said recording/reproducing circuit such that pixel data output from said photosensitive devices positioned beneath said apertures are written or read in an arrangement equivalent to plane data arranged in a square lattice pattern; and a data interpolation and rearrangement circuit for adding component signals output from said signal processing circuit on the basis of the plane data output from said recording/reproducing circuit, and executing, when said component signals include identical frequency bands, interpolation and rearrangement with data for positions of said virtual photosensitive devices on the basis of signals at pixel positions produced by preventing said identical frequency bands from overlapping each other and thereby increasing a signal frequency band.

9. An apparatus in accordance with claim 1, wherein said photosensitive portion comprises a plurality of photosensitive portions each including said photosensitive devices positioned, as pixels, beneath said apertures arranged in a honeycomb pattern, wherein said apparatus further comprises a plurality of beam splitting elements for splitting light incident from a single object to said plurality of photosensitive portions, and wherein color filters with a pattern in which the pixels are shifted by the pixel pitch every other column in the vertical direction or every other row in the horizontal direction or a pattern in which the square lattice is rotated by an angle of 45 degrees are combined and respectively positioned in front of said plurality of photosensitive portions in correspondence to the apertures.

10. An apparatus in accordance with claim 9, wherein said plurality of photosensitive portions comprise two photosensitive portions, and wherein the color filters each having a honeycomb configuration are combined to form one of a G stripe, RB full-checker pattern, a Bayer pattern, and a pattern having B or R color filters coinciding with G color filters every other row.

11. An apparatus in accordance with claim 9, wherein said plurality of photosensitive portion comprise three photosensitive portions, wherein said color filters comprise first color filters having the honeycomb arrangement, second color filters of a same color as said first color filters and having an arrangement shifted by the pixel pitch from said honeycomb arrangement, and third color filters different in color from said second color filters and identical in arrangement with said second color filters, and wherein said second color filters and said third color filters are combined.

12. An apparatus in accordance with claim 9, wherein said color filters comprise three kinds of color filters different in honeycomb arrangement from each other, and wherein two of said three kinds of color filters are shifted in arrangement from a remaining kind of color filters by the pixel pitch to thereby form color filters having a superposed spatial arrangement.

13. An apparatus in accordance with claim 9, wherein said photosensitive portion comprises four photosensitive portions, said color filters comprising:
first color filters arranged in the honeycomb arrangement;
second color filters of a same color as said first color filters and shifted in arrangement from said first color filters by the pixel pitch so as to be complementary to said first color filters, wherein said first color filters and said second color filters are combined to form a square lattice pattern;
third color filters arranged in the honeycomb pattern and different in color from said first color filters; and
fourth color filters different in color from said first color filters and said third color filters and shifted from said third color filters by the pixel pitch so as to be complementary to said third color filters, wherein said third color filters and said fourth color filters are combined to form a square lattice pattern.

14. An apparatus in accordance with claim 1, wherein said photosensitive portion has said apertures arranged in a honeycomb pattern, said apparatus further comprising:
a moving mechanism for moving said photosensitive portion vertically and horizontally in a bidimensional plane;
a recording/reproducing circuit for recording or reproducing, every time said moving mechanism stops moving said photosensitive portion, image data representative of the subject incident to said photosensitive portion; and
a filter switching mechanism for selecting any one of said color filters interposed between said photosensitive devices and the subject;
wherein said filter switching mechanism switches said color filters while said moving means is moving said photosensitive portion, wherein said recording/reproducing circuit records the image data every time said filter switching mechanism switches said color filters, and wherein the image of the subject is plane-sequentially generated by use of the image data recorded.

15. A solid-state imaging apparatus comprising:
optics including an imaging surface on which an image of a subject is projected;
color filters with thee primary colors arranged thereon and implemented as a single piece, wherein light transmitted through said optics is incident to said color filters;
photosensitive devices respectively positioned beneath said color filters for photoelectric transduction; and
a data processing circuit executing, based on image signals output from said photosensitive devices, signal processing for interpolating pixel data for positions between said photosensitive devices, and generating luminance data and color data from pixel data including interpolated pixel data;
wherein said color filter and said photosensitive devices coincide in position with each other, and wherein assuming that a distance between centers of said photosensitive devices in a geometrical configuration of said imaging surface is a pitch, said photosensitive devices are shifted from each other by one half of said pitch in a direction of row and a direction of column;
said data processing circuit comprising:
a digitization circuit for converting an R, a G and a B image signal output from said color filters arranged in a G square lattice pattern and an RB full-checker pattern shifted from said G square lattice pattern by one half of the pitch;
a first luminance calculation circuit for generating, based on outputs of said digitization circuit, luminance data for positions where said photosensitive devices are present;
a second luminance calculation circuit for generating, based on the luminance data output from said first luminance calculation circuit and positioned in the horizontal and/or the vertical direction, luminance data for virtual photosensitive devices where said photosensitive devices are absent;
a plane calculation circuit for generating, for each of R data, G data and B data, plane data over an entire picture by use of the luminance data output from said second luminance calculation circuit and R color data, G color data and B color data output from said photosensitive devices;
a matrix circuit for generating luminance data and chrominance data by use of the plane data output from said plane calculation circuit;
a filtering circuit for limiting a frequency band of outputs of said matrix circuit; and
an aperture adjustment circuit for executing contour enhancement with the luminance data included in the outputs of said filtering circuit.

16. An apparatus in accordance with claim 15, wherein to calculate the luminance data for a given position, said first calculation circuit uses G pixel data and R and B pixel data surrounding said given position or executes adaptive processing based on a decision of color boundaries in the vertical and horizontal direction.

17. An apparatus in accordance with claim 15, wherein said second luminance calculation circuit includes a circuit for executing low pass filter processing with the luminance data input thereto.

18. An apparatus in accordance with claim 15, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging surfaces when identical images of the subject incident to said two imaging surfaces are spatially superposed on each other, and wherein said color filters are positioned in front of said photosensitive devices and have colors so arranged as to implement an RGB color filter when spatially superposed.

19. An apparatus in accordance with claim 15, wherein said optics projects the image of the subject on a single imaging surface, said apparatus further comprising:
 a filter switching mechanism for selecting any one of said color filters to be inserted between said optics and said photosensitive devices;
 a moving mechanism for moving a photosensitive portion having said photosensitive devices bidimensionally arranged in a bidimensional plane parallel to said imaging surfaces; and
 a recording circuit for plane-sequentially recording, every time said moving mechanism moves said photosensitive portion, an image picked up;
 wherein every time said moving means moves said photosensitive portion, an image picked up has a center of a geometric imaging surface shifted from a center of a geometric imaging surface of a previous image by one half of the pitch in the direction of row and the direction of column.

20. A method of processing image signals based on bidimensional image data output from photosensitive devices on which light is incident via a plurality of color filters each having a particular spectral sensitivity characteristic and bidimensionally arranged apertures, wherein said apertures each has either one of a square shape and a polygonal shape, and wherein, assuming that a distance between said photosensitive devices corresponding in position to said apertures is a pixel pitch, said apertures are shifted from each other by said pixel pitch every other column in a vertical direction or every other row in a horizontal direction in a bidimensional pattern, or said apertures with said square shape rotated by an angle of 45 degrees or said polygonal shape are arranged in a bidimensional pattern, said method comprising the steps of:
 (a) executing gamma correction with signals output from said photosensitive devices to thereby output converted signals;
 (b) transforming said converted signals to digital data;
 (c) storing said digital data in a form of pixel data;
 (d) reading said pixel data and generating, assuming that regions void of said photosensitive devices ascribable to a shift of said photosensitive devices are virtual photosensitive devices, component signals of the pixel data respectively attaching importance to accurate color reproduction and a horizontal and/or vertical resolution and executing item-by-item signal processing on the basis of data output from said photosensitive devices adjoining said virtual photosensitive devices; and
 (e) broadening a frequency band of image signals produced from said component signals said step (e) comprising the substeps of:
 (f) adding said component signals attaching importance to the accurate color reproduction and said component signals attaching importance to the horizontal and/or the vertical resolution in a pseudo frequency fashion; and
 (g) preventing, when importance is attached to the horizontal and vertical resolutions in step (d), identical frequency bands from overlapping with each other.

21. A method in accordance with claim 20, wherein step (d) comprises the substeps of:
 (h) executing calculations by attaching importance to the accurate color reproduction on the basis of the pixel data output from said photosensitive devices shifted in arrangement; and
 (i) executing calculations by attaching importance to the horizontal and/or the vertical resolution on the basis of said pixel data.

22. A method in accordance with claim 21, wherein step (d) comprises the step of determining R or B pixel data for interpolation on the assumption that G pixel data are present in a same triangular positional relation as existing R or B pixel data and an R or B pixel data to be interpolated, and that a weighted mean of each three pixel data is identical.

23. A method in accordance with claim 20, wherein step (f) comprises the substeps of:
 (h) subtracting from a first component signal having a frequency band up to which importance should be attached to the resolution and output in step (d) a second component signal lower in frequency than said first component signal and attaching importance to the accurate color reproduction;
 (i) freeing an output produced in step (h) and said first component signal from an aliasing distortion; and
 (j) adding said output and said first component signal output in step (i).

24. A method in accordance with claim 20, wherein step (g) comprises the substeps of:
 (h) limiting either one of identical frequency bands included in a horizontal and a vertical component signal; and
 (i) adding a limited output produced in step (h) and the other component signal not limited in frequency.

25. A method in accordance with claim 20, wherein step (d) comprises the substeps of:
 (h) at the time of calculations executed with the pixel data read out in step (c) in accordance with the colors of said color filters, generating low frequency components by interpolating pixel data for said virtual photosensitive devices between R and B or G and G on the basis of pixel data lying in a three row, two column area, and calculating R or B pixel data from pixel data lying in a five row, two column area while directly using G pixels to thereby attach importance to the accurate color reproduction;
 (i) generating horizontal high frequency components by weighting the pixel data lying the five row, two column area so as to calculate pixel data at a center of said area and interpolating pixel data for the virtual photosensitive device positioned at a center of the three row, two column area on the basis of the pixel area lying in said area while directly using the G pixels to thereby attach importance to the horizontal resolution; and
 (j) generating vertical high frequency components by rearranging read-out of the pixel data stored in step (c)

and executing same interpolation with said pixel data as with said horizontal high frequency components to thereby attach importance to the vertical resolution.

26. A method in accordance with claim 25, wherein steps (i) and (j) each directly uses, among the pixel data, the pixel data corresponding to R and B of the color filters, and interpolates pixel data for each virtual photosensitive device by weighting pixel data of adjoining rows or adjoining columns.

27. A method in accordance with claim 25, wherein steps (i) and (j) each comprises the substeps of:
   (k) detecting correlations of a given pixel by using, among the pixel data, only four pixel data corresponding to G of the color filters;
   (l) executing linear interpolation by using the pixel data having a greater correlation detected in step (k); and
   (m) repeating steps (k) and (l);
      said method further comprising the substeps of:
         (n) detecting correlations of the pixel data of the virtual photosensitive device surrounded by three pixel data including said pixel data produced in step (l);
         (o) executing linear interpolation on the basis of a result of step (n); and
         (n) repeating steps (n) and (o).

28. A method in accordance with claim 27, wherein step (o) averages four pixel data for interpolating the pixel data for said virtual photosensitive device surrounded by said three pixel data.

29. A method in accordance with claim 20, wherein step (d) comprises the substeps of:
   (h) attaching importance to the resolution by generating horizontal and/or vertical high frequency components;
   (i) at the time of executing, paying attention to primary colors R, G and B corresponding to the color filters, interpolation and rearrangement with three component signals in a form of plane data including color data at positions of said virtual photosensitive devices while attaching importance to color reproducibility, executing horizontal plane interpolation and rearrangement with a row including R, G or B being observed by weighting and then averaging pixel data or with a row including a different color by averaging pixel data of surrounding rows;
   (j) executing vertical plane interpolation and rearrangement with a column including R, G or B being observed by weighting and then averaging pixel data or with a column including a different color by averaging pixel data of surrounding columns;
   (k) generating a chrominance matrix by generating chrominance data and luminance data on the basis of a result of step (i) and/or step (j); and
   (l) adding a component signal output in step (h) for contour enhancement to a luminance signal output in step (k).

30. A method in accordance with claim 20, further comprising after step (e), the step of (h) executing interpolation by using an R, a G and a B signal demodulated.

31. A signal processing method for projecting an image of a subject on an imaging surface via optics, separating light incident to said imaging surface into three primary colors with color filters arranged in a single photosensitive portion, photoelectrically transducing separated light to thereby output corresponding image signals, interpolating pixel data for regions void of photosensitive devices, and generating luminance data and chrominance data from pixel data including pixel data interpolated, wherein said color filters and said photosensitive devices are coincident in position with each other, and wherein, assuming a distance between centers of geometrical imaging surfaces of nearby ones of said photosensitive devices is a pitch, said photosensitive devices are shifted from each other by one half of the pitch in a direction of row and a direction of column, said method comprising the steps of:
   (a) transforming to digital signals an R, a G and a B image signals output from the color filters arranged in a G square lattice and an RB full-checker pattern shifted from said G square lattice by one half of the pitch;
   (b) generating, based on the pixel data output in step (a), luminance data for positions where the photosensitive devices are present;
   (c) generating, assuming that regions void of the photosensitive devices are virtual photosensitive devices, luminance data for said virtual photosensitive devices in a horizontal direction and then in a vertical direction, or vice versa;
   (d) producing plane data from said luminance data and R, G and B color data output from the photosensitive devices color by color over an entire picture;
   (e) generating luminance data and chrominance data in a form of a matrix by using said plane data;
   (f) filtering said luminance data and said chrominance data output in step (e) to thereby limit a frequency band; and
   (g) executing aperture adjustment with said luminance data output in step (f) to thereby enhance a contour.

32. A method in accordance with claim 31, wherein step (b) includes G pixel data output from a G square lattice and an RB full-checker pattern shifted from said G square lattice by one half of the pitch and calculates, when generating the luminance data for either one of the R pixel data and the B pixel data, the luminance data for positions of the photosensitive devices on the basis of one half of the pixel data being observed and surrounding pixel data produced by adding the other pixel data closest to and located at a same distance from said pixel data being observed and dividing a resulting sum by a value two times greater than a number of said other pixel data added.

33. A method in accordance with claim 32, wherein step (b) calculates, before calculation of the luminance data, correlation values in the horizontal and vertical directions and compares said correlation values with a first preselected value, and comprises the substeps of:
   (h) adding, if a result of comparison indicates a correlation in the horizontal direction, the pixel data in the horizontal direction, and dividing a resulting sum by a value two times greater than a number of the pixel data added so as to produce surrounding pixel data to thereby output a horizontal luminance;
   (i) adding, if the result of comparison indicates a correlation in the vertical direction, the pixel data in the vertical direction, dividing a resulting sum by a number of the pixel data added so as to thereby produce surrounding pixel data to thereby output a vertical luminance; and
   (j) adding, if the result of comparison shows that the correlation values in the horizontal and vertical directions are smaller than the first preselected value, the surrounding pixel data closest to the pixel being observed and positioned at a same distance from said pixel being observed, and dividing a resulting sum by a value two times greater than a number of the pixels added to thereby output a mean luminance;

a luminance data pattern being generated on the basis of one half of the pixel being observed and the surrounding pixel data output in any one of steps (h)–(j).

34. A method in accordance with claim 33, wherein step (b) uses pixel data produced by switching bidimensionally arranged color filters positioned between the optics and the photosensitive devices, moving a photosensitive portion having said photosensitive devices bidimensionally arranged in a bidimensional plane parallel to the imaging surface, and plane-sequentially recording, every time said photosensitive portion is moved, an image picked up, and wherein every time said photosensitive portion is moved, an image picked up has a center of the geometric imaging surface shifted from a center of a geometric imaging surface of a previous image by one half of the pitch in the direction of row and the direction of column.

35. A method in accordance with claim 33, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging, and wherein step (b) uses pixel data produced by spatially superposing identical images projected on said two imaging surfaces via R, G and B filters arranged in front of said photosensitive devices in one-to-one correspondence to said photosensitive devices.

36. A method in accordance with claim 33, wherein step (b) calculates, before calculation of the luminance data, the correlation values in the horizontal and vertical directions, and compares said correlation values with the first preselected value, executes either step (h) or (i), and adds, when one of the R and B pixel data is to be generated, correlation values derived from the other pixel data positioned at both sides of said luminance data to be generated in the horizontal direction and said luminance data, adds said correlation values in the horizontal and vertical directions, and compares a resulting sum with a second reference value, and wherein steps (h)–(j) are respectively executed if a result of said comparison using said second preselected value indicates the correlation in the horizontal direction, if said result indicates the correlation in the vertical direction, and if said result indicates no correlation.

37. A method in accordance with claim 36, wherein step (b) uses pixel data produced by switching bidimensionally arranged color filters positioned between the optics and the photosensitive devices, moving a photosensitive portion having said photosensitive devices bidimensionally arranged in a bidimensional plane parallel to the imaging surface, and plane-sequentially recording, every time said photosensitive portion is moved, an image picked up, and wherein every time said photosensitive portion is moved, an image picked up has a center of the geometric imaging surface shifted from a center of a geometric imaging surface of a previous image by one half of the pitch in the direction of row and the direction of column.

38. A method in accordance with claim 36, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging, and wherein step (b) uses pixel data produced by spatially superposing identical images projected on said two imaging surfaces via R, G and B filters arranged in front of said photosensitive devices in one-to-one correspondence to said photosensitive devices.

39. A method in accordance with claim 36, wherein step (j) comprises the substep of adding diagonally opposite G pixel data and calculates the surrounding data if an absolute value of a resulting sum is greater than a third preselected value.

40. A method in accordance with claim 39, wherein step (b) uses pixel data produced by switching bidimensionally arranged color filters positioned between the optics and the photosensitive devices, moving a photosensitive portion having said photosensitive devices bidimensionally arranged in a bidimensional plane parallel to the imaging surface, and plane-sequentially recording, every time said photosensitive portion is moved, an image picked up, and wherein every time said photosensitive portion is moved, an image picked up has a center of the geometric imaging surface shifted from a center of a geometric imaging surface of a previous image by one half of the pitch in the direction of row and the direction of column.

41. A method in accordance with claim 39, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging, and wherein step (b) uses pixel data produced by spatially superposing identical images projected on said two imaging surfaces via R, G and B filters arranged in front of said photosensitive devices in one-to-one correspondence to said photosensitive devices.

42. A method in accordance with claim 32, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging, and wherein step (b) uses pixel data produced by spatially superposing identical images projected on said two imaging surfaces via R, G and B filters arranged in front of said photosensitive devices in one-to-one correspondence to said photosensitive devices.

43. A method in accordance with claim 32, wherein step (b) uses pixel data produced by switching bidimensionally arranged color filters positioned between the optics and the photosensitive devices, moving a photosensitive portion having said photosensitive devices bidimensionally arranged in a bidimensional plane parallel to the imaging surface, and plane-sequentially recording, every time said photosensitive portion is moved, an image picked up, and wherein every time said photosensitive portion is moved, an image picked up has a center of the geometric imaging surface shifted from a center of a geometric imaging surface of a previous image by one half of the pitch in the direction of row and the direction of column.

44. A method in accordance with claim 31, wherein said step (c) comprises the substeps of:

(h) executing, at the time of interpolation of the pixel data for a given virtual photosensitive device in horizontal interpolation, horizontal interpolation consisting of a zeroth horizontal stage for multiplying pixel data to interpolate by a corresponding coefficient, a first horizontal stage for adding pixel data positioned at a right and a left of said pixel data to interpolate and multiplying a resulting sum by a coefficient, repeating n times a horizontal stage in which, as in said first horizontal stage, pixel data located at a same distance from said pixel to interpolate in the horizontal direction are multiplied by corresponding coefficients, and adding all products sequentially output after said first horizontal stage; and (i) executing, at the time of generation of the pixel data being observed by using the pixel data determined by step (h), multiplying pixel data positioned in the vertical direction by corresponding coefficients, and adding all resulting products to thereby effect low pass processing in the vertical direction.

45. A method in accordance with claim 31, wherein said optics projects the image of the subject on at least two imaging surfaces each having photosensitive devices bidimensionally arranged in the direction of row and the direction of column, wherein said photosensitive devices of one imaging surface and said photosensitive devices of the other imaging surface have centers thereof shifted from each other by one half of the pitch in the direction of row and the direction of column in a geometrical configuration of said imaging, and wherein step (b) uses pixel data produced by spatially superposing identical images projected on said two imaging surfaces via R, G and B filters arranged in front of said photosensitive devices in one-to-one correspondence to said photosensitive devices.

46. A method in accordance with claim 31, wherein step (b) uses pixel data produced by switching bidimensionally arranged color filters positioned between the optics and the photosensitive devices, moving a photosensitive portion having said photosensitive devices bidimensionally arranged in a bidimensional plane parallel to the imaging surface, and plane-sequentially recording, every time said photosensitive portion is moved, an image picked up, and wherein every time said photosensitive portion is moved, an image picked up has a center of the geometric imaging surface shifted from a center of a geometric imaging surface of a previous image by one half of the pitch in the direction of row and the direction of column.

47. A method in accordance with claim 31, wherein step (d) uses the digitized color-by-color pixel data output from the photosensitive devices arranged in the G square lattice pattern and the RB full-checker pattern shifted from said G square lattice pattern by one half of the pitch and the luminance data produced in step (c), wherein for plane interpolation of the G pixel data, step (d) adds the luminance data corresponding to the position of a given pixel to be interpolated to a difference between a mean value of actually produced pixel data G adjoining said given pixel in the horizontal and/or the vertical direction and a mean value of sums of the luminance data adjoining said given pixel in the horizontal and/or the vertical direction;

wherein for plane interpolation of the R pixel date, step (d) executes:

a first R step of adding the luminance data corresponding to a position of a given pixel to be interpolated to a difference between a mean value of actually produced R pixel data R obliquely adjoining said given pixel and a mean value of sums of the luminance data adjoining said given pixel obliquely adjoining said given pixel in a same direction as said R pixel data;

a second R step of producing R pixel data for a remaining color R of said given pixel by adding the luminance data of the remaining color R of said given pixel to a difference between a mean value of sums of the pixel data located at a same distance and a mean value of sums of the luminance data located at said same distance and produced in said first R step; and a third R step of producing R pixel data for the remaining color R of said given pixel by adding the luminance data corresponding to said given pixel to a difference between a mean value of sums of the R pixel data actually produced in steps (b) and (c) and the luminance data corresponding to the position of said given pixel; and wherein for plane interpolation of the B pixel data, step (d) executes:

a first B step of adding the luminance data corresponding to a position of a given pixel to be interpolated to a difference between a mean value of sums of actually produced B pixel data obliquely adjoining said given pixel and a mean value of sums of the luminance data obliquely adjoining said given pixel in a same direction as said B pixel data;

a second B step of producing B pixel data for a remaining color B of said given pixel by adding the luminance data of said remaining color B of said given pixel to a difference between a mean value of sums of pixel data located at a same distance and a mean value of sums of the luminance data located as said same distance and output in said first B step; and a third B step of adding the luminance data corresponding to a position of a given pixel to be interpolated to a difference between a mean value of sums of actually produced B pixel data in steps (b) and (c) and a mean value of sums of luminance data corresponding to pixels used to produce said mean value.

* * * * *